(12) United States Patent
Lavell et al.

(10) Patent No.: US 11,688,303 B2
(45) Date of Patent: Jun. 27, 2023

(54) SIMULATED TORSO FOR AN OPEN SURGERY SIMULATOR

(71) Applicant: Strategic Operations, Inc., San Diego, CA (US)

(72) Inventors: Kit Lavell, San Diego, CA (US);
Stuart C. Segall, San Diego, CA (US);
Aislinn Brody, San Diego, CA (US)

(*) Notice: Subject to any disclaimer, the term of this patent is extended or adjusted under 35 U.S.C. 154(b) by 0 days.

(21) Appl. No.: 17/846,824

(22) Filed: Jun. 22, 2022

(65) Prior Publication Data
US 2022/0327964 A1 Oct. 13, 2022

Related U.S. Application Data

(60) Continuation-in-part of application No. 17/151,140, filed on Jan. 16, 2021, now Pat. No. 11,495,143, which is a continuation-in-part of application No. 16/449,279, filed on Jun. 21, 2019, now Pat. No. 11,151,902, which is a continuation of application No. 15/919,024, filed on Mar. 12, 2018, now Pat. No. 10,360,817, which is a continuation-in-part of application No. 14/943,099, filed on Nov. 17, 2015, now Pat. No. 9,916,774, which is a division of application No. 14/494,490, filed on Sep. 23, 2014, now Pat. No. 9,336,693, which is a division of application No. 12/803,609, filed on Jun. 30, 2010, now Pat. No. 8,840,403, said application No.
(Continued)

(51) Int. Cl.
G09B 23/30 (2006.01)
G09B 23/32 (2006.01)
G09B 23/28 (2006.01)

(52) U.S. Cl.
CPC .......... *G09B 23/303* (2013.01); *G09B 23/28* (2013.01); *G09B 23/30* (2013.01); *G09B 23/32* (2013.01)

(58) Field of Classification Search
CPC ...... G09B 23/303; G09B 23/28; G09B 23/30; G09B 23/32
USPC .......................................................... 434/268
See application file for complete search history.

(56) References Cited

U.S. PATENT DOCUMENTS 2,213,270 A 9/1940 Chase
2,689,415 A 9/1954 Haver
(Continued)

*Primary Examiner* — Robert P Bullington
*Assistant Examiner* — Stephen Alvesteffer
(74) *Attorney, Agent, or Firm* — Enrique A. Monteagudo, Esq.

(57) ABSTRACT

The present disclosure pertains to systems, devices, and methods for use in medical simulation and training, providing realistic-looking medical effects. More particularly, the present disclosure pertains to systems, devices, and methods for simulating an open surgery environment, including dynamic features and aspects commonly found in trauma, emergency, and combat events. Aspects of the present disclosure relate to a wearable device for simulating wounds and injuries received during a trauma event, and performing associated surgical tasks. Aspects of the present disclosure further relate to a medical training device for Trauma Emergency Casualty Care and Tactical Combat Casualty Care (TCCC), including hemorrhage control. Aspects of the present disclosure further relate to an open surgery simulator, which may stand alone or work in combination (e.g., wear) various wound and injury simulators. Aspects of the present disclosure further relate to a simulated torso for an open surgery simulator.

9 Claims, 44 Drawing Sheets

Related U.S. Application Data

17/151,140 is a continuation-in-part of application No. 14/989,165, filed on Jan. 6, 2016, now abandoned, application No. 17/846,824 is a continuation-in-part of application No. 17/489,151, filed on Sep. 29, 2021, which is a continuation-in-part of application No. 16/449,279, filed on Jun. 21, 2019, now Pat. No. 11,151,902, which is a continuation of application No. 15/919,024, filed on Mar. 12, 2018, now Pat. No. 10,360,817, which is a continuation-in-part of application No. 14/943,099, filed on Nov. 17, 2015, now Pat. No. 9,916,774, which is a division of application No. 14/494,490, filed on Sep. 23, 2014, now Pat. No. 9,336,693, which is a division of application No. 12/803,609, filed on Jun. 30, 2010, now Pat. No. 8,840,403.

(56) References Cited

U.S. PATENT DOCUMENTS

| | | | |
|---|---|---|---|
| 2,752,697 | A | 7/1956 | Lawall |
| 2,995,832 | A | 8/1961 | Alderson |
| 3,027,655 | A | 4/1962 | Alderson |
| 3,562,820 | A | 2/1971 | Braun |
| 3,852,893 | A | 12/1974 | Smrcka |
| 4,209,919 | A | 7/1980 | Krikae et al. |
| 4,221,975 | A | 9/1980 | Ledniczki et al. |
| 4,288,222 | A | 9/1981 | Kling |
| 4,331,426 | A | 5/1982 | Sweeney |
| 4,408,597 | A | 10/1983 | Tenney, Jr. |
| 4,439,162 | A | 3/1984 | Blaine |
| 4,531,919 | A | 7/1985 | Ware |
| 4,773,865 | A | 9/1988 | Baldwin |
| 4,878,890 | A | 11/1989 | Bilweis |
| 4,917,372 | A | 4/1990 | Zeitlin |
| 5,104,328 | A | 4/1992 | Lounsbury |
| 5,156,777 | A | 10/1992 | Kaye |
| 5,305,181 | A | 4/1994 | Schultz |
| 5,397,237 | A | 3/1995 | Dhont et al. |
| 5,411,437 | A | 5/1995 | Weber et al. |
| 5,634,797 | A | 6/1997 | Montgomery |
| 5,823,787 | A | 10/1998 | Gonzalez et al. |
| 5,990,625 | A | 11/1999 | Meissner et al. |
| 5,995,077 | A | 11/1999 | Wilcox et al. |
| 6,022,743 | A | 2/2000 | Naughton et al. |
| 6,057,540 | A | 5/2000 | Gordon et al. |
| 6,234,804 | B1 | 5/2001 | Yong |
| 6,471,723 | B1 | 10/2002 | Ashforth et al. |
| 6,544,041 | B1 | 4/2003 | Damadian |
| 6,780,016 | B1 | 8/2004 | Toly |
| 6,942,692 | B2 | 9/2005 | Landau et al. |
| 6,984,208 | B2 | 1/2006 | Zheng |
| 7,021,940 | B2 | 4/2006 | Morris et al. |
| 7,037,343 | B2 | 5/2006 | Imran |
| 7,201,772 | B2 | 4/2007 | Schwammenthal et al. |
| 7,326,237 | B2 | 2/2008 | DePalma et al. |
| 7,665,995 | B2 | 2/2010 | Toly |
| 7,810,504 | B2 | 10/2010 | Guzman |
| 7,850,456 | B2 | 12/2010 | Chosack et al. |
| 7,857,626 | B2 | 12/2010 | Toly |
| 7,887,330 | B2 | 2/2011 | King |
| 7,963,770 | B2 | 6/2011 | Kukora et al. |
| 7,967,679 | B2 | 6/2011 | Ombrellaro et al. |
| 8,012,189 | B1 | 9/2011 | Webb et al. |
| 8,070,743 | B2 | 12/2011 | Kagen et al. |
| 8,162,668 | B2 | 4/2012 | Toly |
| 8,262,668 | B2 | 9/2012 | Biegun |
| 8,342,852 | B2 | 1/2013 | King |
| 8,382,485 | B2 | 2/2013 | Bardsley et al. |
| 8,491,309 | B2 | 7/2013 | Parry et al. |
| 8,770,985 | B2 | 7/2014 | Adams |
| 8,840,403 | B2 | 9/2014 | Segall |
| 9,017,080 | B1 | 4/2015 | Placik |
| 9,336,693 | B2 | 5/2016 | Segall |
| 2004/0126746 | A1* | 7/2004 | Toly ............... G09B 23/30 434/262 |
| 2007/0087314 | A1* | 4/2007 | Gomo ............. G09B 23/28 434/262 |
| 2007/0140413 | A1* | 6/2007 | Saracen ........... G09B 23/30 378/207 |
| 2007/0218438 | A1 | 9/2007 | Sanders et al. |
| 2007/0243512 | A1 | 10/2007 | King |
| 2008/0038702 | A1 | 4/2008 | Choquet |
| 2008/0167398 | A1 | 7/2008 | Patil et al. |
| 2008/0227073 | A1 | 9/2008 | Bardsley et al. |
| 2008/0274769 | A1 | 11/2008 | Linden |
| 2009/0051544 | A1 | 2/2009 | Niknejad |
| 2009/0068627 | A1 | 3/2009 | Toly |
| 2009/0246747 | A1 | 10/2009 | Buckman, Jr. |
| 2009/0263775 | A1 | 10/2009 | Ullrich |
| 2009/0291421 | A1 | 11/2009 | Duprez et al. |
| 2009/0292161 | A1 | 11/2009 | Parker |
| 2009/0298034 | A1 | 12/2009 | Parry et al. |
| 2010/0062407 | A1 | 3/2010 | Lecat |
| 2010/0167248 | A1 | 7/2010 | Ryan |
| 2010/0167253 | A1 | 7/2010 | Ryan et al. |
| 2010/0167254 | A1 | 7/2010 | Nguyen |
| 2010/0209899 | A1 | 8/2010 | Park et al. |
| 2011/0060555 | A1 | 3/2011 | Koehler et al. |
| 2012/0003621 | A1 | 1/2012 | Segall |
| 2012/0015339 | A1 | 1/2012 | Hendrickson et al. |
| 2012/0148994 | A1 | 6/2012 | Hori et al. |
| 2012/0202180 | A1 | 8/2012 | Stock |
| 2013/0059279 | A1 | 3/2013 | Reid-Searl |
| 2013/0078604 | A1 | 3/2013 | King |
| 2013/0123940 | A1 | 5/2013 | Hurely et al. |
| 2014/0017650 | A1 | 1/2014 | Romero |
| 2014/0082814 | A1 | 3/2014 | Rober et al. |
| 2014/0154656 | A1 | 6/2014 | Segall |
| 2017/0011655 | A1 | 1/2017 | Sakezles |
| 2017/0169734 | A1* | 6/2017 | Wen ............... G09B 23/32 |
| 2021/0150937 | A1* | 5/2021 | White ............. G09B 23/285 |

* cited by examiner

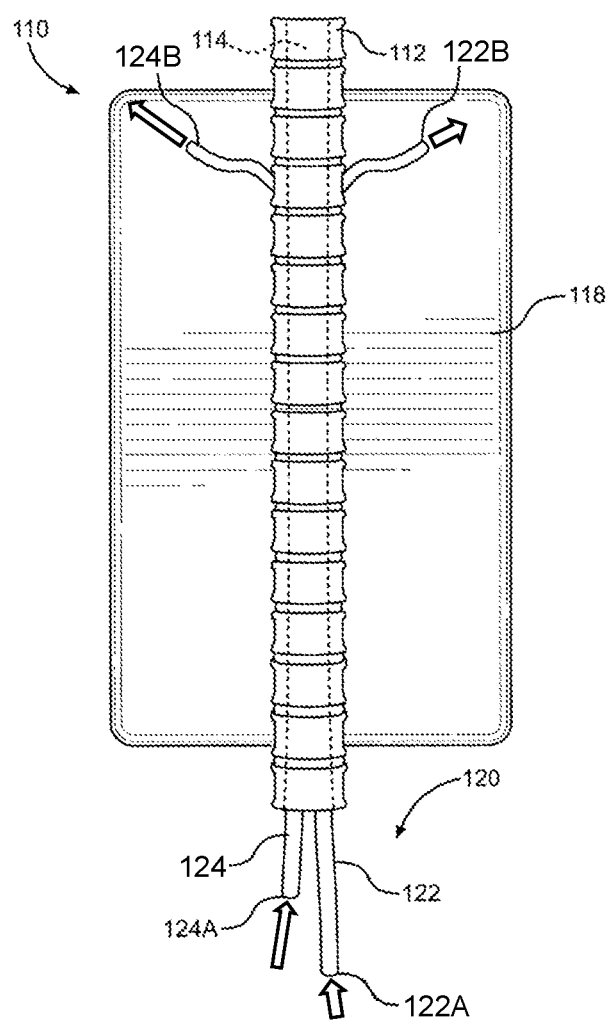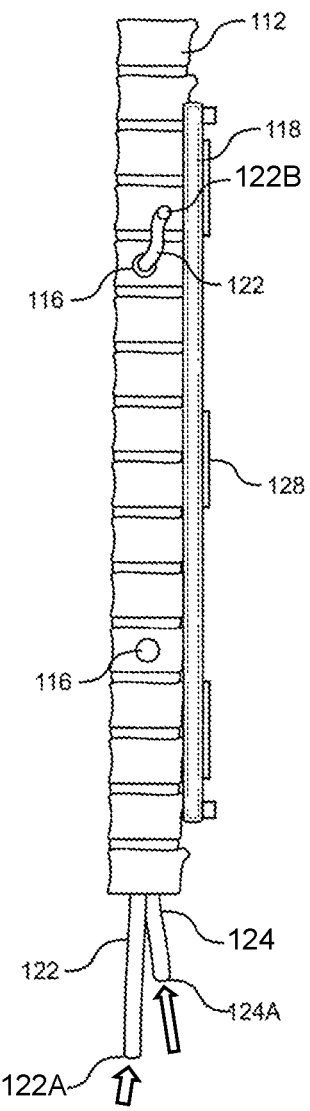
FIG. 8
FIG. 9

SIMULATED TORSO FOR AN OPEN SURGERY SIMULATOR

CROSS-REFERENCE TO RELATED APPLICATIONS

This application is a continuation-in-part of U.S. patent application Ser. No. 17/151,140, filed Jan. 16, 2021 and entitled "EMERGENCY CASUALTY CARE TRAINER"; which is a continuation-in-part of U.S. patent application Ser. No. 16/449,279, filed Jun. 21, 2019 and entitled "Wearable Partial Task Surgical Simulator" and issued as U.S. Pat. No. 11,151,902 on Oct. 19, 2021; which is a continuation of U.S. patent application Ser. No. 15/919,024, filed Mar. 12, 2018 and entitled "Wearable Partial Task Surgical Simulator" and issued as U.S. Pat. No. 10,360,817 on Jul. 23, 2019; which is a continuation-in-part of U.S. patent application Ser. No. 14/943,099, filed Nov. 17, 2015, entitled "Wearable Partial Task Simulator" and issued as U.S. Pat. No. 9,916,774 on Mar. 13, 2018; which is a divisional of U.S. patent application Ser. No. 14/494,490, filed on Sep. 23, 2014, entitled "Wearable Partial Task Simulator", and issued as U.S. Pat. No. 9,336,693 on May 5, 2016; which is a divisional of U.S. patent application Ser. No. 12/803,609, filed on Jun. 30, 2010, entitled "Wearable Partial Task Simulator", and issued as U.S. Pat. No. 8,840,403 on Sep. 23, 2014, the contents of which are all incorporated herein by reference in their entirety. U.S. patent application Ser. No. 17/151,140, filed Jan. 16, 2021 and entitled "EMERGENCY CASUALTY CARE TRAINER" is also a continuation-in-part of U.S. patent application Ser. No. 14/989,165, filed Jan. 6, 2016 and entitled "Hemorrhage Control Trainer"; which is incorporated by reference herein in its entirety.

This application is also continuation-in-part of U.S. patent application Ser. No. 17/489,151, filed Sep. 29, 2021 and entitled "PROSTHETIC INTERNAL ORGAN MODULE"; which is a continuation-in-part of U.S. patent application Ser. No. 16/449,279, filed Jun. 21, 2019 and entitled "Wearable Partial Task Surgical Simulator" and issued as U.S. Pat. No. 11,151,902 on Oct. 19, 2021; which is a continuation of U.S. patent application Ser. No. 15/919,024, filed Mar. 12, 2018 and entitled "Wearable Partial Task Surgical Simulator" and issued as U.S. Pat. No. 10,360,817 on Jul. 23, 2019; which is a continuation-in-part of U.S. patent application Ser. No. 14/943,099, filed Nov. 17, 2015, entitled "Wearable Partial Task Simulator" and issued as U.S. Pat. No. 9,916,774 on Mar. 13, 2018; which is a divisional of U.S. patent application Ser. No. 14/494,490, filed on Sep. 23, 2014, entitled "Wearable Partial Task Simulator", and issued as U.S. Pat. No. 9,336,693 on May 5, 2016; which is a divisional of U.S. patent application Ser. No. 12/803,609, filed on Jun. 30, 2010, entitled "Wearable Partial Task Simulator", and issued as U.S. Pat. No. 8,840,403 on Sep. 23, 2014, the contents of which are all incorporated herein by reference in their entirety.

BACKGROUND

Technical Field

The present invention pertains generally to devices and methods for use in medical simulation and training, providing realistic-looking medical effects. More particularly, the present invention pertains to devices and methods for simulating an open surgery environment.

Related Art

As is well known, and widely accepted, partial task simulators and training aids can be very effective for teaching individuals how to perform a wide variety of different tasks. More specifically, they can be extremely helpful for teaching an individual how to perform certain medical procedures.

Laparoscopic surgery, also called minimally invasive surgery (MIS), is distinguished from the more common, open surgery, as laparoscope surgery is performed remotely. In particular, a laparoscope and other miniature surgical tools are inserted into a small incision in the body, and viewing/operating on the affected area is performed by snaking the cable from the remote, but more easily accessible location outside of the patient's body. This is typically performed in a clinical setting.

In contrast, in open surgery, the surgeon is present before the patient's body and interacts directly with it (e.g., slicing and manually prying away any membranes and fatty tissue to gain visual and manual access to the organ/area of interest. Further, trauma surgery includes additional complications and urgency not typically found in a planned surgery (e.g., internal bleeding, bullet wounds, burns, etc.). Trauma surgery (particularly in combat conditions) may take place outdoors and with multiple complicating factors (open flow bleeding, noise, explosions, unrelated 3rd parties in the vicinity, etc.).

U.S. Pat. App. Pub. No. 20080227073 filed by Bardsley, et al. on Sep. 28, 2006 shows methods and apparatus for autonomous casualty simulation. In one embodiment an autonomous casualty simulator includes a processing module having a scenario progression controller and a physiological modeling system to receive sensor input and to control effectors. The autonomous casualty simulator can be contained in a nominal human manikin form.

U.S. Pat. App. Pub. No. 20070243512 filed by King on Apr. 23, 2007 shows a trauma training system. The trauma training system is described as a system for simulating one or more hemorrhages in order to provide a more dynamic and realistic hemorrhage simulation in order to train medical personnel and other critical care givers, such as first responders, medics, and emergency medical technicians (EMTs) on treating hemorrhages. The system includes a reservoir, a flow controller, and at least one conduit connected to at least one simulated wound site wherein the system supplies fluid to the simulated wound site in order to simulate a hemorrhage. The system may further include a plurality of wound sites that have their respective fluid flows controlled by the fluid flow controller. In at least one embodiment, the reservoir and the flow controller are housed within a bag. In at least one embodiment, the system further includes an audio system for providing audio cues to the simulation participants to enhance the realism of the simulation.

The present disclosure is directed toward overcoming known problems and problems discovered by the inventors.

SUMMARY OF THE INVENTION

The present invention pertains to systems, devices, and methods for use in medical simulation and training, providing realistic-looking medical effects. More particularly, the present invention pertains to systems, devices, and methods for simulating an open surgery environment. Aspects of the present invention further relate to an open surgery simulator, which may stand alone or work in combination (e.g., wear) various wound and injury simulators.

An articulating rib cage for a simulated torso is disclosed herein. The articulating rib cage includes a sternum base, at least one support rib section affixed to the sternum base, a flex rib section, and a flex joint affixed to the sternum base and to the flex rib section. The at least one support rib section is configured to removably couple to the simulated torso, the at least one support rib section. The flex rib section includes at least one rib, sized and dimension as a human rib. The flex joint is configured to provide for elastic displacement of the at least one rib of the flex rib section.

According to one embodiment, a simulated torso for an open surgery simulator is disclosed herein. The simulated torso includes a torso back shell, a muscle backing nested within the torso back shell, and a rib cage module coupled to the torso back shell substantially in front of the muscle backing. The torso back shell has a concave front, and a back shaped as at least a portion of a human torso back side. The muscle backing is configured as a flexible filling to the torso back shell, and has a forward facing surface configured to appear as human muscle. The rib cage module includes a sternum base sized and dimension as a human sternum, and at least one support rib section configured to removably couple to the simulated torso, and the at least one support rib section being affixed to the sternum base.

According to another embodiment, an open surgery simulator is disclosed herein. The open surgery simulator includes a simulated torso as described above, and a prosthetic internal organ module positioned in the torso back shell in front of the muscle backing of the simulated torso. The prosthetic internal organ module includes a plurality of simulated human organs.

BRIEF DESCRIPTION OF THE DRAWINGS

Novel features of this disclosure, as well as the disclosure itself, both as to its structure and its operation, will be best understood from the accompanying drawings, taken in conjunction with the accompanying description, in which similar reference characters refer to similar parts, and in which:

Partial Task Surgical Simulator

FIG. 8 is a front view of a module frame of the prosthetic organ module.

FIG. 9 is a side view of the module frame.

Hemorrhage Control Trainer (HCT)

Figure 19:
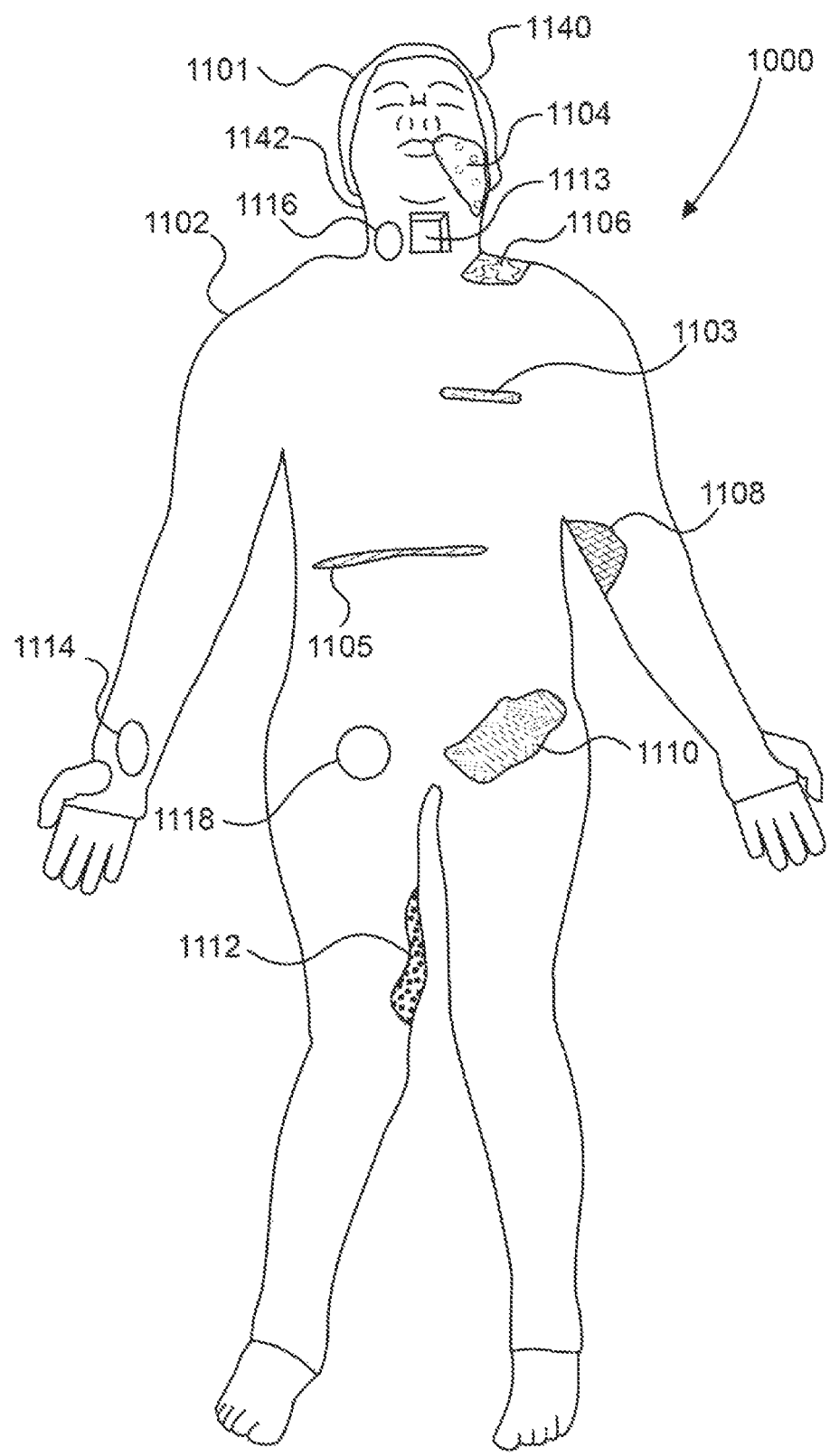

FIG. 19 is a front view of a Hemorrhage Control Trainer (HCT) in accordance with the present disclosure showing a manikin wearing a training suit having simulated wounds, a trachea insertion area, and the locations of the pulse emitters.

Figure 20:
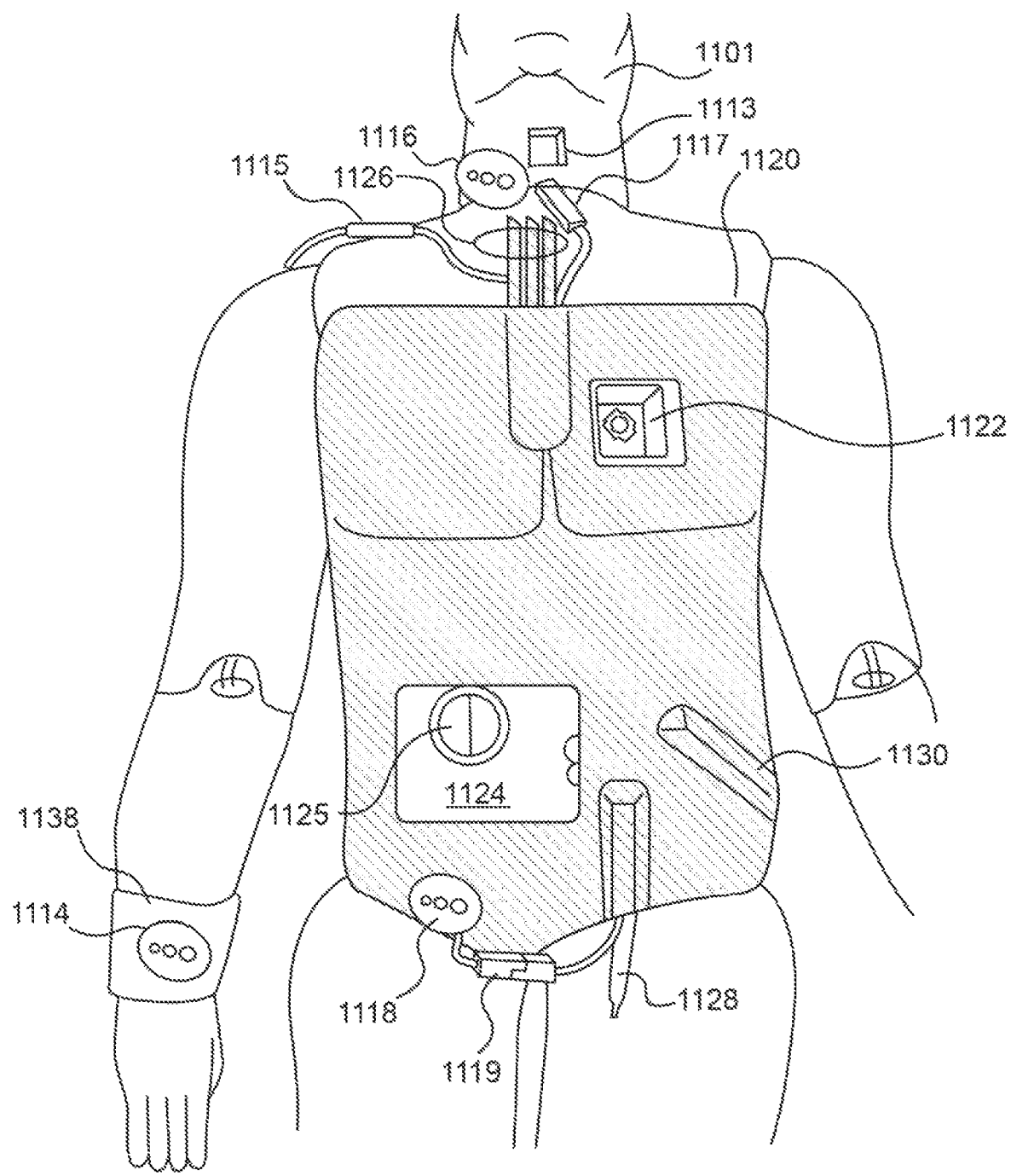

FIG. 20 is a front view of the manikin without the training suit, showing the pulse emitters, chest plate, battery compartment, and bleed connectors.

Figure 21:
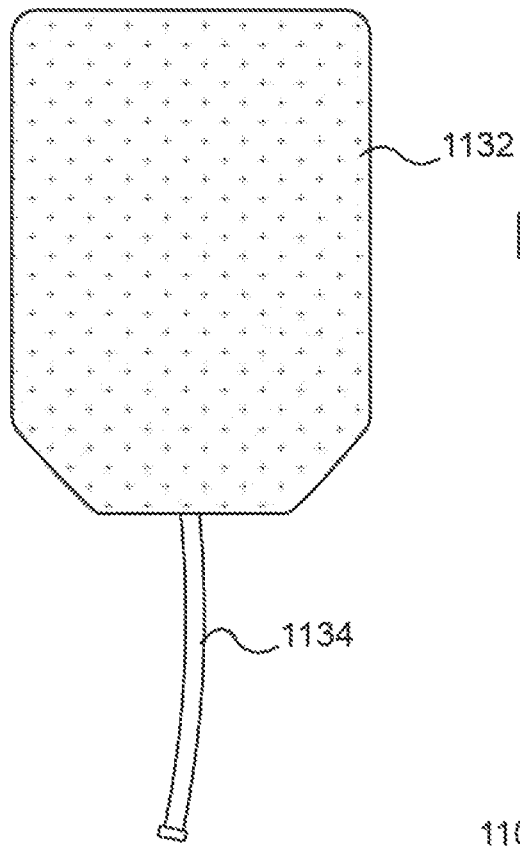

FIG. 21 is a front view of the blood reservoir with connector tube.

Figure 22:
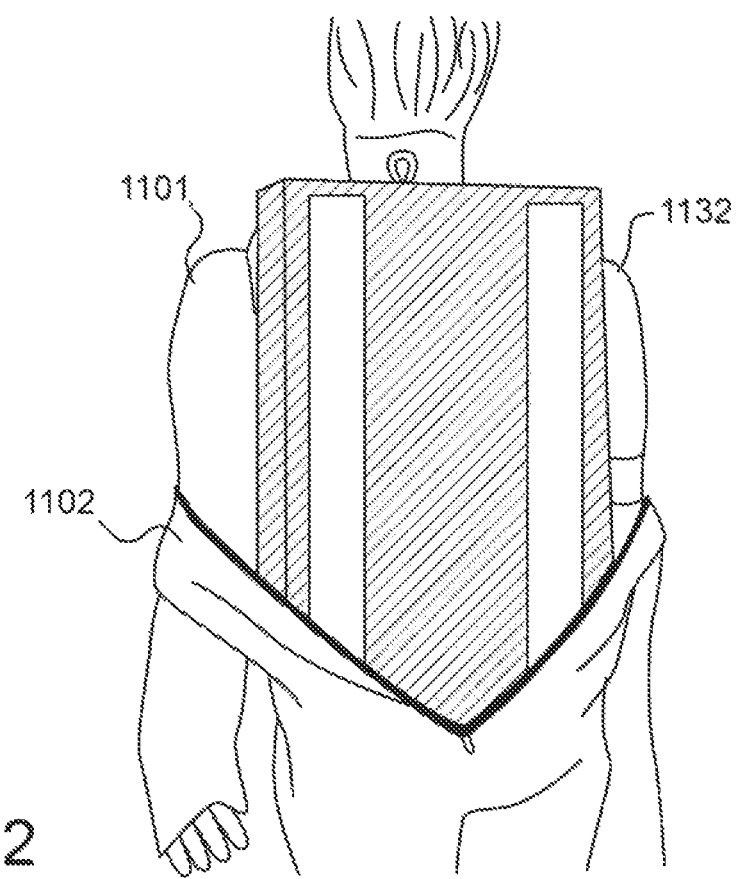

FIG. 22 is back view of the manikin partially wearing the training suit showing how the blood reservoir is incorporated into the HCT.

Figure 23:
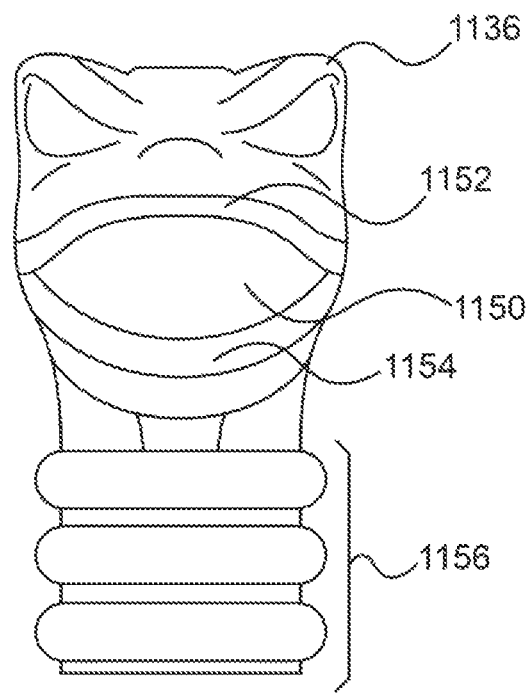

FIG. 23 is a front view of a trachea insert.

Figure 24:
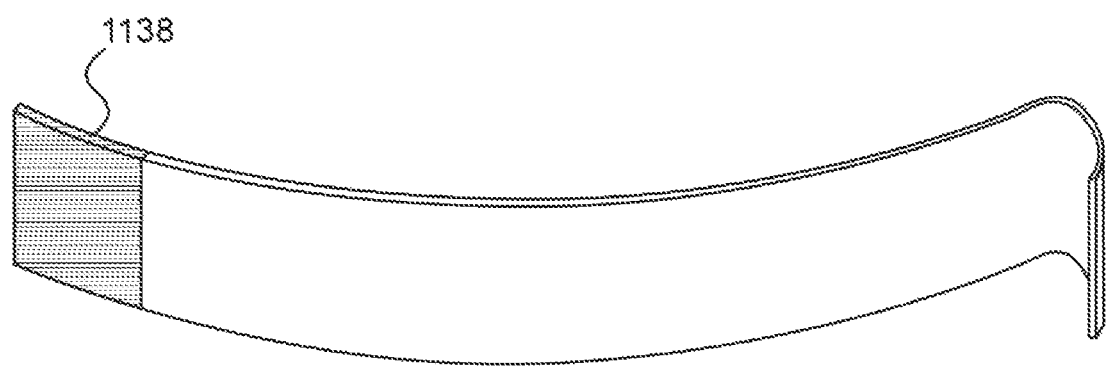

FIG. 24 is a front view of a skin cover.

Figure 25:
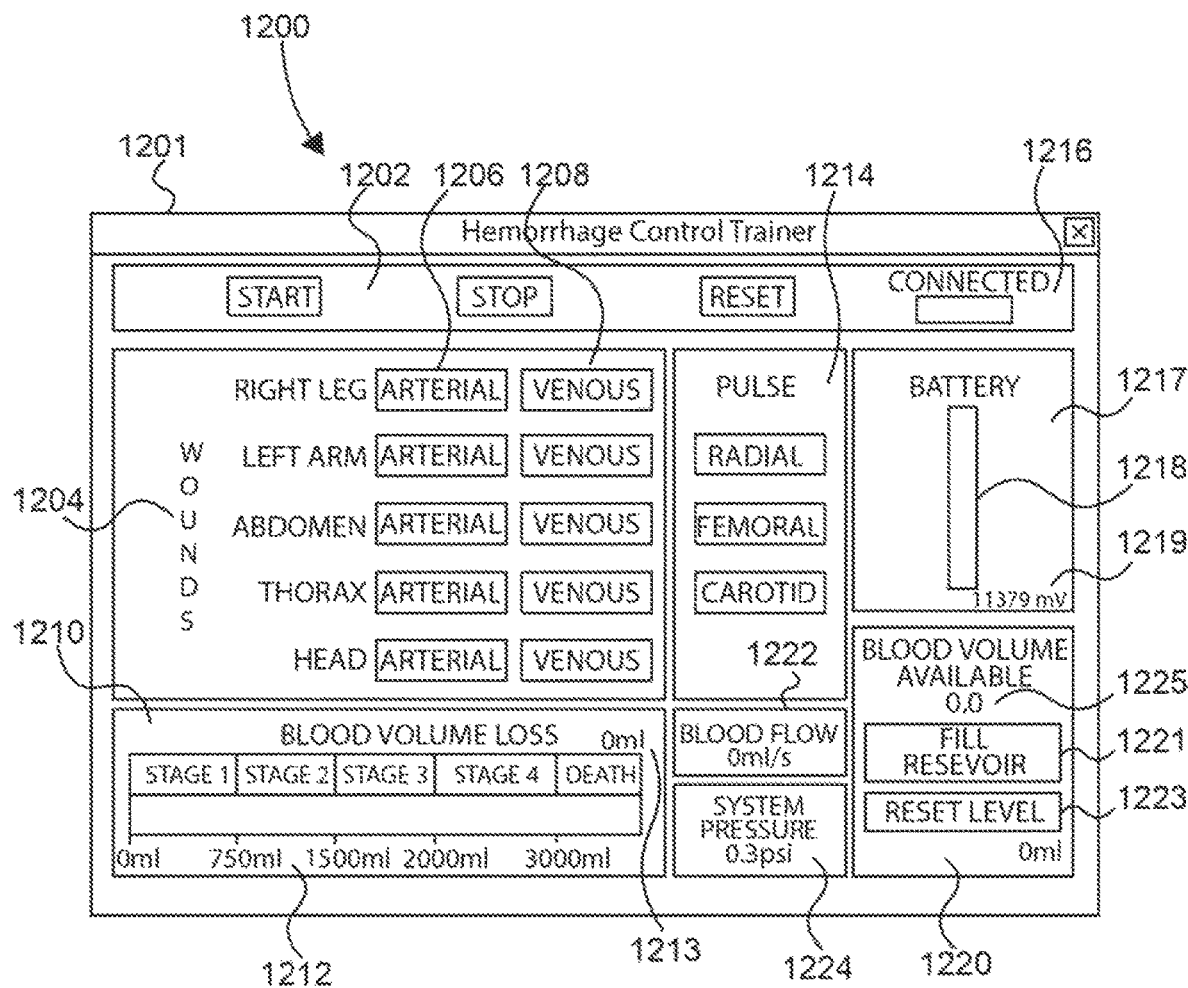

FIG. 25 is a view of the control screen on a remote control device allowing control of blood pressure, pulse rate, rate of blood loss, and system information.

Figure 26:
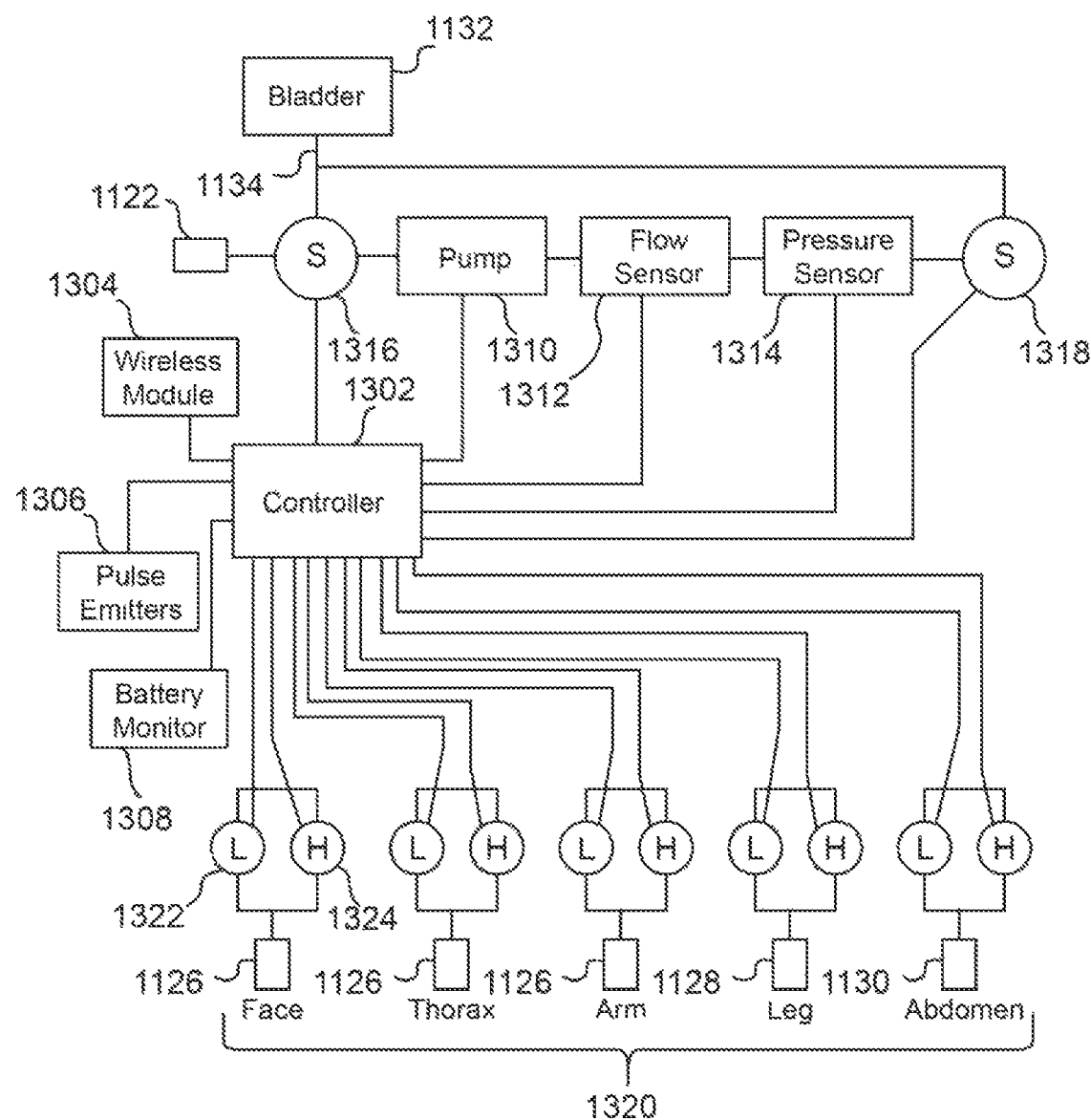

FIG. 26 is a diagram of the HCT system showing the interconnection of the valves, controllers, blood reservoir, wireless connection, and tubing.

Emergency Casualty Care Trainer

Figure 27:
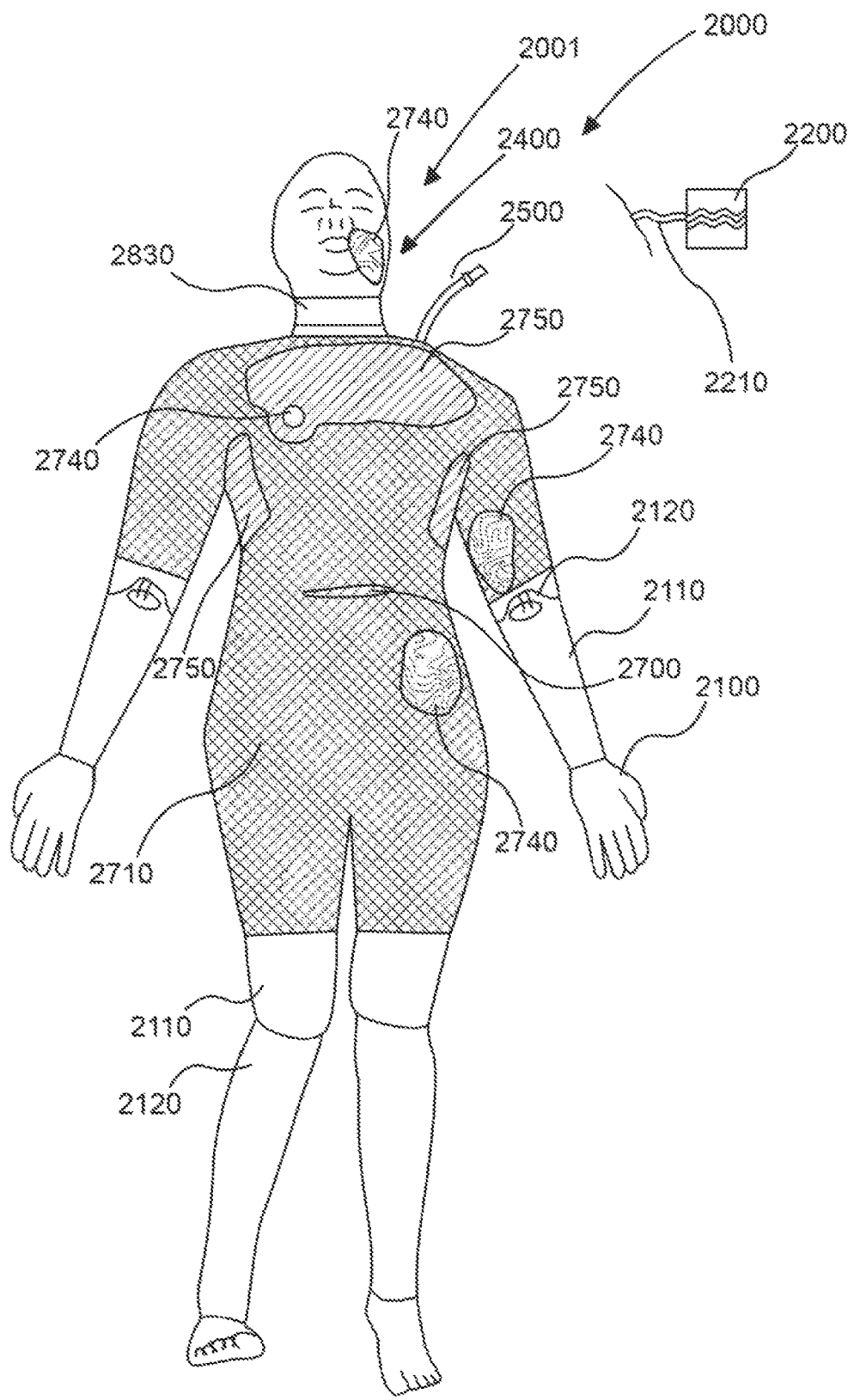

FIG. 27 is a front view of an exemplary emergency casualty care trainer, according to one embodiment of the disclosure.

Figure 28:
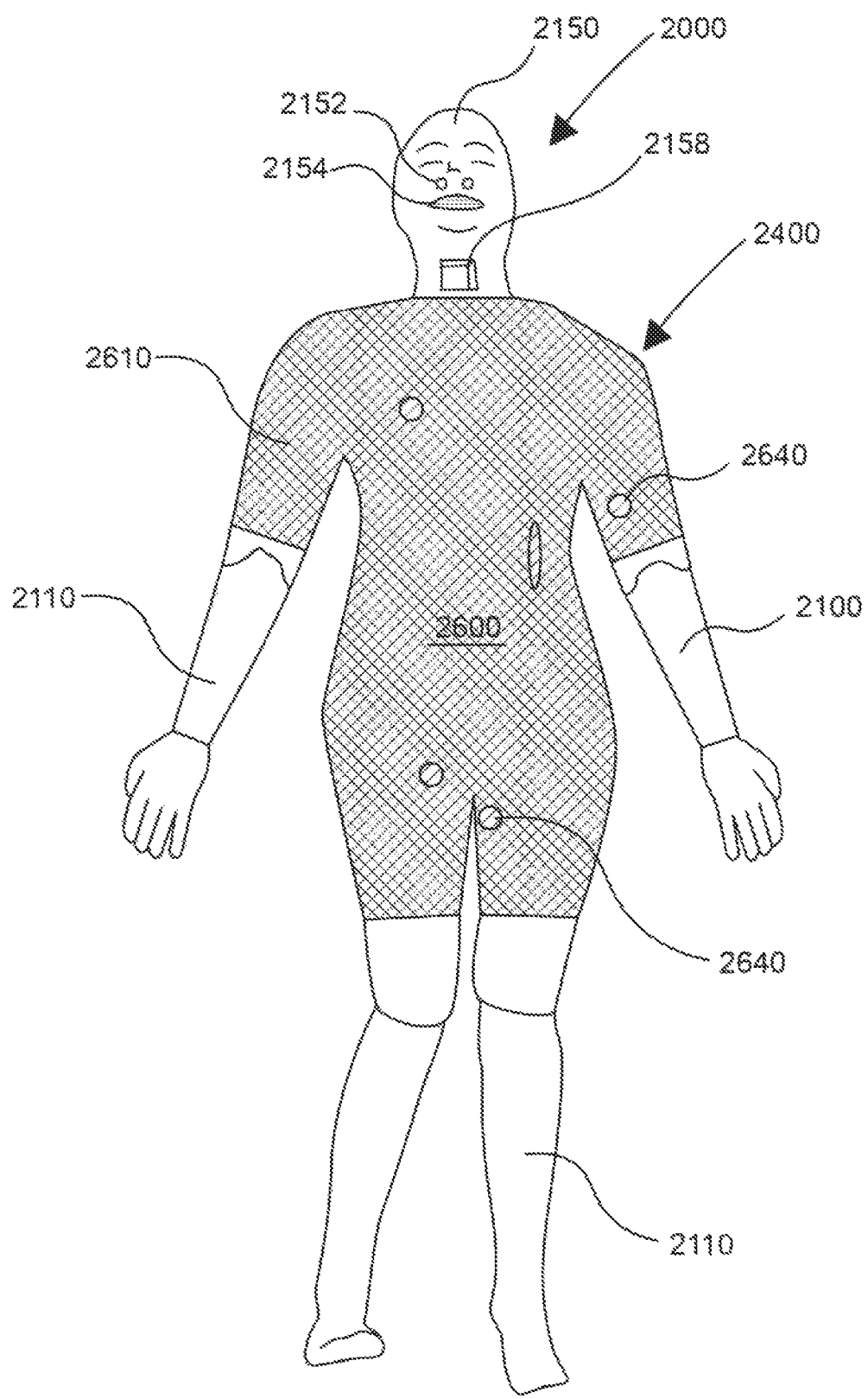

FIG. 28 is a front view of the exemplary emergency casualty care trainer of FIG. 27 having the outer garment removed, according to one embodiment of the disclosure.

Figure 29:
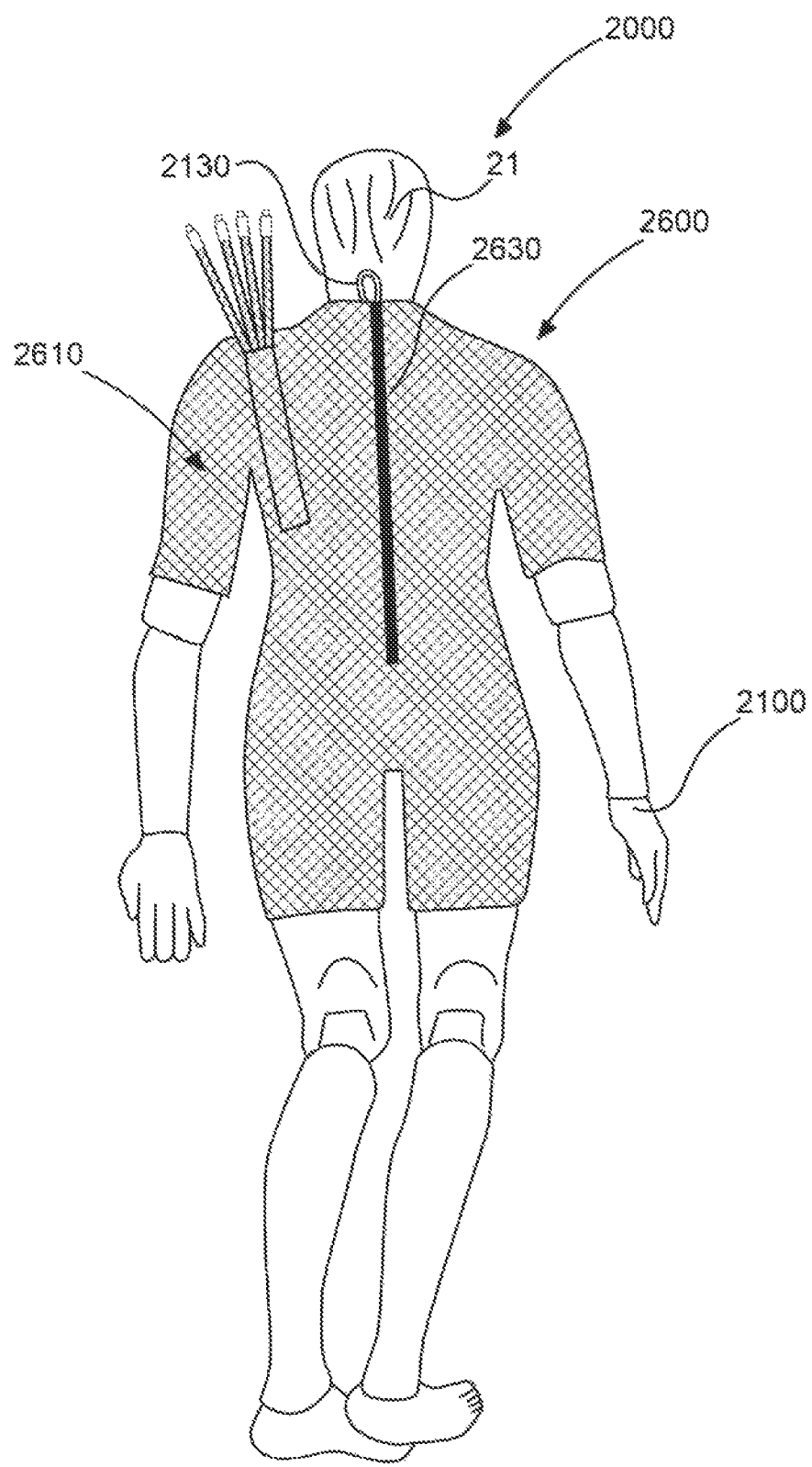

FIG. 29 is a back view of the exemplary emergency casualty care trainer of FIG. 27 having the outer garment removed, according to one embodiment of the disclosure.

Figure 30:
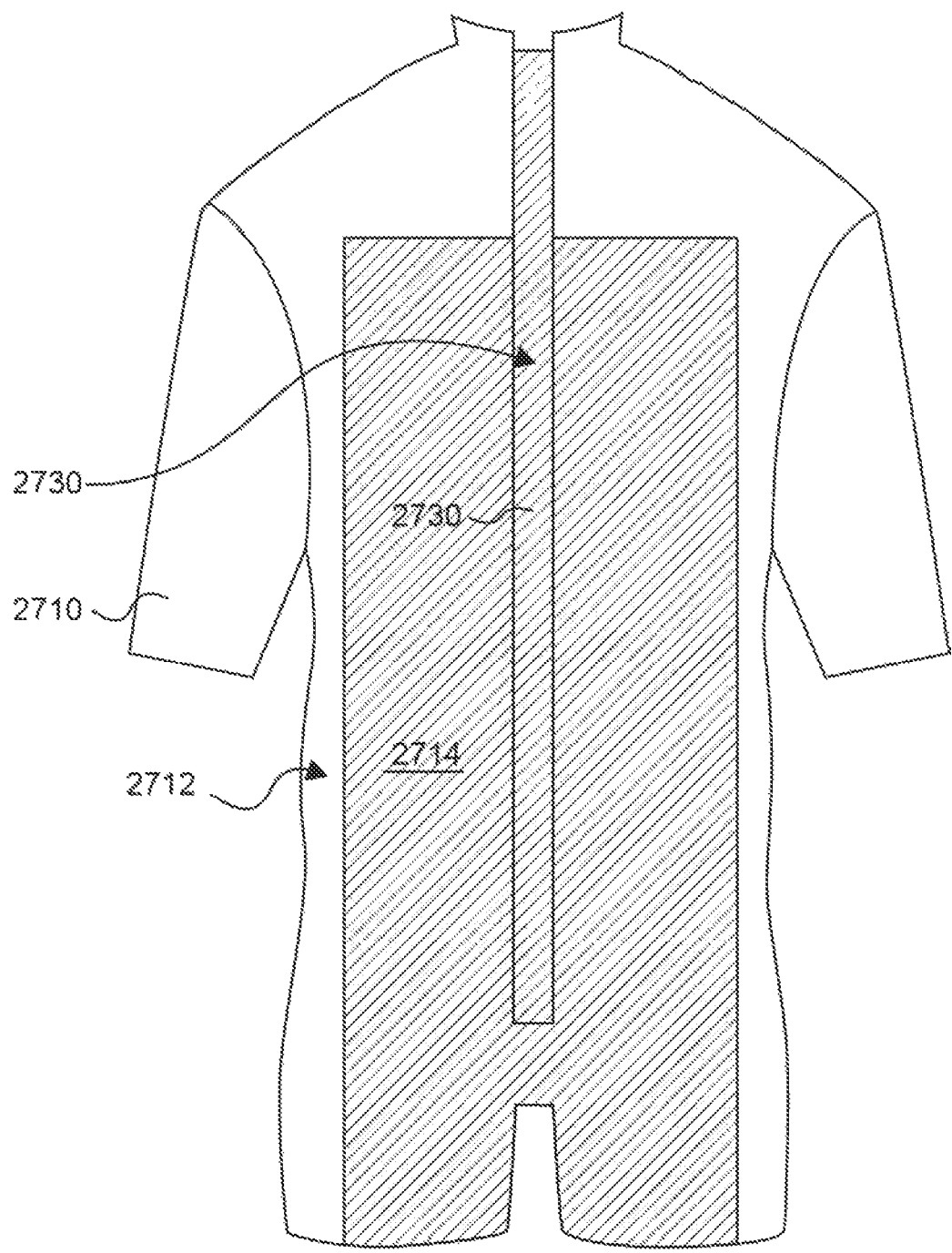

FIG. 30 is a back view of a skin cover of an outer garment for an exemplary emergency casualty care trainer, according to one embodiment of the disclosure.

Figure 31:
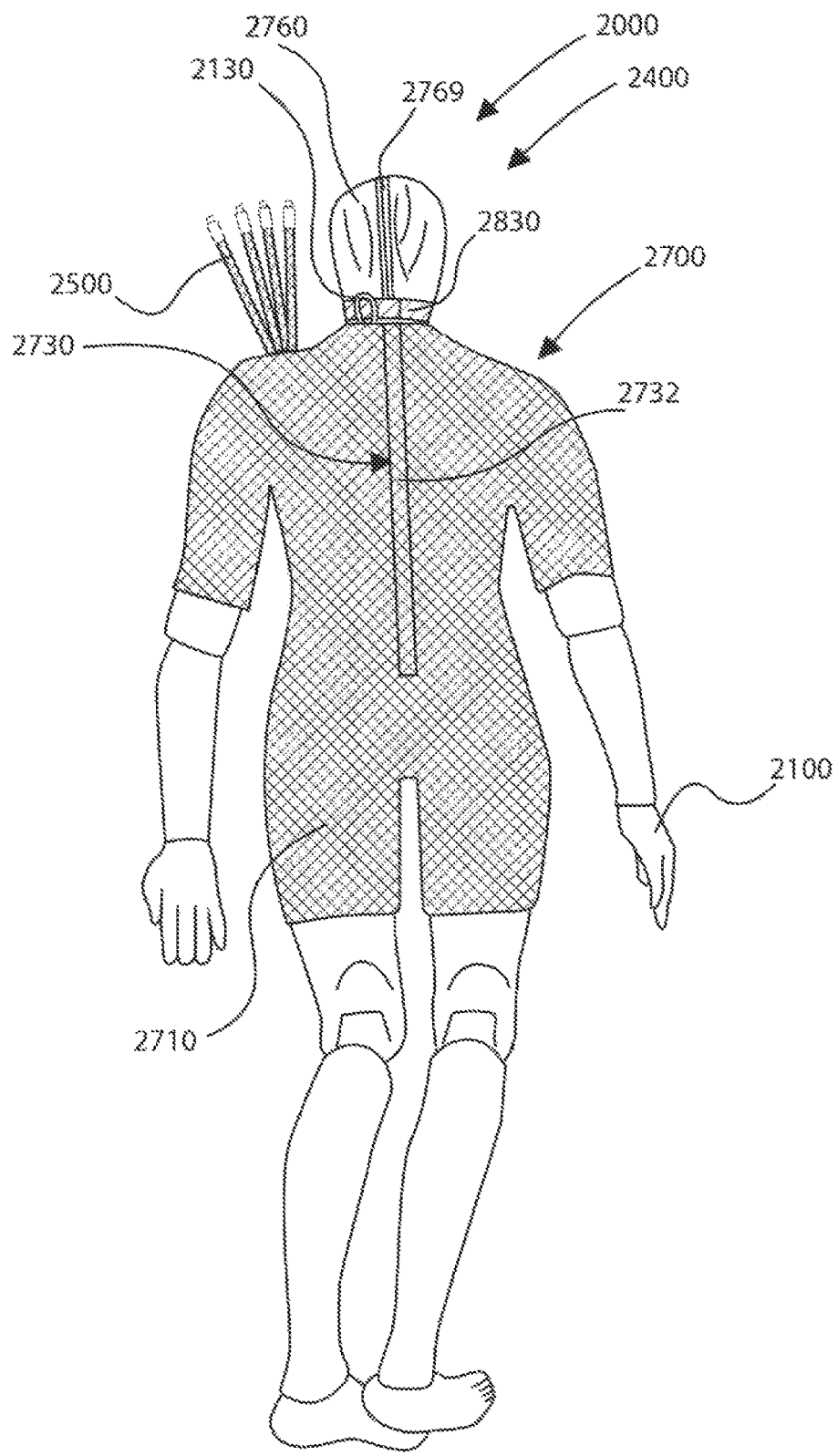

FIG. 31 is a back view of the exemplary emergency casualty care trainer of FIG. 27, according to one embodiment of the disclosure.

Figure 32:
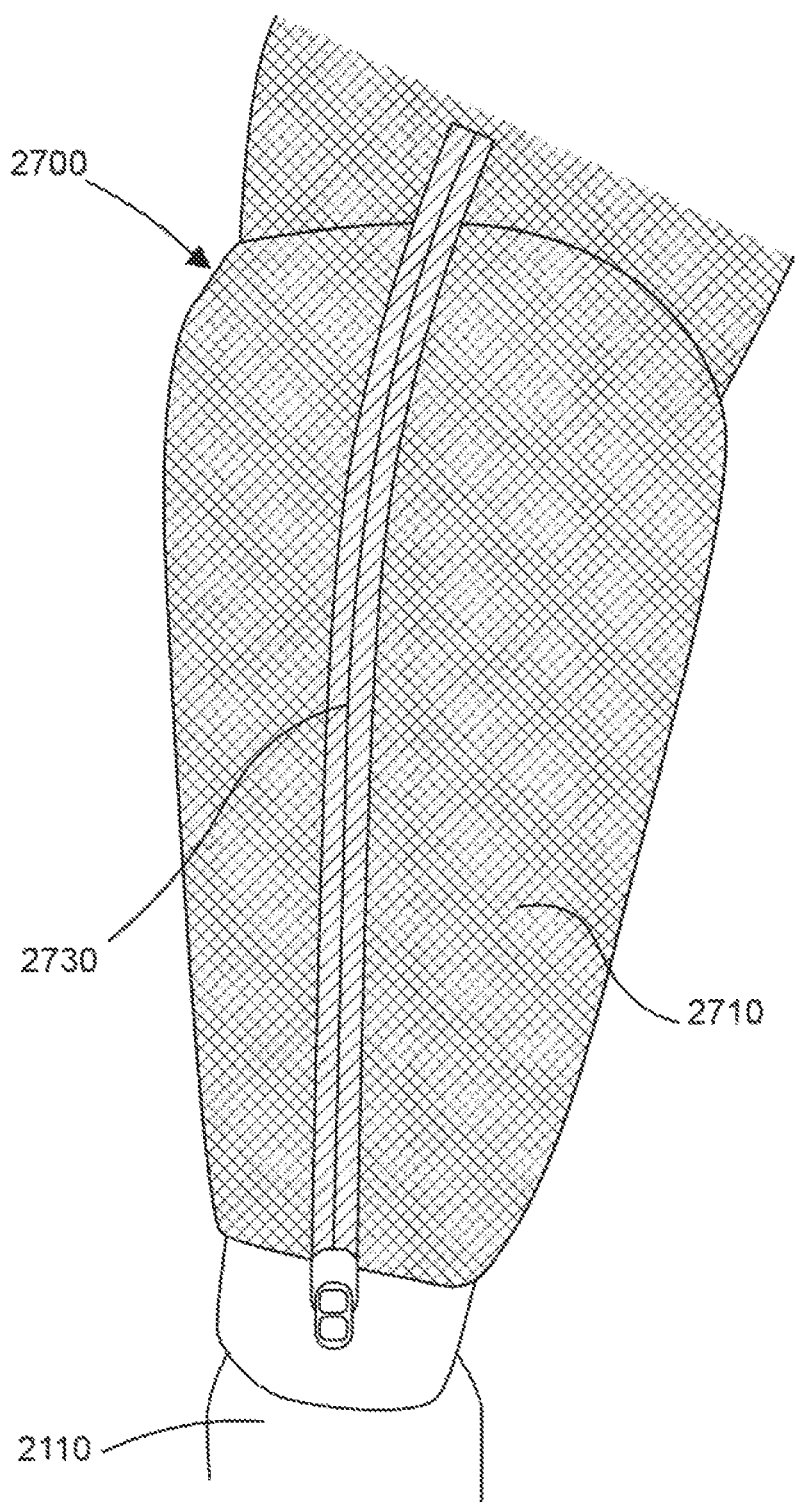

FIG. 32 is a detail view of one arm of the exemplary emergency casualty care trainer of FIG. 27, according to one embodiment of the disclosure.

Figure 33:
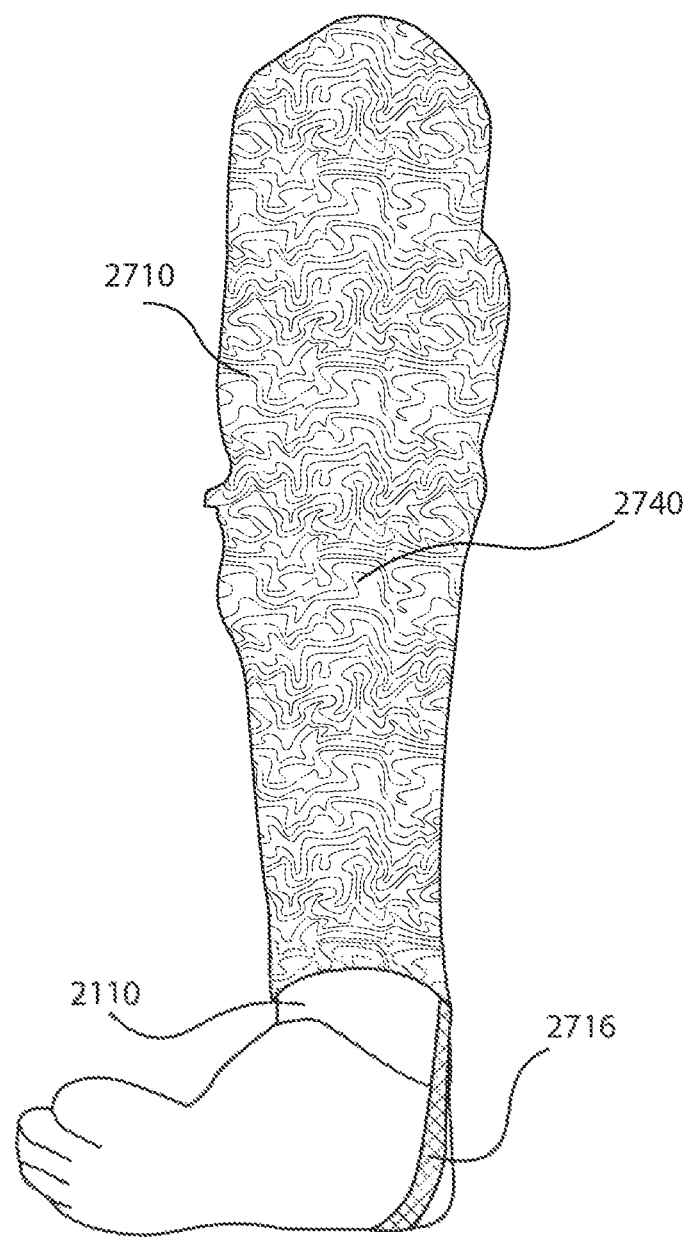

FIG. 33 is a detail view of one leg of an exemplary emergency casualty care trainer, according to one embodiment of the disclosure.

Figure 34:
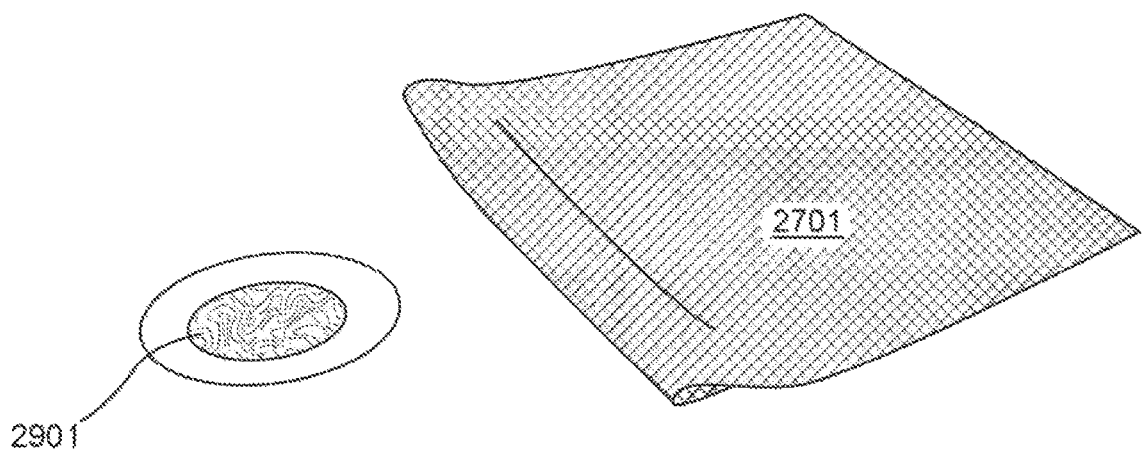

FIG. 34 is a method of manufacturing a simulated wound and/or a decompression needle pad for an exemplary emergency casualty care trainer, according to one embodiment of the disclosure.

Figure 35:
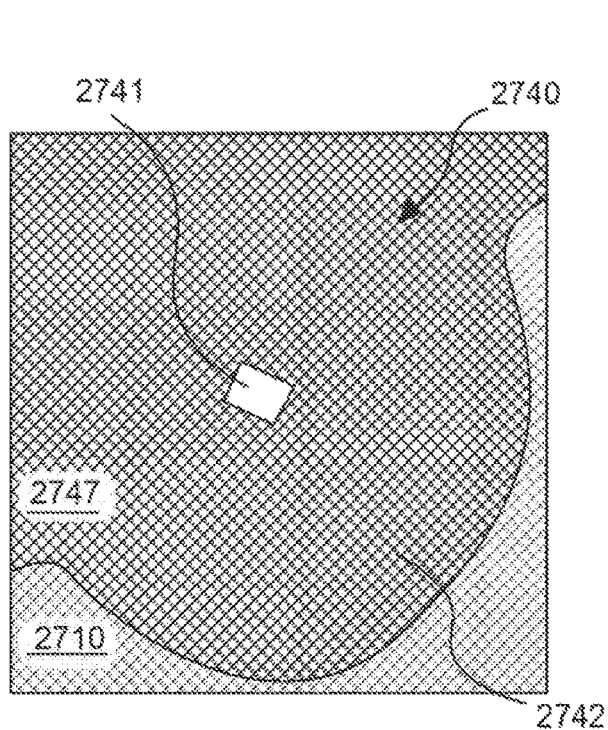

FIG. 35 is a method of manufacturing a simulated wound and/or a decompression needle pad for an exemplary emergency casualty care trainer, according to one embodiment of the disclosure.

Figure 36:
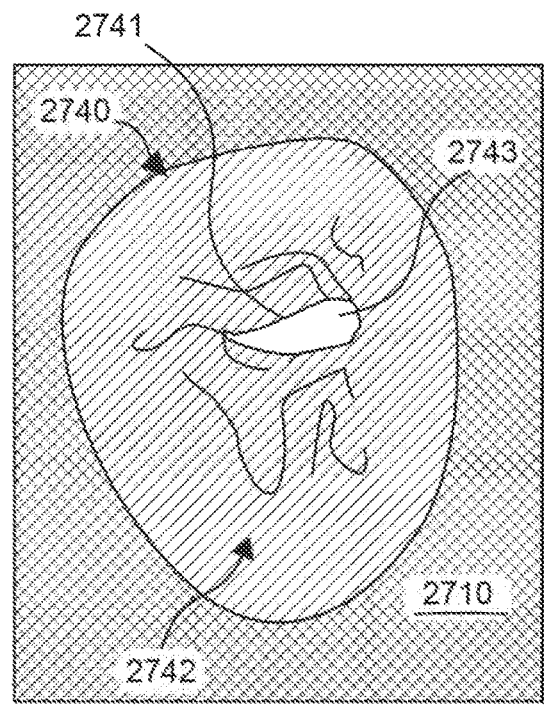

FIG. 36 is a method of manufacturing a simulated wound and/or a decompression needle pad for an exemplary emergency casualty care trainer, according to one embodiment of the disclosure.

Figure 37:
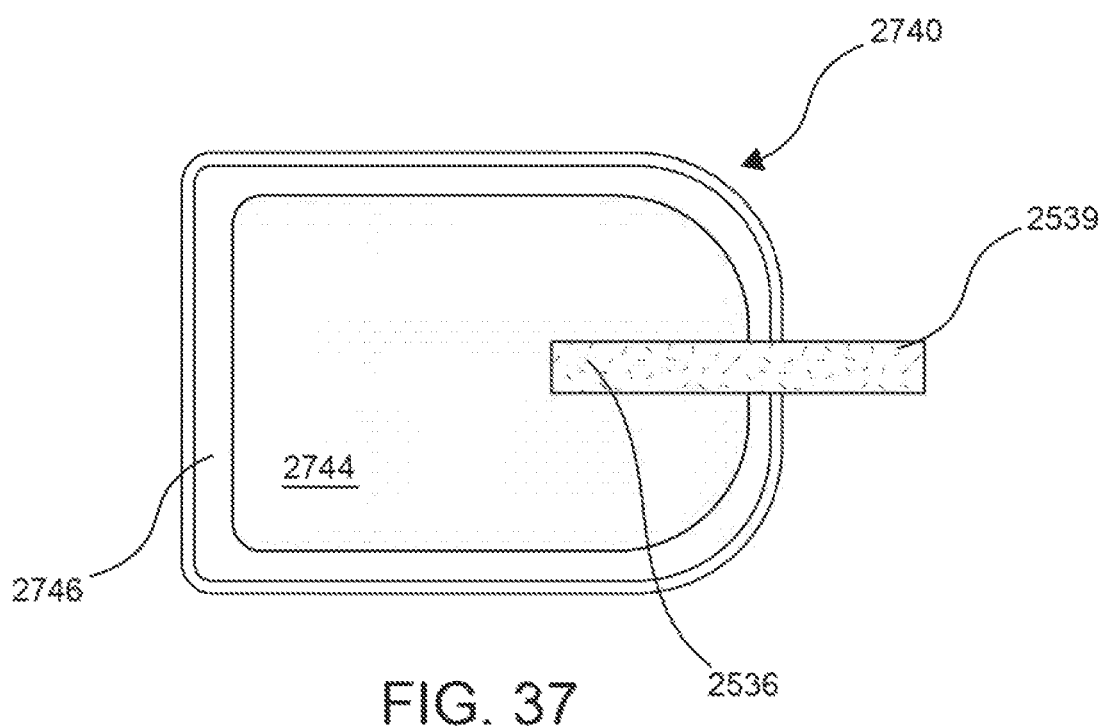

FIG. 37 is a method of manufacturing a simulated wound for an exemplary emergency casualty care trainer, according to one embodiment of the disclosure.

Figure 38:
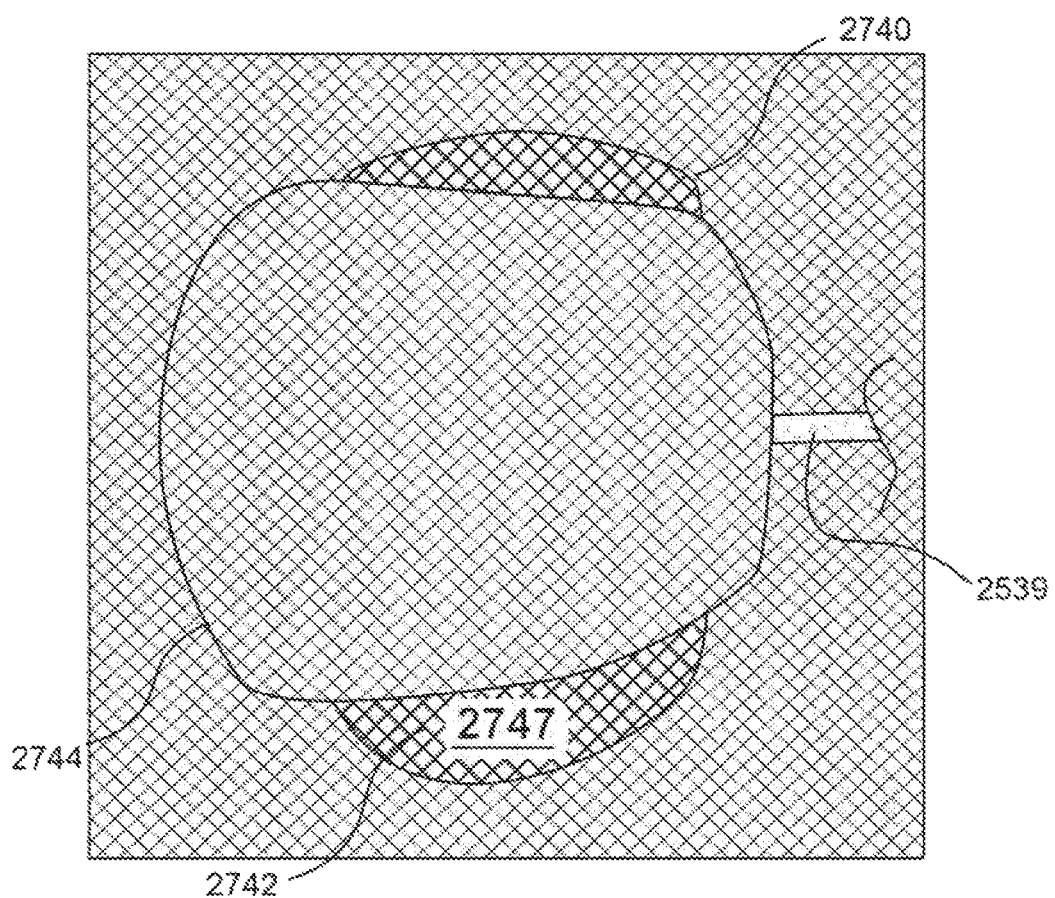

FIG. 38 is a method of manufacturing a simulated wound for an exemplary emergency casualty care trainer, according to one embodiment of the disclosure.

Figure 39:
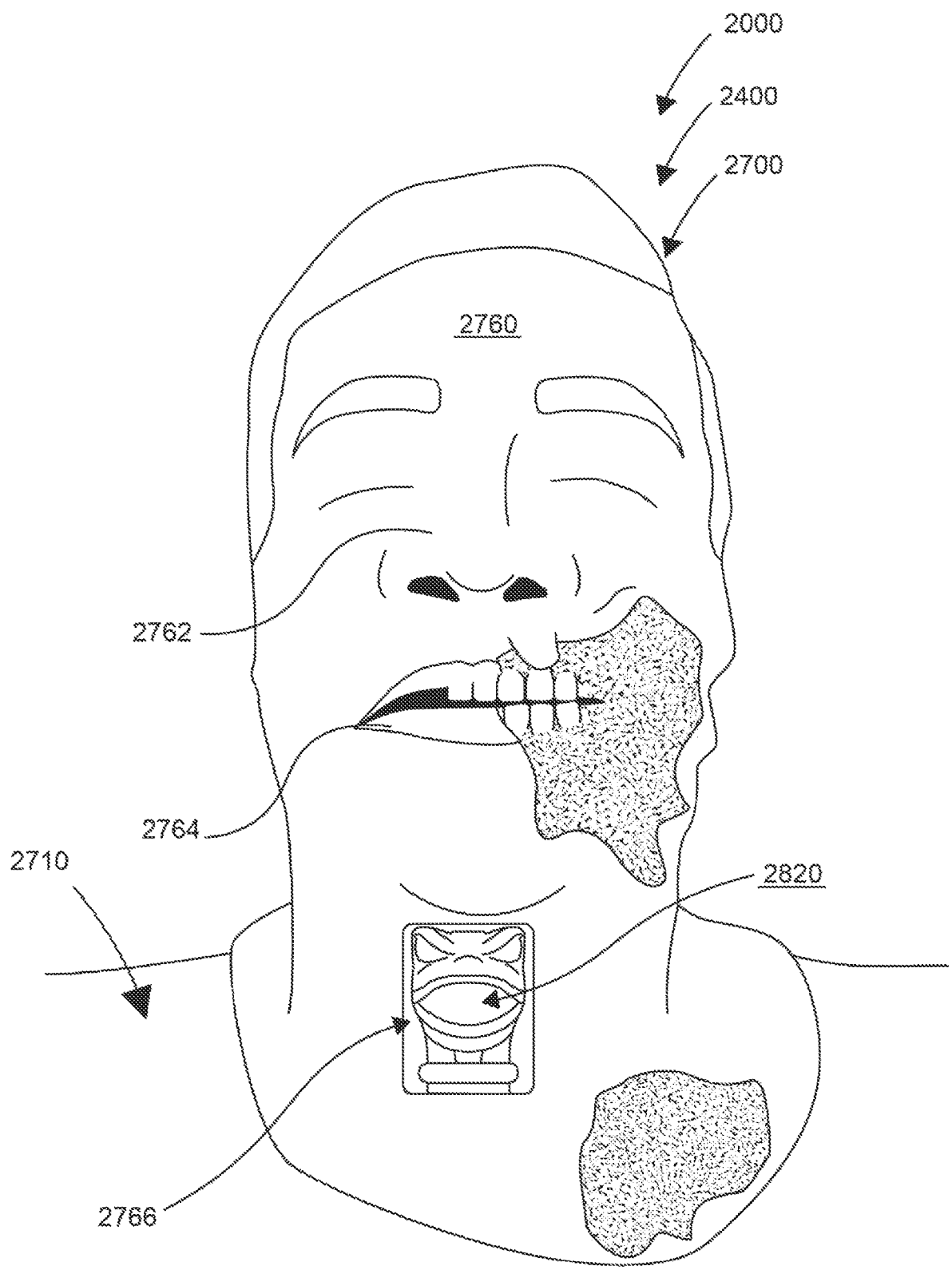

FIG. 39 is a detail view of a head area of the exemplary emergency casualty care trainer of FIG. 27, according to one embodiment of the disclosure.

Figure 40:
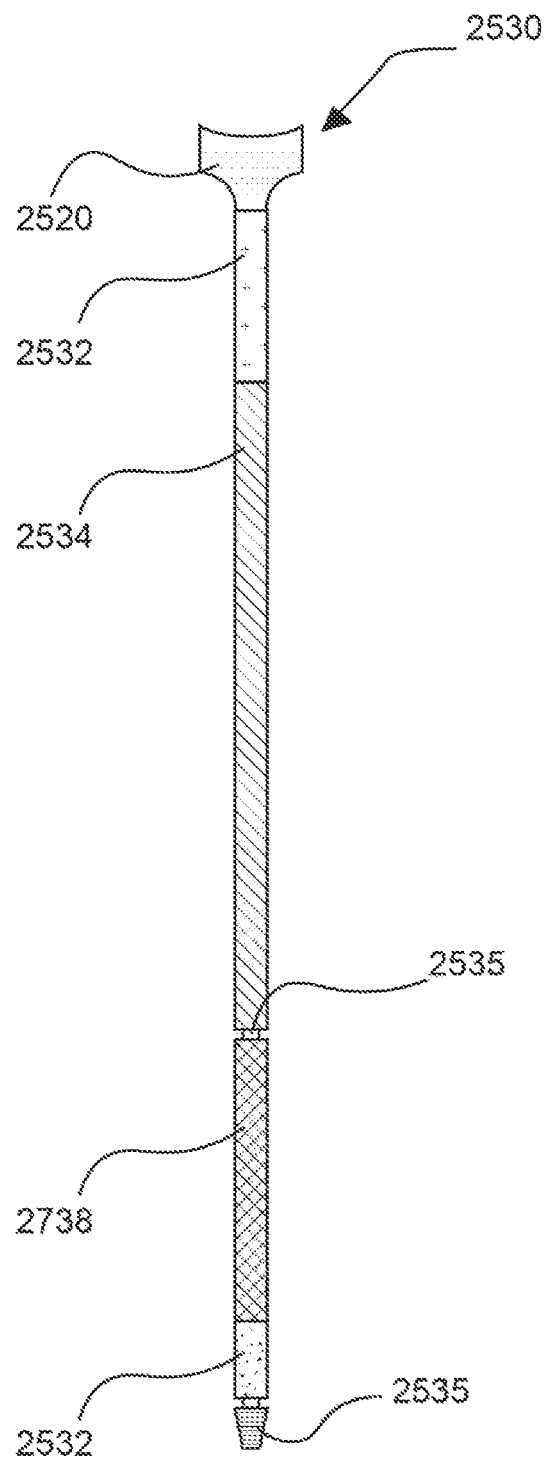

FIG. 40 is a detail view of a blood channel of a blood plumbing system of an exemplary emergency casualty care trainer, according to one embodiment of the disclosure.

Figure 41:
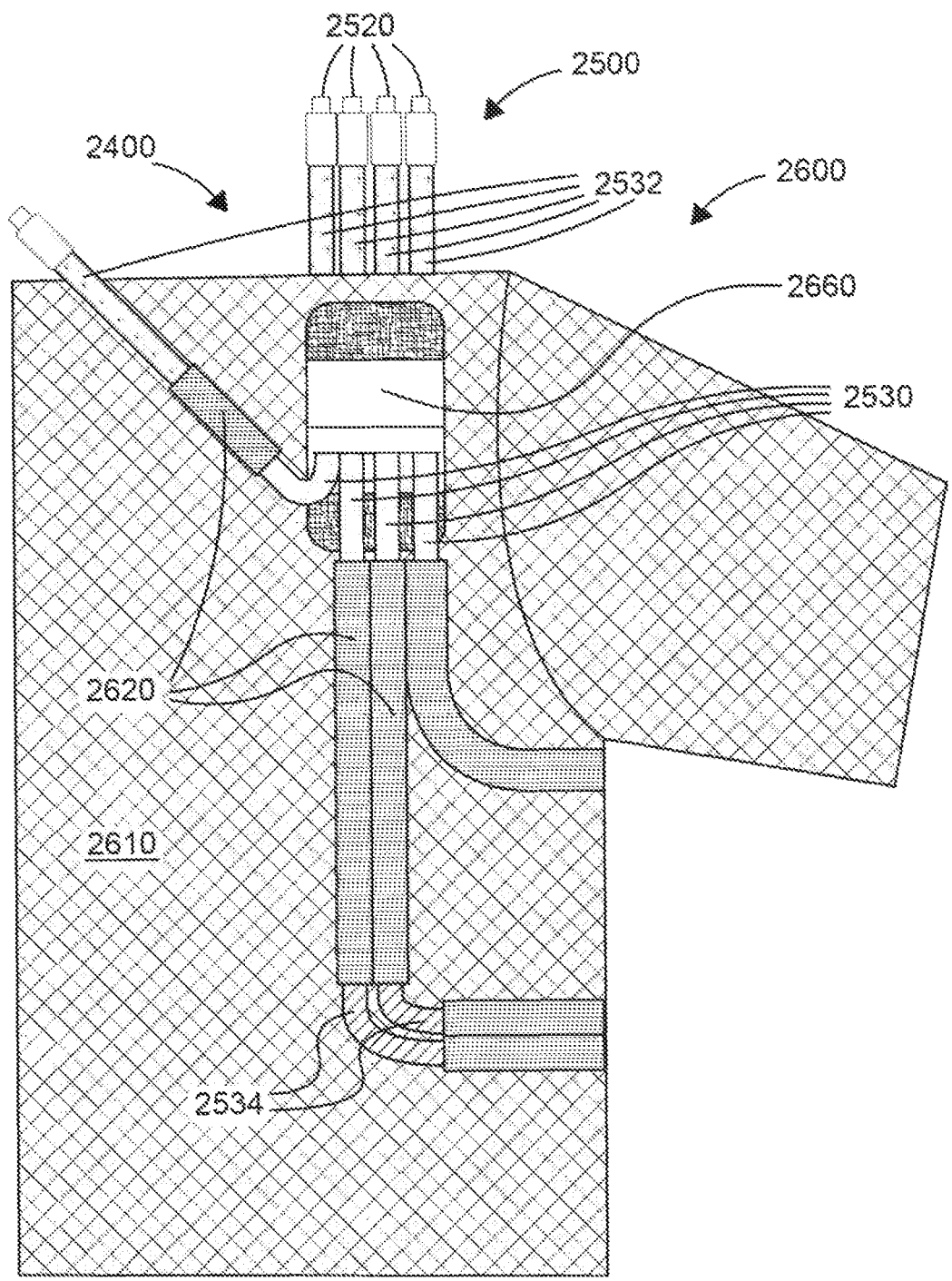

FIG. 41 is a detail view of a blood plumbing system of an exemplary emergency casualty care trainer, according to one embodiment of the disclosure.

Figure 42:
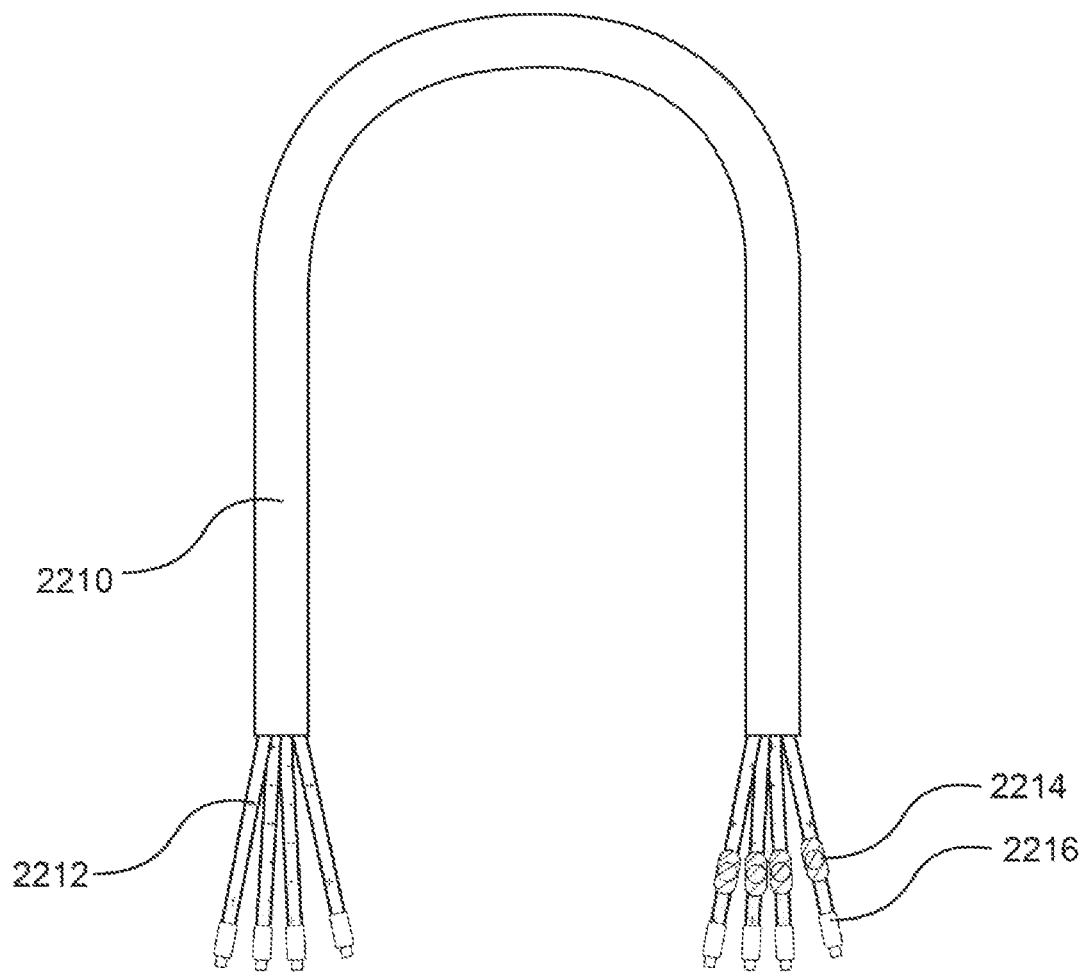

FIG. 42 shows a flow harness of a blood supply system of an exemplary emergency casualty care trainer, according to one embodiment of the disclosure.

Open Surgery Simulator

Figure 43:
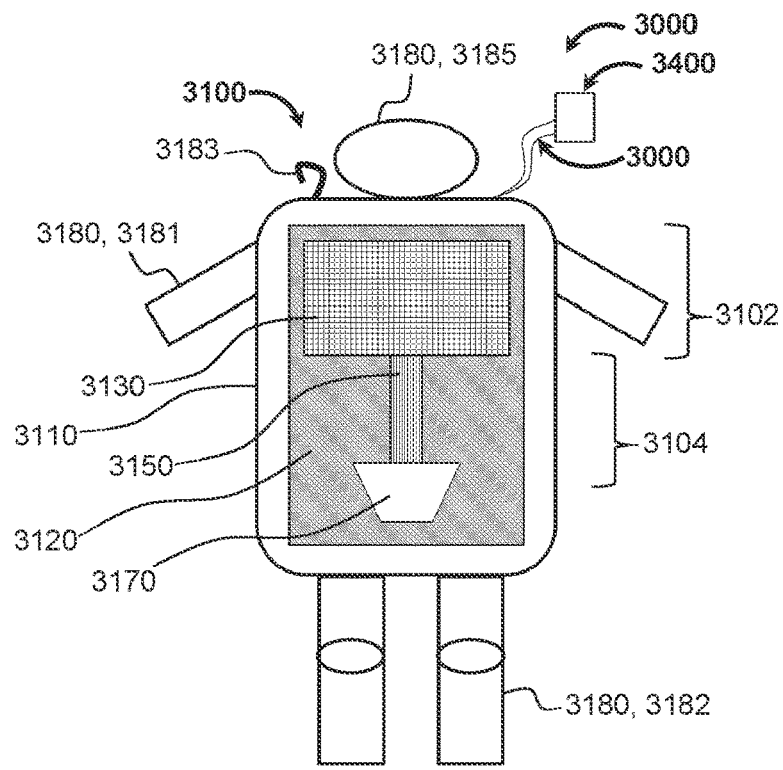

FIG. 43 is a schematic diagram of an exemplary open surgery simulator, according to one embodiment of the disclosure.

Figure 44:
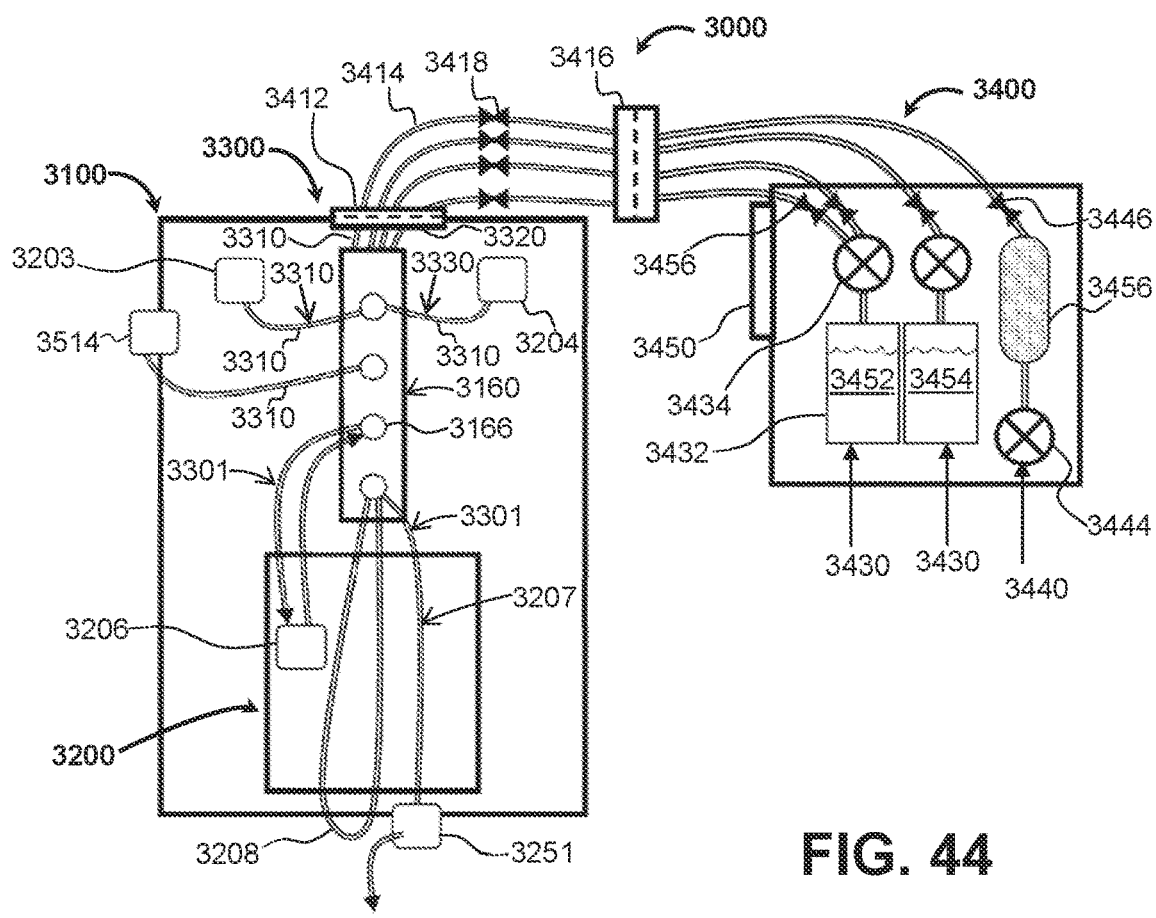

FIG. 44 is a schematic diagram of an exemplary open surgery simulator, showing aspects of its fluid system, according to one embodiment of the disclosure.

Figure 45:
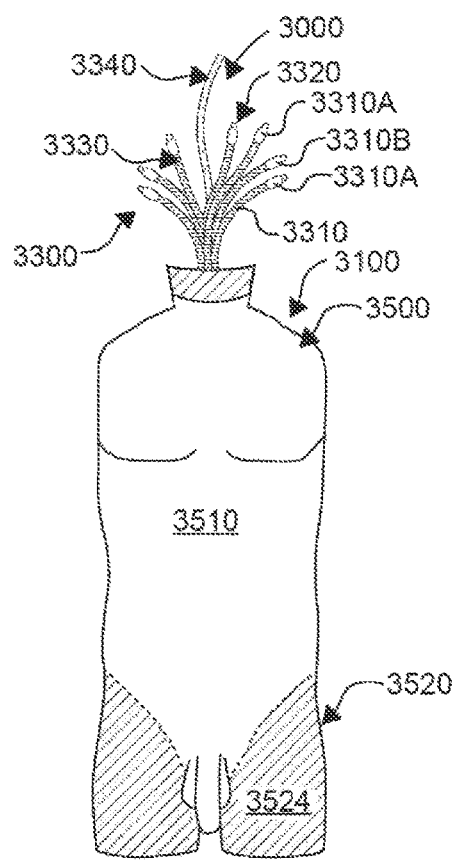

FIG. 45 is a front view of an exemplary open surgery simulator, according to one embodiment of the disclosure.

Figure 46:
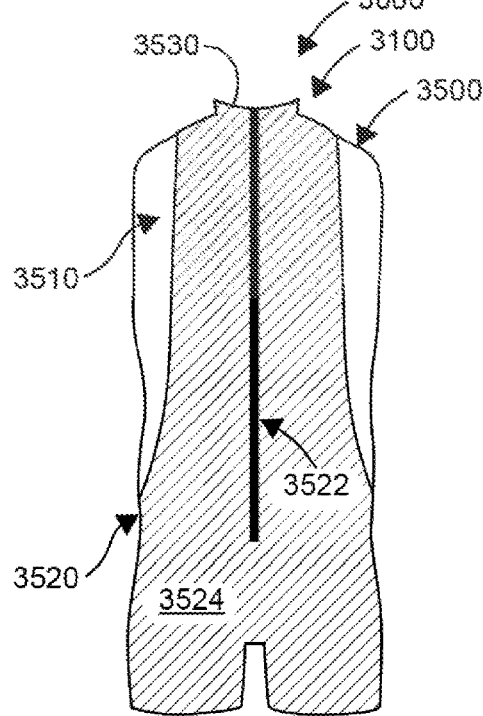

FIG. 46 is a back view of the open surgery simulator of FIG. 45.

Figure 47:
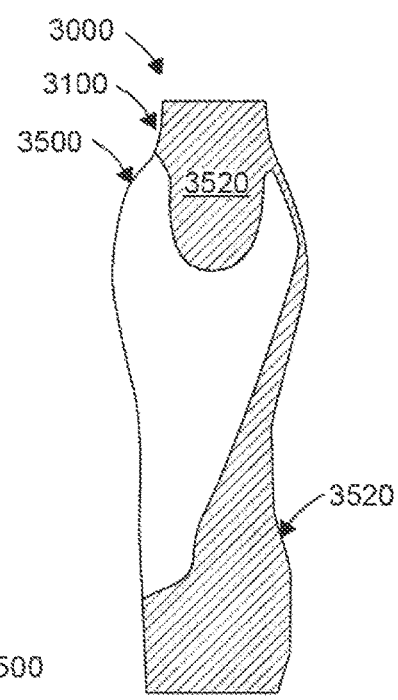

FIG. 47 is a left side view of the open surgery simulator of FIG. 45.

Figure 48:
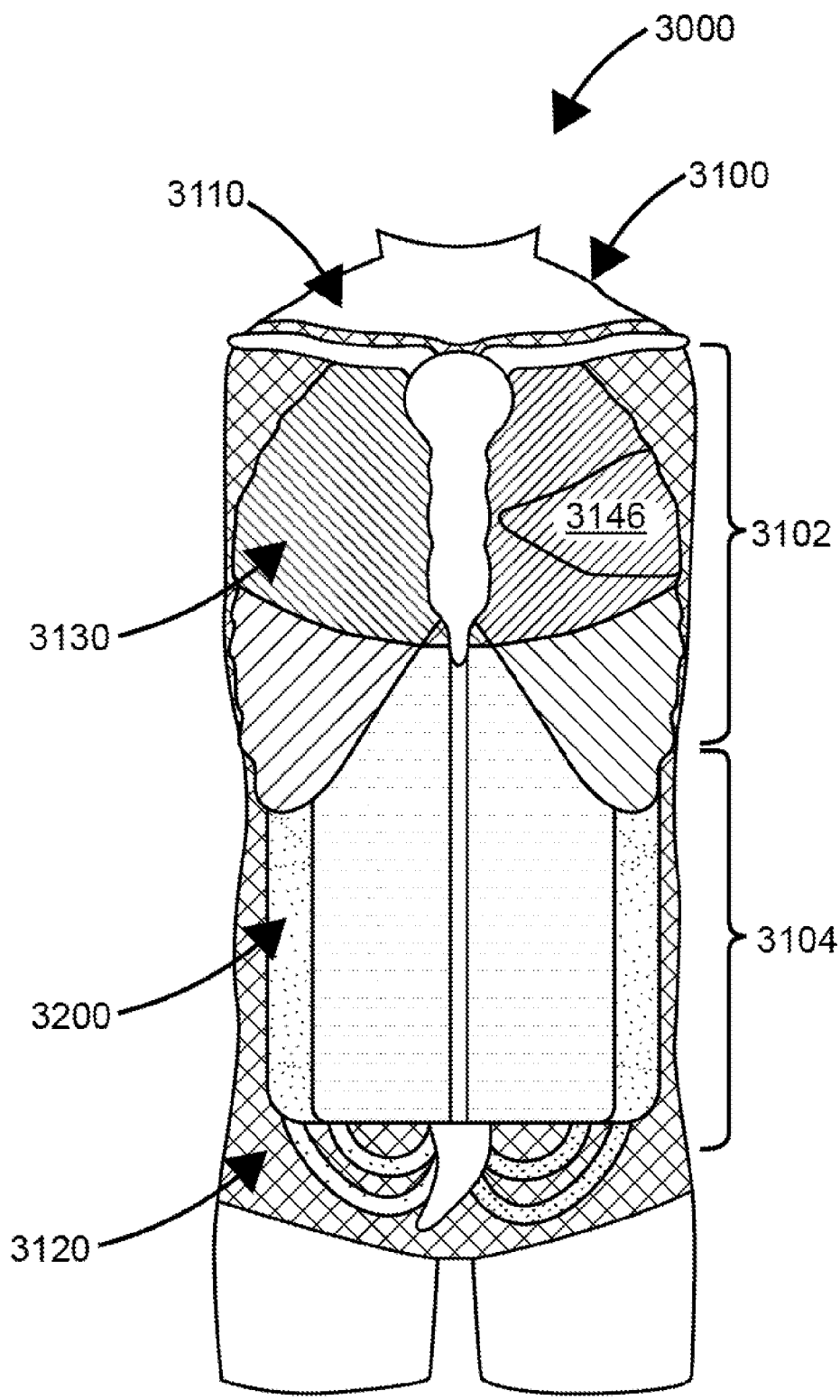

FIG. 48 is a front view of an exemplary open surgery simulator, showing an exemplary simulated torso, according to one embodiment of the disclosure.

Figure 49:
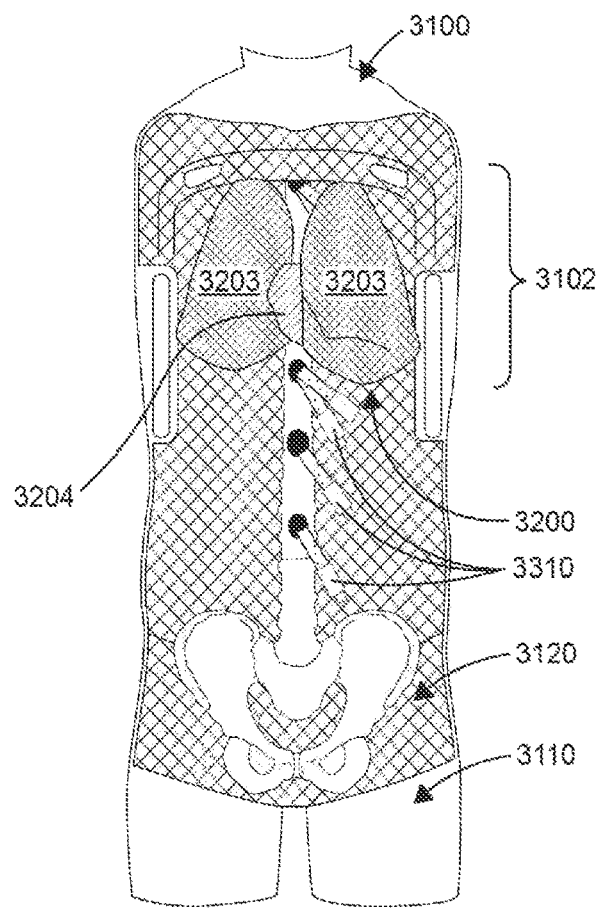

FIG. 49 is a front view of a detail of an exemplary open surgery simulator, showing a partially assembled chest cavity of an exemplary simulated torso, according to one embodiment of the disclosure.

Figure 50:
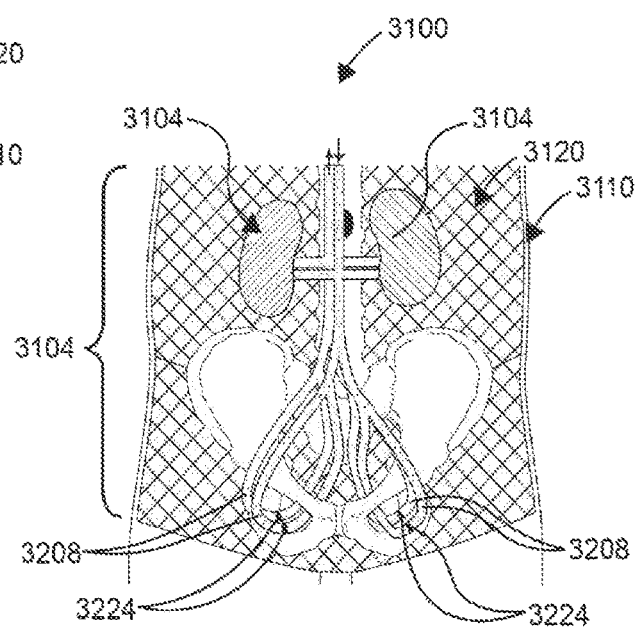

FIG. 50 is a front view of a detail of an exemplary open surgery simulator, showing a partially assembled abdominal cavity of an exemplary simulated torso, according to one embodiment of the disclosure.

Figure 51:
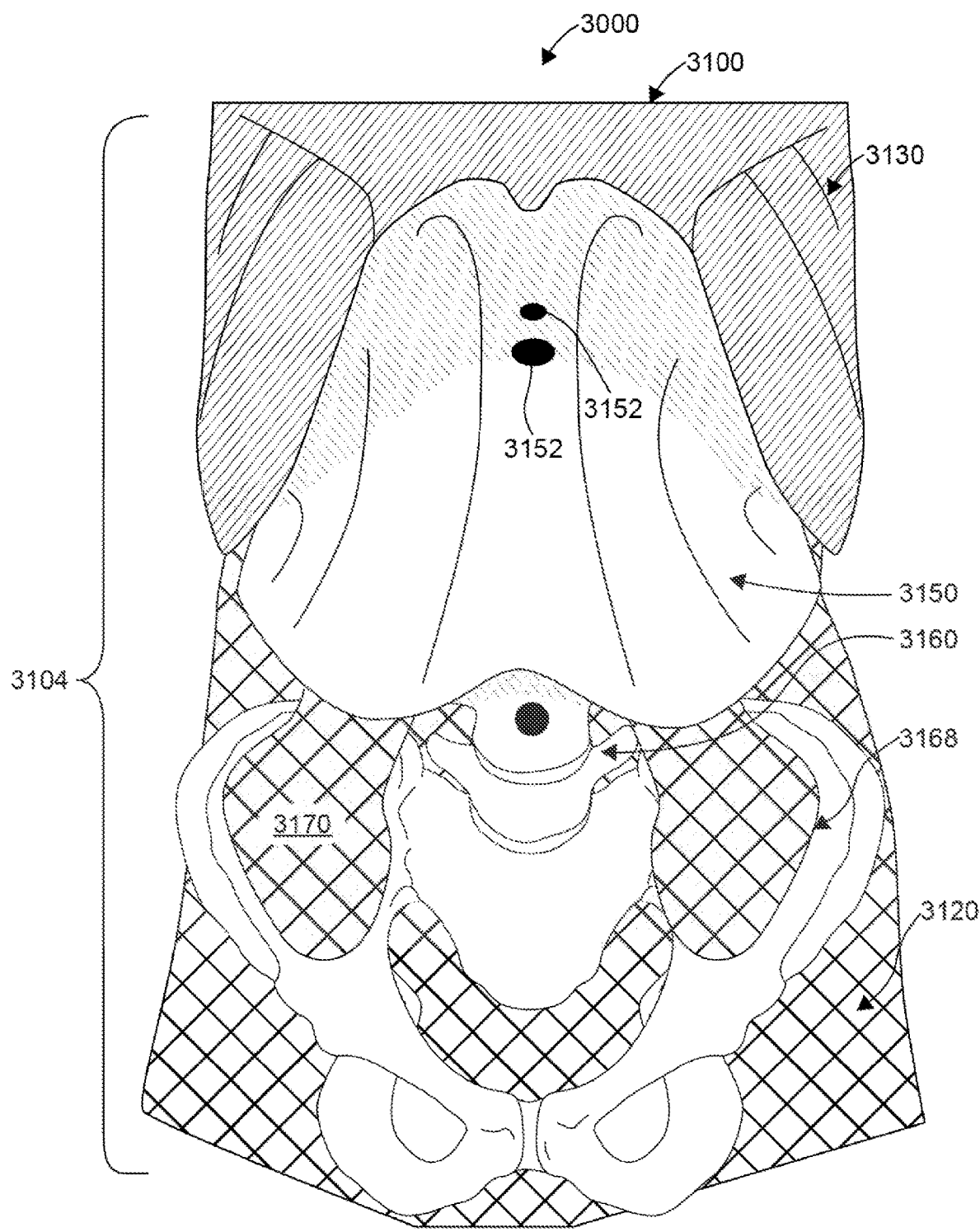

FIG. 51 is a front perspective detail view of the simulated torso, showing a simulated diaphragm, according to one embodiment of the disclosure.

Figure 52:
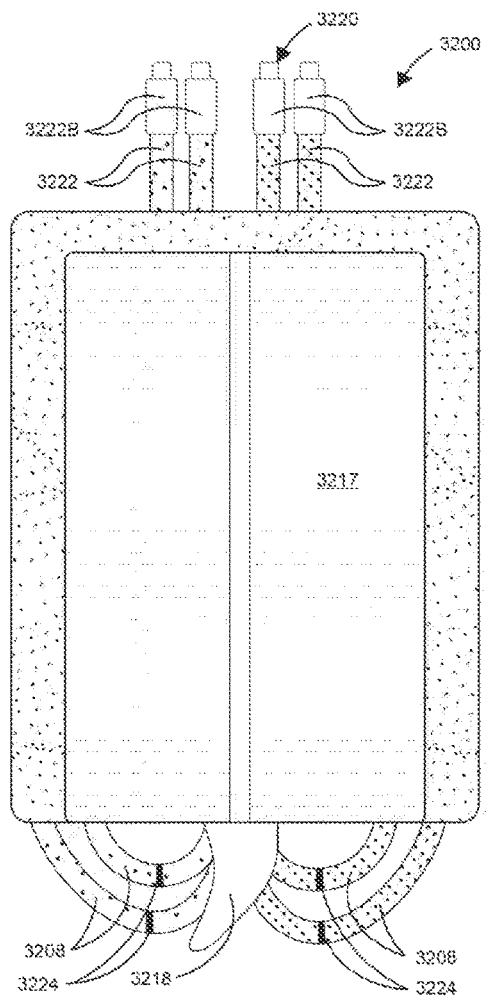

FIG. 52 is a front view of a detail of an open surgery simulator, showing an exemplary prosthetic internal organ module, according to one embodiment of the disclosure.

Figure 53:
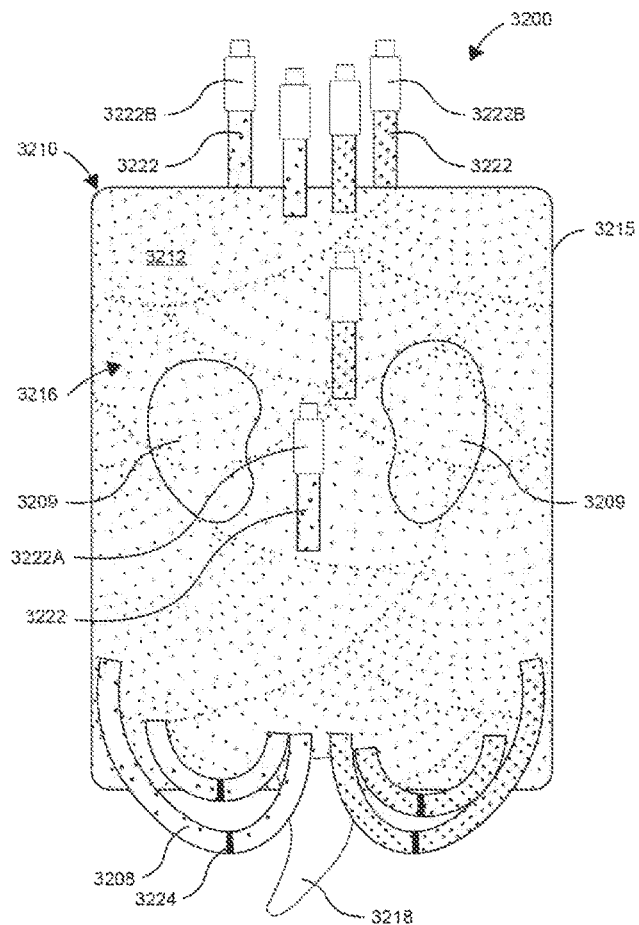

FIG. 53 is a back view of the prosthetic internal organ module of FIG. 52.

Figure 54:
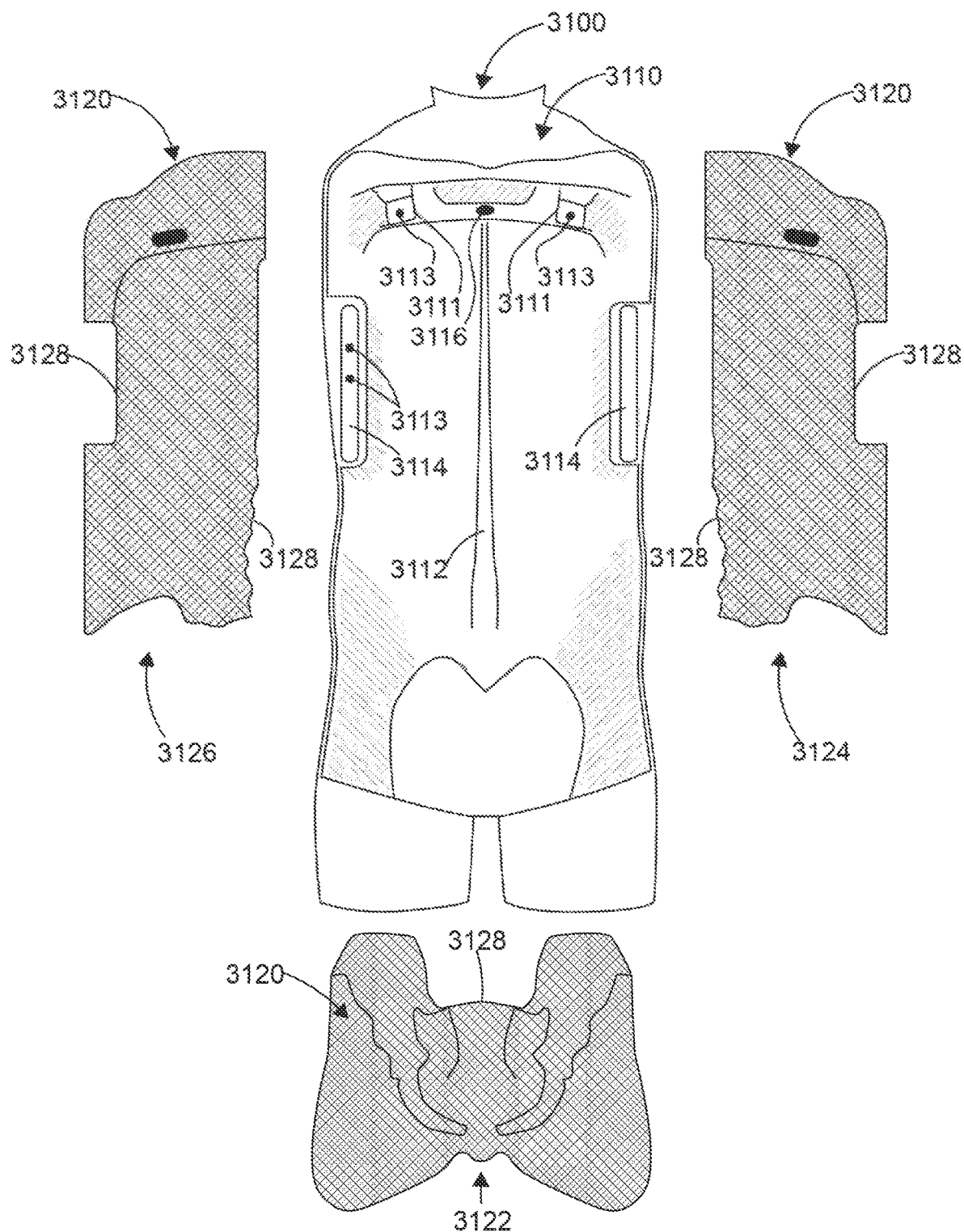

FIG. 54 is an exploded front view of details of an the simulated torso, according to one embodiment of the disclosure.

Figure 55:
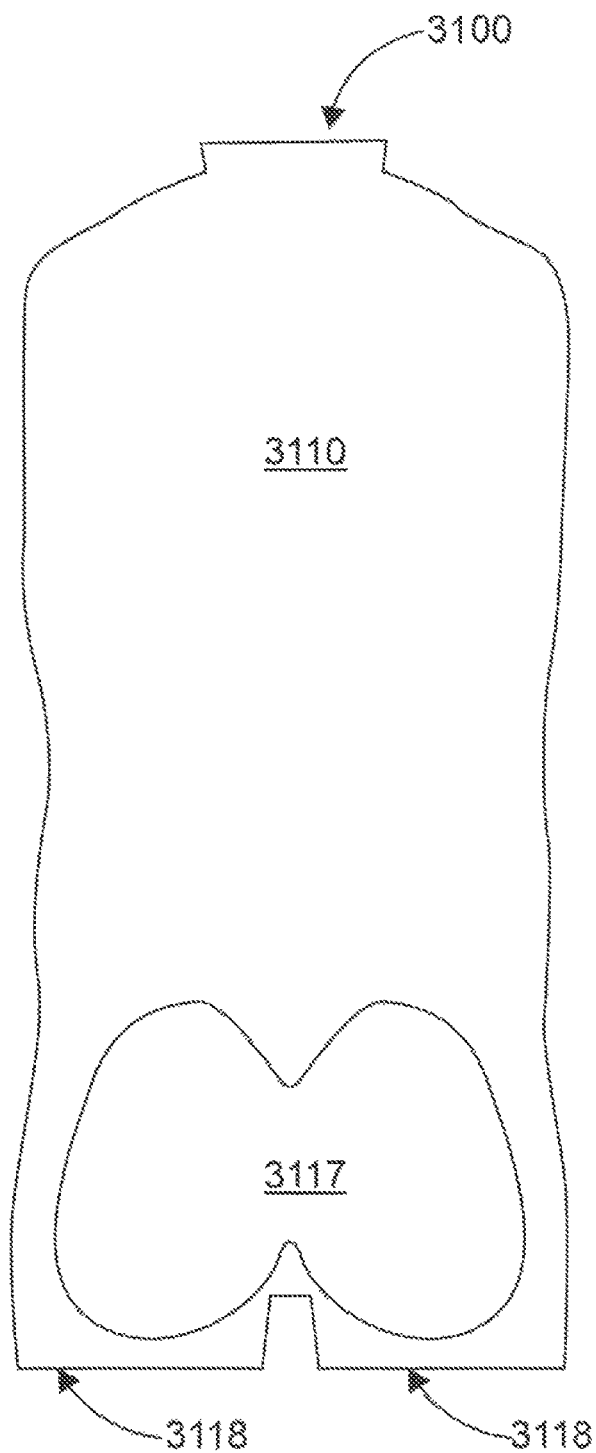

FIG. 55 is a back view of a detail of an the simulated torso, according to one embodiment of the disclosure.

Figure 56:
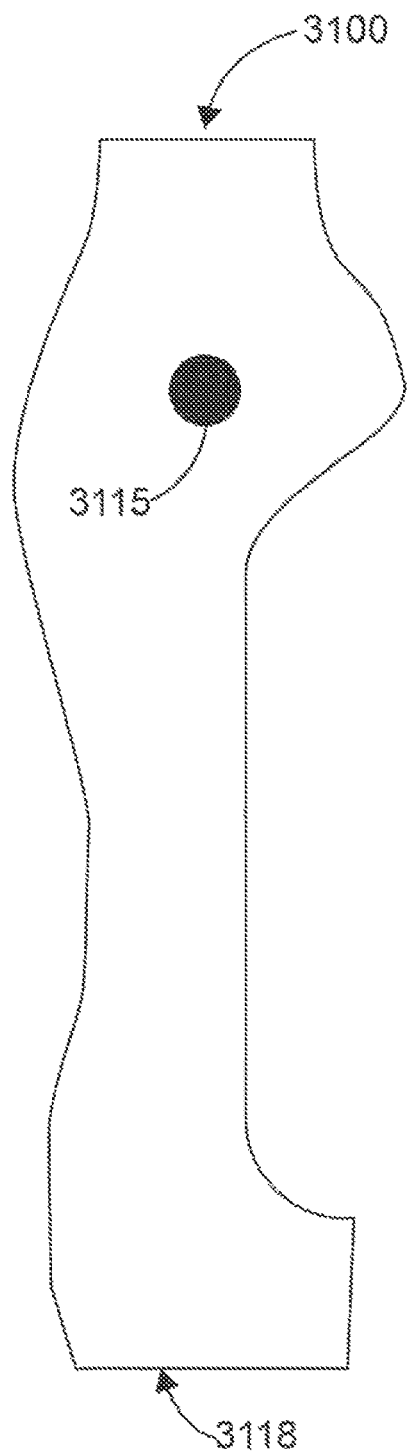

FIG. 56 is a right side view of a detail of an the simulated torso, according to one embodiment of the disclosure.

Figure 57:
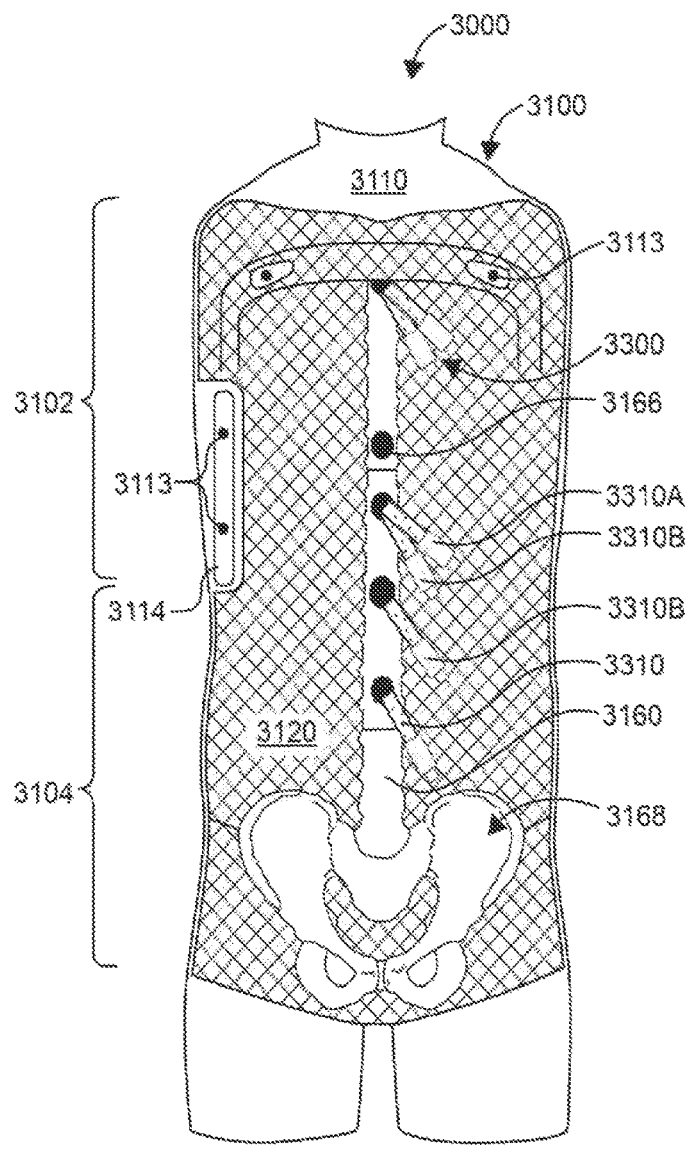

FIG. 57 is a front view of a detail of an the simulated torso, according to one embodiment of the disclosure.

Figure 58:
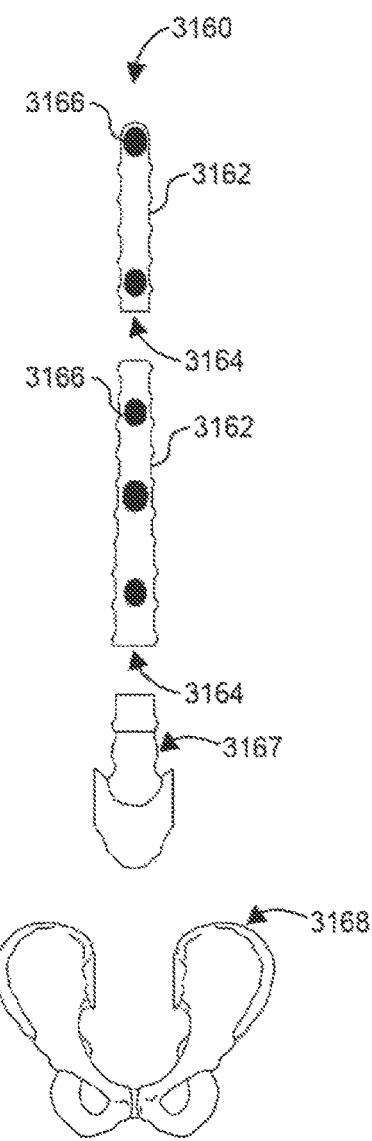

FIG. 58 is an exploded front view of a detail of an the simulated torso, showing various skeletal sections, according to one embodiment of the disclosure.

Figure 59:
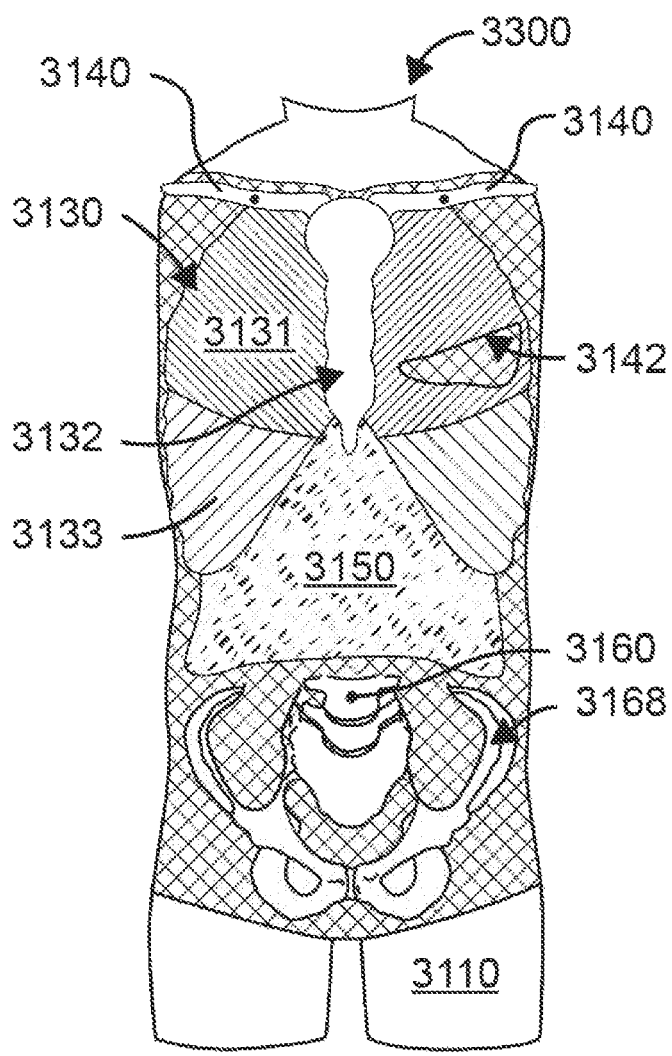

FIG. 59 is a front view of a detail of an exemplary open surgery simulator, showing an exemplary rib cage module installed with the simulated torso, according to one embodiment of the disclosure.

Figure 60:
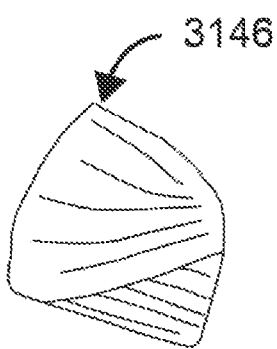

FIG. 60 is a front view of an exemplary muscle patch, according to one embodiment of the disclosure.

Figure 61:
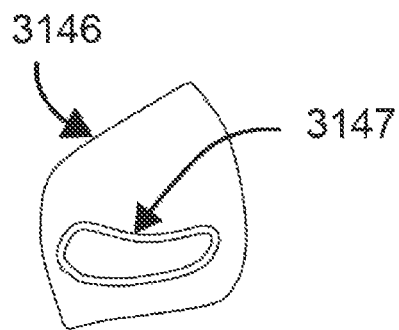

FIG. 61 is a back view of the muscle patch of FIG. 61.

Figure 62:
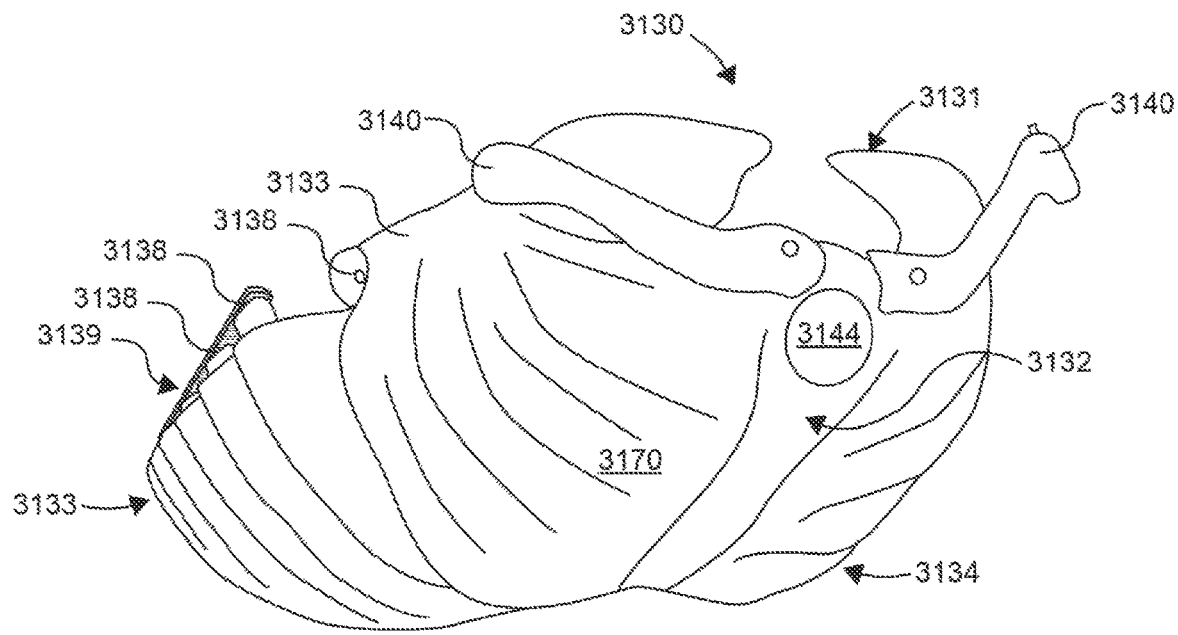

FIG. 62 is an upper front perspective view of an exemplary rib cage module, according to one embodiment of the disclosure.

Figure 63:
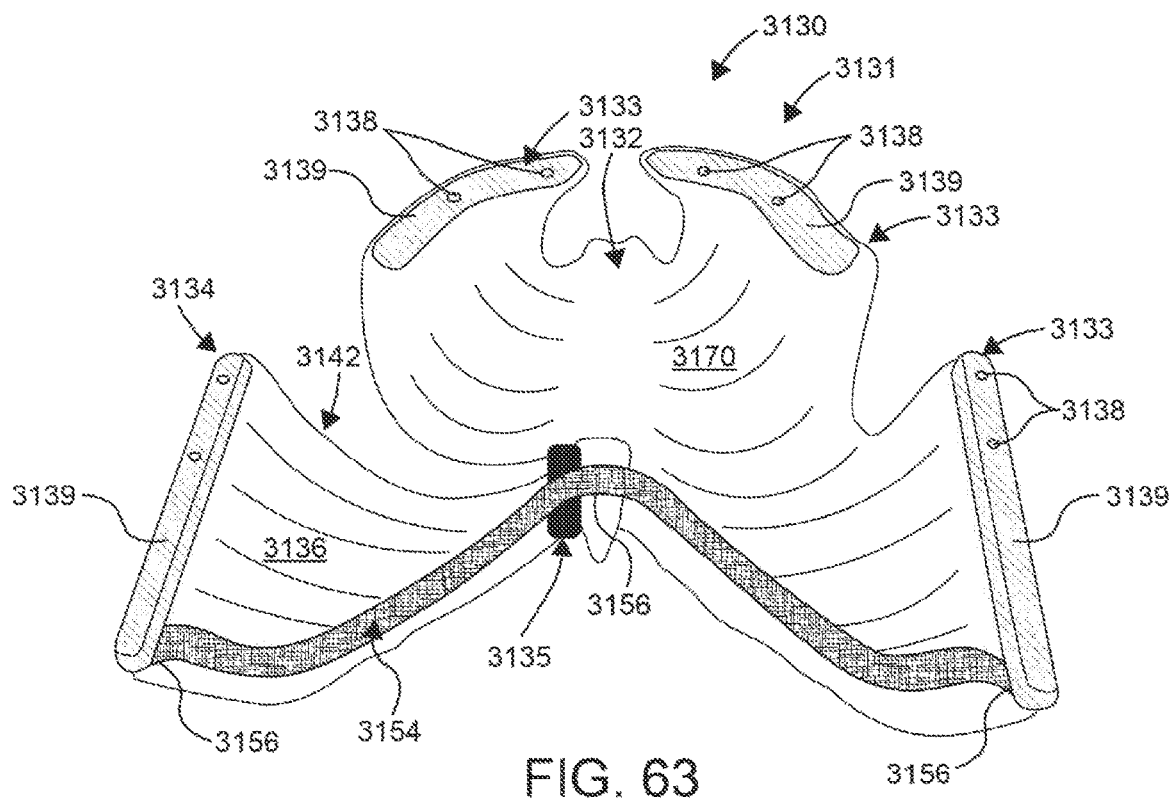

FIG. 63 is a lower back perspective view of an exemplary rib cage module, according to one embodiment of the disclosure.

Figures 64, 65:
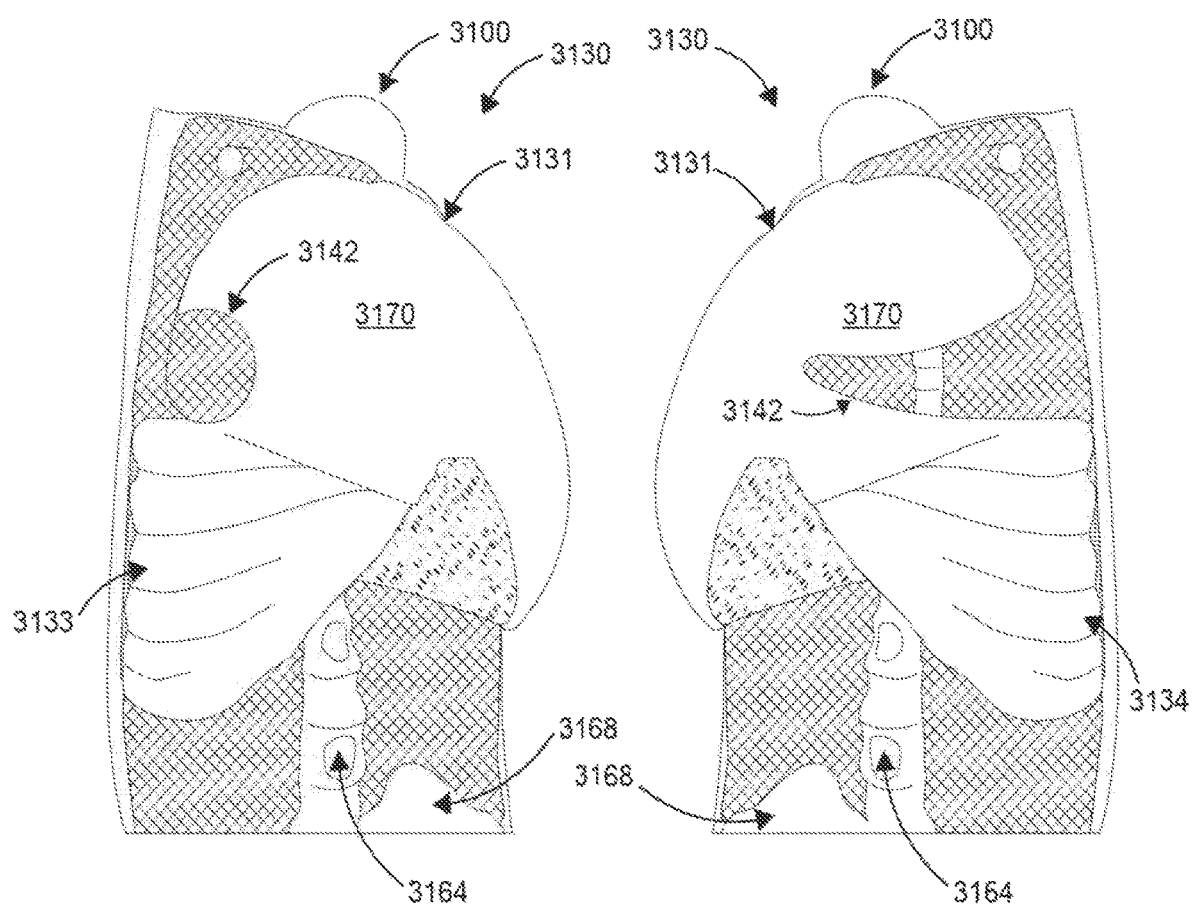

FIG. 64 is a right side perspective view of an exemplary rib cage module, according to one embodiment of the disclosure.

FIG. 65 is a left side perspective view of an exemplary rib cage module, according to one embodiment of the disclosure.

DETAILED DESCRIPTION

The novel features of this disclosure, as well as the disclosure itself, both as to its structure and its operation, will be best understood from the following description taken in conjunction with the accompanying drawings.

The present disclosure pertains to systems, devices, and methods for use in medical simulation and training, providing realistic-looking medical effects. More particularly, the present disclosure pertains to systems, devices, and methods for simulating an open surgery environment, including dynamic features and aspects commonly found in trauma, emergency, and combat events. The medical trainers disclosed herein may further include features directed toward to internal and/or external trauma injuries.

Aspects of the present disclosure relate to a wearable device for simulating wounds and injuries received during a trauma event, and performing associated surgical tasks. A wearable device may be worn by a live human (e.g., trauma actor) or simulated body (e.g., full/partial manikin, drag dummy, etc.). The medical trainers disclosed herein may include one or more simulated injuries, which may be operational (e.g., bleeding wound) or merely to provide more realism (e.g., surface wound).

Aspects of the present disclosure further relate to a medical training device for Trauma Emergency Casualty Care and Tactical Combat Casualty Care (TCCC), including hemorrhage control. The devices, systems, and methods disclosed herein may realistically simulate the wounds and injuries that a person may receive during a trauma event, and which may be useful as a training aid for providing realistic-looking trauma conditions to first responders. Aspects of the present disclosure further relate to an open surgery simulator, which may stand alone or work in combination (e.g., wear) various wound and injury simulators.

The present disclosure is particularly, but not exclusively, useful as a training aid for providing realistic-looking medical effects to first responders, in a dynamic presentation, when practicing first aid on a person who has experienced trauma resulting in a hemorrhaging wound, and other wound. For example, in contrast to an academic setting where internal organs are presented in isolation, in a reality, multiple organs are typically grouped in a particular arrangement, in a wet environment, and are connected to and/or covered with interstical tissue reflections, fatty tissue, ligaments, etc.

Further, various internal organs are enveloped or otherwise packaged in local membranes. For example, in the human body, the lungs are surrounded by the pleural membrane (thin layer of tissue that lines the pleural cavity, the space that surrounds the lungs and lies underneath the chest wall). Also for example, most of the intra-abdominal (or coelomic) organs are covered by the peritoneum (serous membrane forming the lining of the abdominal cavity composed of a layer of mesothelium supported by a thin layer of connective tissue, which supports many of the abdominal organs and serves as a conduit for their blood vessels, lymphatic vessels, and nerves). Also for example, the small intestines are covered by the greater omentum which doubles back to ascend to the transverse colon before reaching to the posterior abdominal wall (large apron-like fold of visceral peritoneum that hangs down from the stomach). Also for example, hanging down from the liver is the lesser omentum (which is smaller than the greater omentum).

Aspects of medical trainers disclosed herein (e.g., an emergency casualty care trainer, open surgery simulator, etc.) may be configured for and thus used for realistic training on procedures to treat the three most preventable causes of death on the battlefield or in civilian trauma situations. In particular, the emergency casualty care trainer may be configured for training on massive hemorrhage (i.e., responsive to managed using tourniquets, hemostatic dressings, junctional devices, and pressure dressings). Also, the emergency casualty care trainer may be configured for training on airway management (i.e., responsive to the airway being managed by rapid and aggressive opening of the airway—to include cricothyroidotomy). Also, the emergency casualty care trainer may be configured for training on respiration and breathing management (i.e., responsive to respiration and breathing being assessed for tension pneumothorax, and managed by the aggressive use of needle decompression devices to relieve tension and improve breathing).

In this context, and of particular importance for the present disclosure, are those medical procedures that are required for response to a life-threatening, emergency situation. The import here is two-fold. Firstly, the partial task simulator should effectively augment the educational background that is necessary to assess an emergency situation. Secondly, it should serve as a tool with which a person can learn how to respond to an emergency situation by properly performing essential life-saving tasks. The efficacy of any partial task simulator or training aid, however, is dependent on the realism it provides and its ability to simulate or mimic an environment where the task is to be actually performed.

With the above in mind, a catastrophic event presents a situation wherein the proper training of emergency medical personnel can be invaluable. Regardless whether the event is the result of an accident, a natural disaster or some form of combat, the consequence of a first response to the event may make the difference between life and death. In such instances, the ability of medical personnel to rapidly and reliably attend to wounds and injuries is of crucial importance.

Practice on task simulators/medical trainers, such as medical manikins and open surgery simulators, are valuable teaching aids. Further, one medical trainer can be used to train several trainees at the same time by allowing one trainee to perform the actual medical procedures required by the simulation while the other trainees observe the response. In addition, the task simulator/medical trainer can be used to train trainees to assist a lead responder when performing the medical procedures. When the simulation comes to an end, the training device can be reset to allow the next person to perform the medical procedure, thereby increasing the training value of the simulation.

In light of the above, it is an object of the present disclosure to provide a device for realistically and dynamically simulating the wounds and injuries on a person (e.g., role player, actor) that can be received during a traumatic event. Another object of the present disclosure is to provide a device that effectively functions as a training aid to teach a person how to treat the wounds and injuries that can be received by a person during a traumatic event. Another object of the present disclosure is to provide a device that effectively functions as a training aid that allows verbal and gesticular interaction between a live human wearing the device and a first responder who is treating the person wearing the device. Still another object of the present disclosure is to provide a training aid for teaching how to treat wounds and injuries that is easy to use, is simple to manufacture and is comparatively cost effective. Yet another object of the present disclosure is to provide a field deployable training tool for advanced surgical skills training which may be remote from a preparation facility.

Partial Task Surgical Simulator

In accordance with the present disclosure, a partial task surgical simulator (training aid device) is provided for simulating the wounds and injuries on a role player, actor or model that could be received by a person during a trauma event. Specifically, the device includes a raiment fitting over strapped vests that are dimensioned to cover the torso of a person and therefore be worn by a person in a simulation. Further, the raiment can extend over the person's shoulders and upper arms, as well as over his/her groin area and upper thighs. Structurally, the raiment is made primarily of silicone and nylon fiber, and it is formed as a layer having an inner surface and an outer surface, with the outer surface having a color and a texture that is comparable to human skin. The vest is designed to fit under the raiment and on the torso of a body. Structurally, the vest is made primarily of silicone, nylon fiber, plastic and rubber materials, and it is formed as a shield portion covering the front and side of the torso held in place by straps. The vest provides a protective layer between the raiment and the model or actor. The vest is further designed to provide a detail of the internal structure of a human body, such as the rib cage and internal organs. The vest forms a cavity generally under and below the rib cage in which such prosthetic internal organs can be placed. The importance of the disclosure is that the simulator presents first responders with realistic-looking, dynamic medical effects that can simulate and mimic a plurality of different wounds and injuries.

As part of the presentation for simulating a trauma event, the device of the present disclosure comprises a wound simulator that can be selectively attached to the outer surface of the raiment. The wound simulator can then simulate either surface or penetrating wounds and injuries. For example, the wound simulator can be used to simulate surface injuries such as burns, scrapes, abrasions, or the effects of chemical, biological or nuclear agents, or the result of internal injuries from punctures and other injuries. Additionally, the wound simulator can be used to simulate penetrating injuries such as high and low velocity missile wounds caused by gunshot, shrapnel, and blunt/sharp object penetration.

In order to provide added realism for the simulation of penetrating wounds, the raiment is formed with at least one orifice on its outer surface. Further, the raiment includes at least one fluid reservoir that is formed into the layer of the raiment, between its inner and outer surfaces. Specifically, the reservoir is provided for holding a blood-like fluid, and it is connected in fluid communication with the orifice. Thus, the person who is wearing the raiment can selectively expel the blood-like fluid from the reservoir and through the orifice, merely by squeezing the reservoir, to simulate bleeding. Depending on the particularly desired presentation, a wound simulator may be juxtaposed with the orifice to simulate bleeding from the wound.

In addition to the outward appearances of traumatic wounds and injuries mentioned above, the present disclosure also employs prosthetics to mimic certain internal organs and anatomical structures that may be affected by the trauma event. These prostheses are made of composite materials such as open or closed cell polyurethane foam of various densities, elasticity, and deformation characteristics to simulate internal organs. Specifically, these prostheses can be used to mimic torso injuries (e.g., abdominal, upper torso; as well as other injuries, such as thorax wounds/injuries).

For the simulation of penetrating wounds, the present disclosure includes access through the raiment, such as through an orifice, to internal organs within the cavity of the vest. Further, the orifice, wound simulators, reservoirs and internal organs are positioned and juxtaposed to simulate various injury scenarios, which may be selectively done. For example, the organs may include a predetermined length of flexible tubing that is comparable in appearance and texture to intestines. When used, this pseudo intestine is positioned between the vest and the inner surface of the raiment. Further, a portion of the pseudo intestine can be juxtaposed with at least one orifice in the raiment for use in simulating the penetrating abdominal wound within the torso cavity. Similar simulations can be used for various upper torso injuries (e.g., lungs, heart, kidneys, stomach, etc.).

Figure 1:
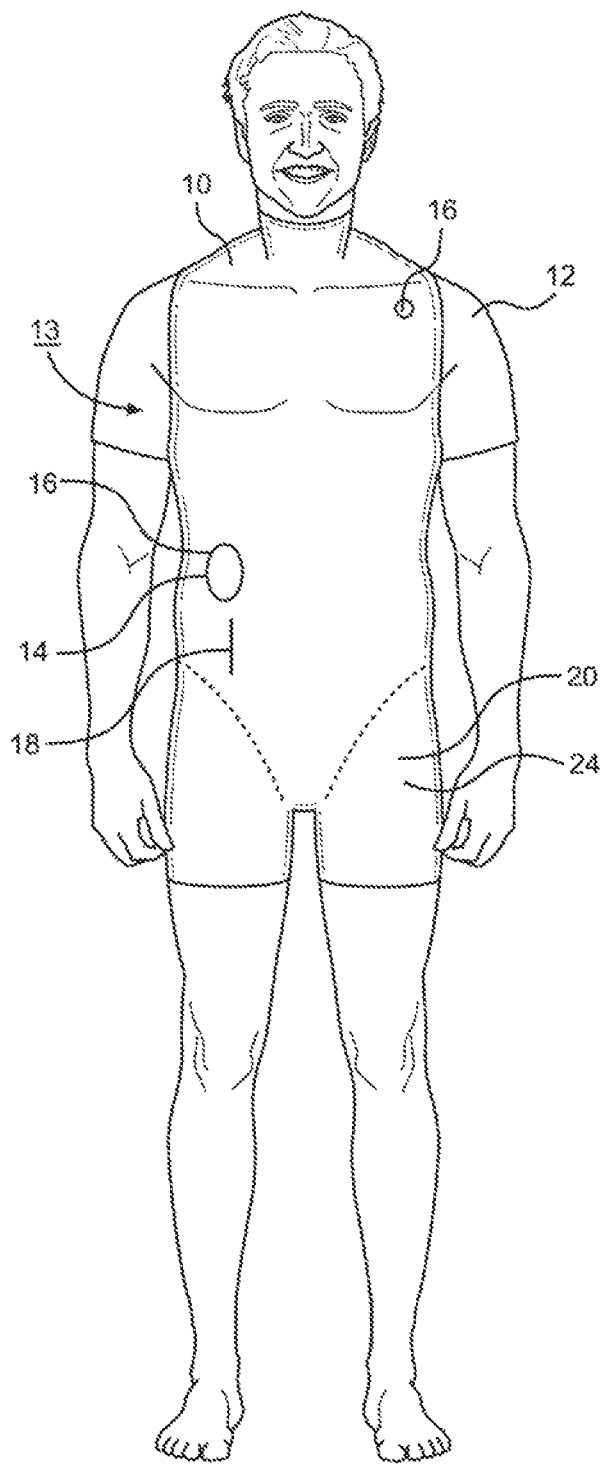
FIG. 1 is a front view of a raiment in accordance with the present disclosure mounted on a human body.

Referring initially to FIG. 1, a simulator in accordance with the present disclosure is shown and designated 13. As shown, a raiment in accordance with the present disclosure is also shown and designated 10. As shown, the raiment 10 is dimensioned and fitted to cover a person 12 (e.g., person, role player, actor, model). As such, the raiment 10 is a base member of the simulator 13. More specifically, the raiment 10 is intended to be wearable by a person. Accordingly, it is intended to cover the torso of a person 12, and to extend over the shoulders, upper arms, groin area and upper thighs of the person 12. For purposes of this disclosure, the person 12 is shown in FIG. 1 to present these anatomical features. FIG. 1 also indicates that a wound simulator 14 can be used with the raiment 10, and that the raiment 10 can be formed with an orifice 16 from which a blood-like fluid 18 can be expelled. For example, the wound simulator 14 can be used to simulate surface injuries such as burns, scrapes, abrasions, radiation, or the result of internal injuries from punctures and other injuries. Additionally, the wound simulator 14 can be used to simulate penetrating injuries to the internal cavity of the human torso. As further shown in FIG. 1 (and FIGS. 3A and 3B), blood-like fluid 18 may be expelled in various ways (e.g., patches, spots, drops, drips, puddles, ooze spots).

As further shown in FIG. 1, the raiment 10 is made of a layer 20 having an outer surface 24. Preferably, the layer 20 is made of a silicon material that contains nylon fibers. However, other materials may also be used, such as carbon fibers, other composite materials, latex and other rubber materials. In any event, the layer 20 must be sufficiently flexible to allow it to be worn by a person 12 as the person 12 moves to mimic the motions of a severely injured victim of a traumatic event. For this purpose, the outer surface 24 of the raiment 10 is preferably colored and textured to simulate human skin. In alternative embodiments, portions of inner layer 22 may be resin coated to protect the person 12 from being cut, such as by a surgical instrument in simulating trauma events and response to trauma events.

Figure 2A:
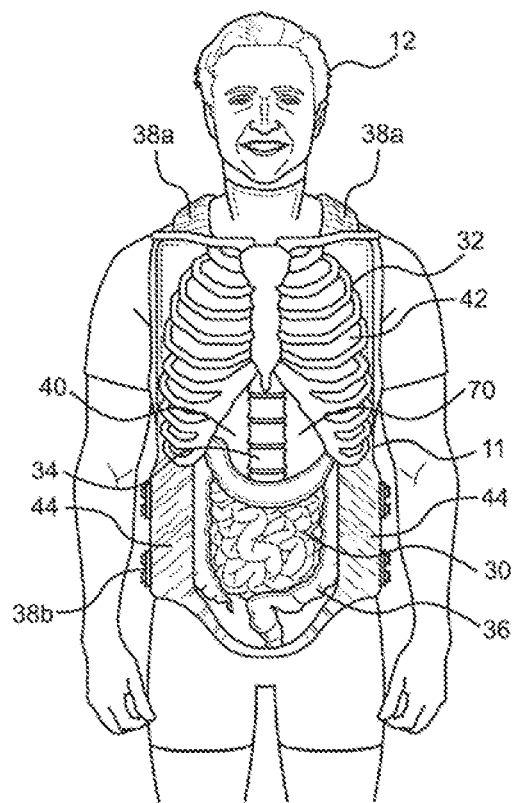
FIG. 2A is a perspective view of a vest in accordance with the present disclosure mounted on a human body.

Referring to FIG. 2A, a vest in accordance with the present disclosure is also shown and designated 11. As shown, vest 11 is dimensioned to fit on the torso of a person 12 underneath the raiment 10. Vest 11 is fitted onto a person 12 by portions 40, 42 and 44 and straps 38a and 38b. More specifically, vest 11 has a first portion 40 covering at least part of the chest of a person 12. Portion 40 is akin to a shield. Portion 40 may be used to protect the person 12 in the course of simulating trauma events and responses to trauma events. Accordingly, it may be made of rigid material, such as polyurethane resin or resin coated.

Vest 11 has a second portion 42 attached to the first portion 40 and forms a cavity 34 in the general area between the first and second portions 40, 42. Vest 11 also has third and fourth side portions 44 attached to the first portion 40 and covering at least part of the sides of the torso of a person 12. Portions 44 may be integrated into portion 40, such as being one continuous portion. Portions 44, 42 and 40 may also be integrated together into one piece constituting the major component of vest 11, other than straps 38. Portions 40, 42 and 44 may also be attached by various conventional mechanical means such as adhesives, fasteners, welding, melding and other joiners. Portions 40, 42 and 44 are preferably constructed of composite or plastic material, but other and additional materials may also be used, such as silicon material that contains nylon fibers, carbon fibers, other composite materials and latex and other rubber materials.

Figure 2B:
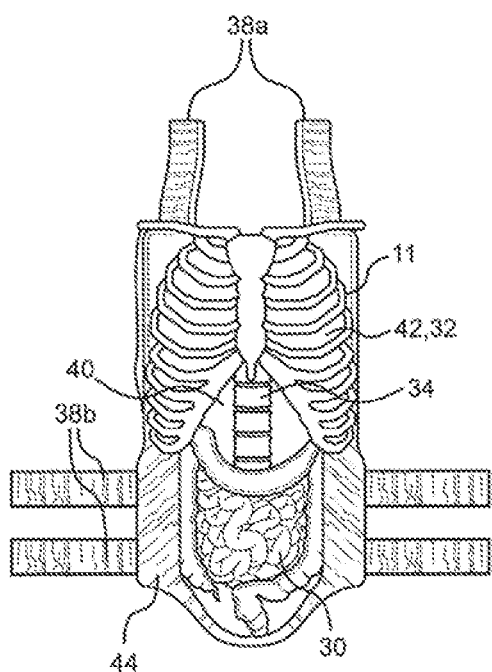
FIG. 2B is a front view of a vest in accordance with the present disclosure.

As shown in FIGS. 2A and 2B, portions 40 and 44 have front and back sides 70, 72. In general, the back sides 72 face towards person 12 and the front sides 70 face away from person 12. As also indicated in FIGS. 2A, 2B and 2C, front side 70 of portions 40 and 42 may be colored or textured to mimic or otherwise resemble the internal cavity of the torso of a body.

Figure 2C:
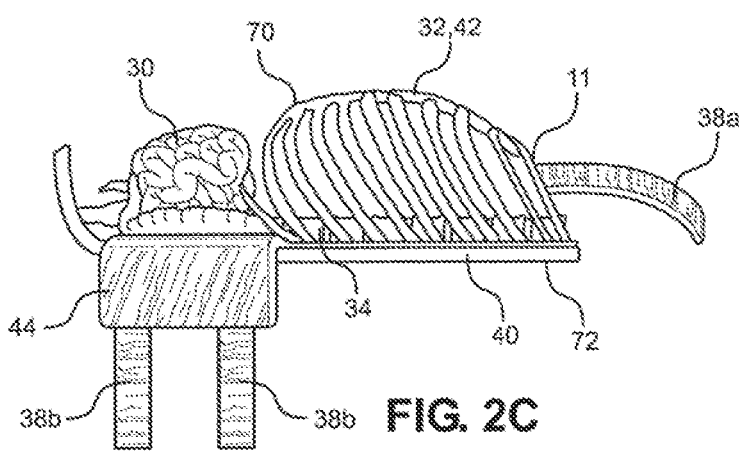
FIG. 2C is a side view of a vest in accordance with the present disclosure.

Also, as shown in FIGS. 2A, 2B and 2C, portion 42 is preferably made as an artificial rib cage 32. As such, portion 42, as rib cage 32, is a prosthetic resembling a human rib cage. Portion 42, including as rib cage 32, is positioned against the inner surface 22 of the raiment 10 (see also FIGS. 3A, 3B, 4) to simulate a skeletal structure. As also shown, at least one prosthetic internal organ 36 (e.g., intestine 30) is positioned within the cavity 34 of the vest 11.

Figure 4:
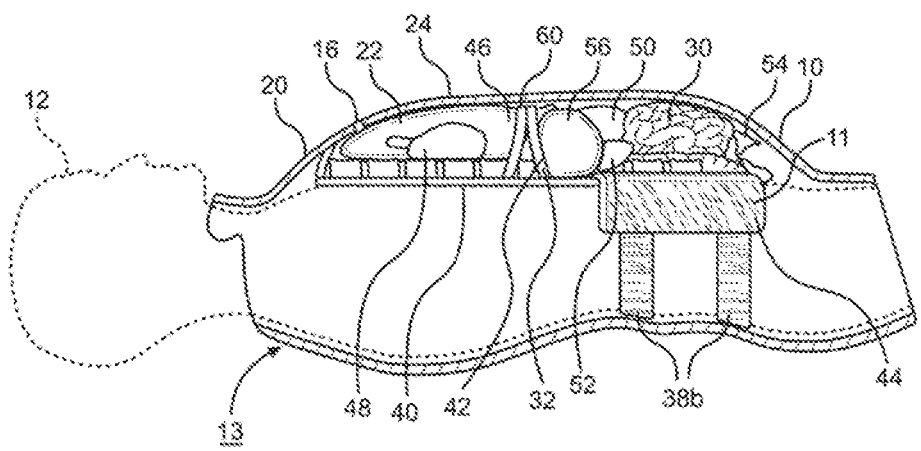
FIG. 4 is side view of a simulator in accordance with the present disclosure mounted on a human body with a cut away view of the vest underneath the raiment.
Figure 5:
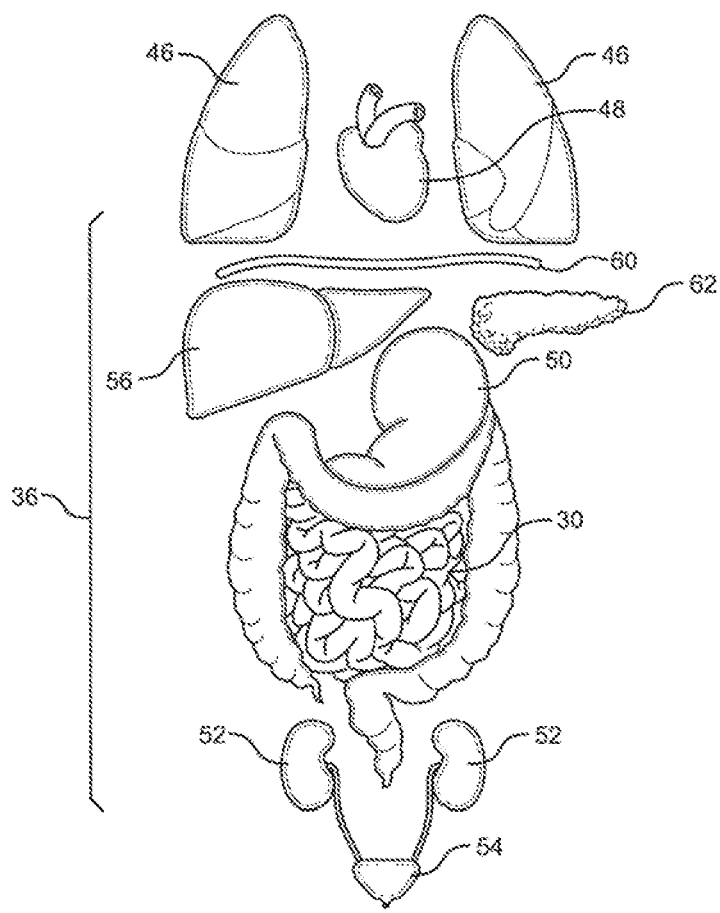
FIG. 5 is an exploded view of prosthetic internal organs of the present disclosure.

The one or more prosthetic internal organs 36 (e.g., intestine 30 as shown in FIGS. 2A, 2B, and 2C; lungs 46, heart 48, stomach 50, kidneys 52, bladder 54, liver 56, diaphragm 60 and spleen 62 as shown in FIGS. 4 and 5) are attached to vest 11 by fittings, adhesives, fasteners, welding, melding and other joiners. Alternatively, one or more prosthetic internal organ 36 may be positioned within cavity 34 of vest 11 without attachment to vest 11.

As further shown in FIGS. 2A, 2B and 2C, the vest 11 is intended to cover at least a part of the front of the torso of a person 12 and to fit over the person's shoulders or around the person's neck by straps 38a and around the torso of the person by straps 38b. Straps 38a are secured to portion 40 of vest 11 and may be secured together or to other straps by various well known means (e.g., buckles, ties, Velcro, etc.). Straps 38b are secured to portion 40 or 44 of vest 11 and may be secured together or to straps 38a in the same fashion.

Figure 3A:
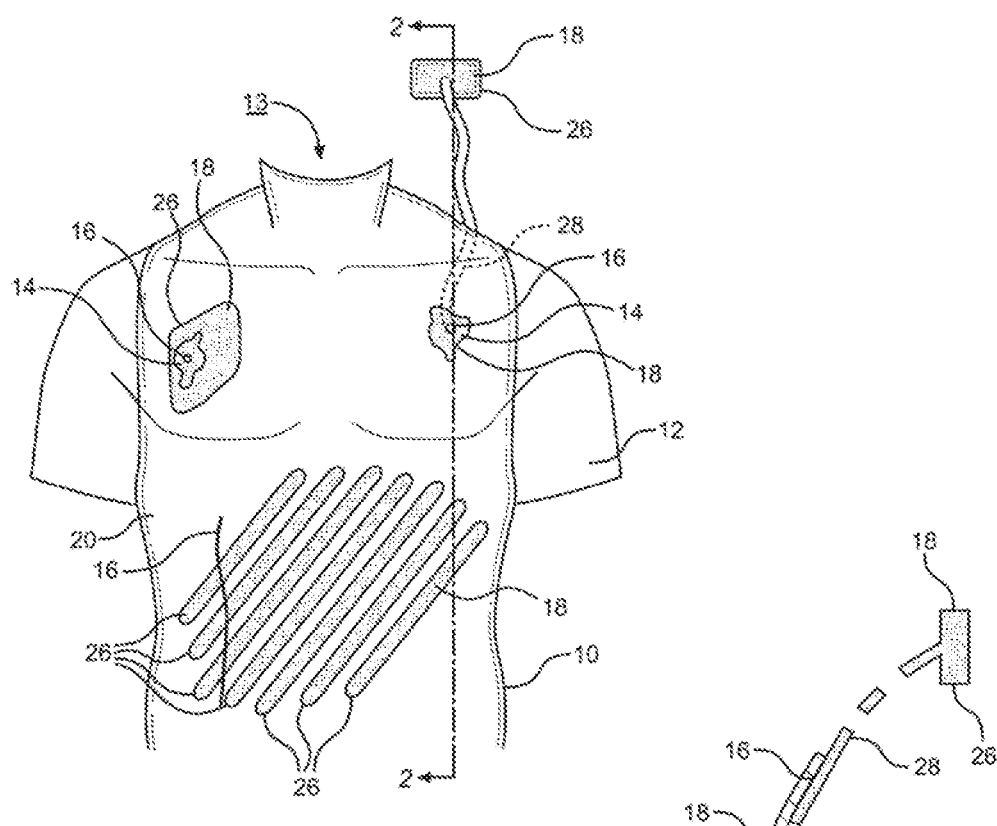
FIG. 3A is a perspective view of the simulator of the present disclosure with cut away views to show internal features of the raiment.
Figure 3B:
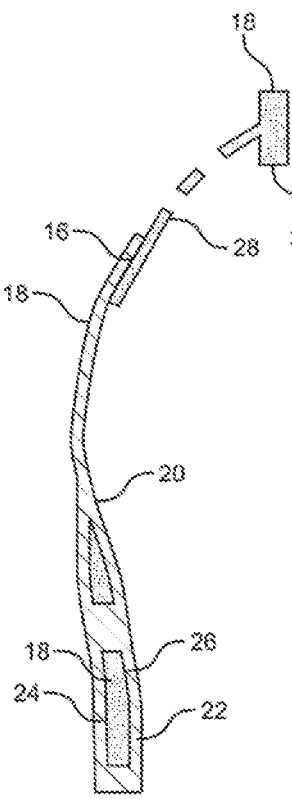
FIG. 3B is a cross sectional view seen along line 2-2 in FIG. 3A.

The structural aspects of the raiment 10 will be more fully appreciated by referencing FIGS. 3A and 3B. There it will be seen that layer 20 of the raiment 10 has inner surface 22 in addition to an outer surface 24. FIGS. 3A and 3B show that the layer 20 of raiment 10 can be formed with one or more reservoirs 26 for holding the blood-like fluid 18 therein. As shown, reservoirs 26 may be embedded in raiment 10 between inner and outer surfaces 22 and 24 or covered by raiment 10. Reservoirs 26 may constitute any shape, including generally rectangular or circular pockets (over the right chest area of person 12 in FIG. 3A), strand like pockets (over the stomach area of person 12 in FIG. 3A) or separate containers (over the left shoulder of person 12 in FIG. 3A). Reservoirs 26 may be attached to raiment 10 by fluid channels 28. Fluid channels 28 preferably constitute flexible tubing mounted under the outer surface 24 of the raiment 10 and may extend and join to reservoirs 26 proximate to or distant from the raiment 10. Tubing for fluid channels 28 may be of predetermined length. Fluid channels 28 constituting such tubing may be positioned against the inner surface 22 of the raiment 10 with a portion thereof juxtaposed with at least one orifice 16. For example, a fluid channel 28 is provided to connect the reservoir 26 in fluid communication with the orifice 16 for use in simulating a penetrating internal wound. Importantly, the reservoir 26 is positioned so it can be squeezed by a hand of a limb of the person 12 who is wearing the raiment 10. Reservoir 26 may be also positioned to be manipulated by the person 12 wearing the raiment 10 to expel blood like fluid 18 in alternative ways, such as by applying pressure with a limb to the reservoir 26 or by changing the position of person 12. This will then cause a portion of blood-like fluid 18 to be expelled from the reservoir 26 and through the orifice 16 to simulate bleeding. As shown, wound simulator 14 may be further aligned with orifice 16 to further simulate the injury, wound or other trauma event.

As shown further in FIG. 3B, reservoir 26 may be filled with blood like fluid 18 and may further be refillable via conventional means, such as filling fluid 18 into reservoir 26 via the same opening for connection of reservoir 26 to channel 28. Or reservoir 26 may be a separate container or pocket with a separate opening for filling reservoir 26 with fluid 18. As such, reservoir 26 may be used to expel fluid 18 for multiple uses. Reservoirs 26 are also preferably replaceable for multiple uses of simulator 13 to simulate multiple trauma events.

Referring back to FIG. 1, it will be appreciated that wound simulator 14 can be juxtaposed with the orifice 16 to simulate a bleeding abrasion. On the other hand, the orifice 16 can be presented as a puncture wound, substantially as shown in FIG. 1, without a surrounding wound simulator 14. By further example, orifice 16 can also present an opening to the cavity 34 of vest 11 to display and access one or more prosthetic internal human organs 36 during simulation of a penetrating wound to the human body. As intended for the present disclosure, the orifice 16 and the wound simulator 14 can be located anywhere on the raiment 10, as desired, to simulate a plurality of different wound/injury presentations. Also, the wound simulator 14 can be used alone to simulate gas or liquid agent injuries.

In addition to the superficial wound/injury presentations disclosed above, the present disclosure also envisions presentations for internal injuries. Specifically, with reference to FIGS. 4 and 5, it will be seen that the present disclosure includes various prostheses for use in simulating wounds/ injuries that might be received in a trauma event. These prostheses include: a prosthetic intestine 30, a prosthetic rib cage 32, prosthetic lungs 46, a prosthetic heart 48, a prosthetic stomach 50, prosthetic kidneys 52, a prosthetic bladder 54, prosthetic liver 56, prosthetic diaphragm 60 and a prosthetic spleen 62. In detail, for example, the prosthetic intestine 30 is a length of flexible hosing that is made to resemble a real intestine. Such flexible hosing may be used as fluid channel 28 or reservoir 26 to selectively expel blood like fluid 18. Alternatively, fluid channel 28 and reservoir 26 may be selectively attached to the hosing of intestine 30 to simulate bleeding from the intestine 30 during simulation of a trauma event. Similar arrangements can be made with respect to any of the organs 36.

Preferably, the prosthetic internal organs 36 (30, 46, 48, 50, 52, 54, 56, 60, 62) and rib cage 32 are made from composite, plastic or rubber materials. These prostheses of internal organs 36 (30, 46, 48, 50, 52, 54, 56, 60, 62) are most preferably made of composite materials such as open or closed cell polyurethane foam of various densities, elasticity, and deformation characteristics to simulate internal organs. Other and additional materials may also be used, such as silicon material that contains nylon fibers, carbon fibers, other composite materials and latex and other rubber materials. The prosthetic rib cage 32 is preferably made from rigid material, such as rigid polyurethane resin material. In use, both the prosthetic rib cage 32 and any desired combination of prosthetic internal organs (30, 46, 48, 50, 52, 54, 56, 60, 62) are positioned between the body of the person 12 (actor) who is wearing the raiment 10, and the inner surface 22 of the raiment 10 within the cavity 34 of the vest 11.

As shown in FIG. 4, and also in connection with FIGS. 3A and 3B, internal prosthetic organ(s) 36 may be positioned proximate to at least one orifice 16 and at least one fluid reservoir 26 for simulation of a penetrating wound to the human torso. In use, the raiment 10 of the present disclosure can be used with any combination of superficial wounds/ injuries disclosed above. Specifically, there may be a plurality of reservoirs 26, with a corresponding number of orifices 16. Likewise, a plurality of wound simulators 14 can be used.

The prosthetics of organs 36 (i.e. intestine 30, rib cage 32, lungs 46, heart 48, stomach 50, kidneys 52, bladder 54, liver 56, diaphragm 60, spleen 62 (see FIG. 5) and thorax described below may, or may not, be used, as desired. The prosthetic organs 36 may be combined within the cavity 34 in various combinations to simulate wounds and injuries. FIG. 4 shows a preferred embodiment including a large group or package of organs 36. Further, the prosthetic organs 36 may be combined into such packages and formed to represent certain wounds and injuries. For example, a package may be assembled to simulate injuries to the lungs 46 and heart 48 and another package may be assembled to simulate injuries to the stomach 50 and liver 56. The prosthetic organs 36 and packages of prosthetic organs are interchangeable so that various injury scenarios can be simulated. The wound simulators 14, orifices 16, channels 28 and reservoirs 26 are similarly interchangeable and positionable in alternative arrangements so that various injury scenarios can be simulated. And, as explained above, the positions of the wound simulators 14, orifices 16, channels 28, reservoirs 26 and organs 36 may be selectively juxtaposed to simulate various wounds and injuries. Collectively, the component elements of the present disclosure are intended to be used to simulate or mimic the various wounds/injuries that are likely to be received by a person involved in a traumatic event.

Figure 6:
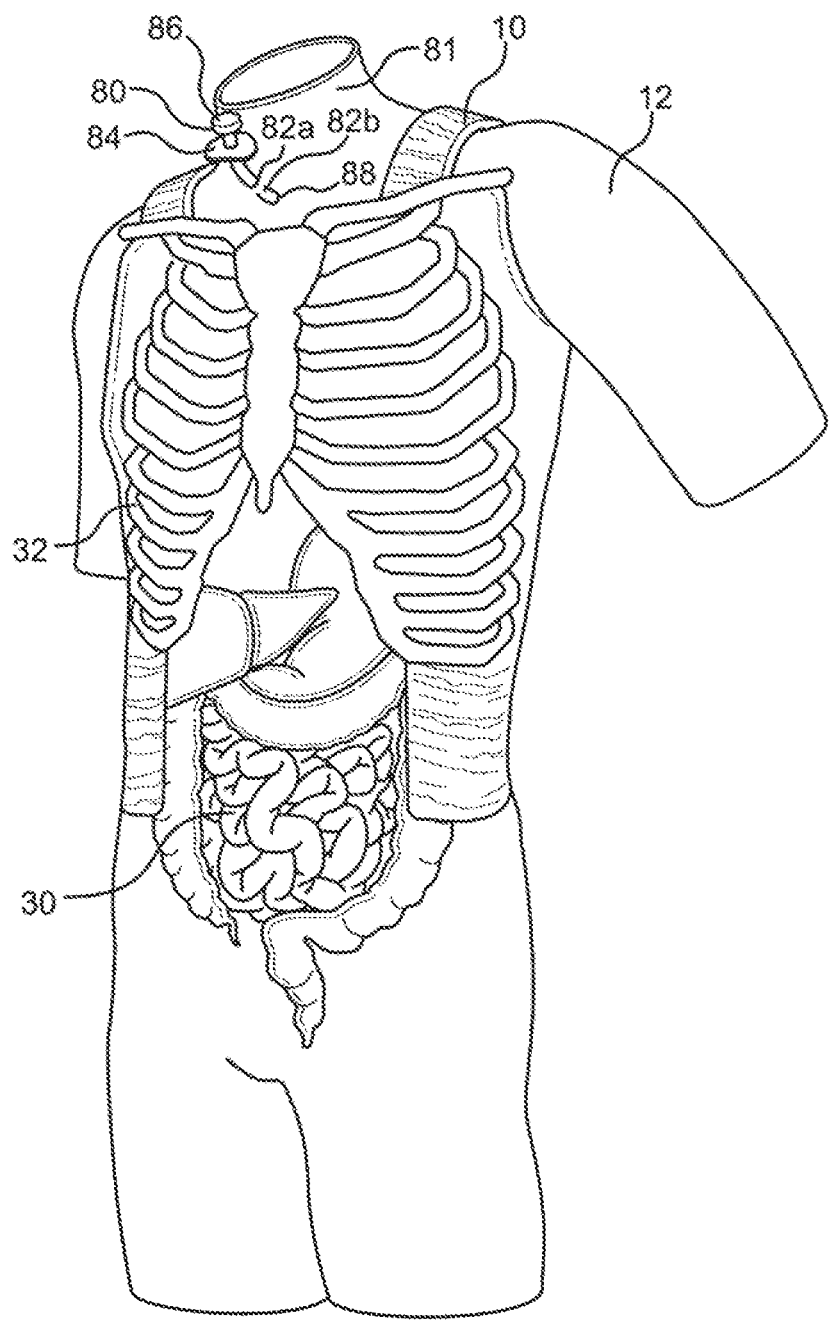
FIG. 6 is a perspective view of the prosthetic thorax of the disclosure.

As shown in FIG. 6, in alternative embodiments, penetrating injuries to the thorax can also be simulated by mounting a prosthetic thorax 80 under or on the raiment 10 in the area of the neck of the person 12. In detail, the prosthetic thorax 80 is held on a bib 81 by retaining straps 82a and 82b, and the bib 81 is mounted or fitted around the neck of person 12. For example, bib 81 can have straps, ties, Velcro or other fasteners to secure bib 81 at the back of the neck of person 12. The prosthetic thorax 80 and bib 81 can fit underneath or over raiment 10. Structurally, the prosthetic thorax 80 includes an elongated hollow tube-like member 84 that has an open end 86 and a closed end 88. For use, the tube 84 is presented on the bib 81, and the bib 81 is positioned on the throat of the person 12 with the open end 86 positioned for receipt of a cricothyroid tube (not shown). Thus, the prosthetic thorax 34 can be used for simulating an invasive surgical placement of a cricothyroidotomy. Operationally, the tube-like member 40 is held on the raiment 10 to mimic a thorax, and to present its open end 86 for access thereto with a chest tube during a simulation of a penetrating wound to the thorax. These prostheses can be made of plastic, rubber or composite materials, such as open or closed cell polyurethane foam of various densities, elasticity, and deformation characteristics to simulate internal organs.

Use of the wearable partial task surgical simulator 13 as a teaching aid is accomplished by using the simulator 13 on a person 12 who portrays an injured person in a trauma event. The simulator 13 dynamically simulates the wounds and injuries the person 12 received during the simulated traumatic event. The simulator 13 is set up to simulate a trauma event among various possible scenarios. Simulator 13 allows verbal and gesticular interaction between person 12 wearing the simulator 13 and a first responder (e.g. trainee, trainer, other participant) who is treating the person 12 wearing the simulator 13.

Accordingly, in using the partial task surgical simulator 13 as a teaching aid, the raiment 10 is provided with at least one wound simulator 14 related to the simulated trauma event and at least one fluid reservoir 26 for holding a blood-like fluid 18 and is in fluid communication with at least one orifice 16. The vest 11 is provided on person 12 underneath the raiment 10 and provides simulation of the internal skeletal structure (e.g., rib cage 32) and internal organs (e.g., prosthetic organs 36) of the person 12 simulating injury in the trauma event. Person 12 selectively expels the blood-like fluid 18 from the reservoir 26 and through the orifice 16 to simulate the trauma event. Simulator 13 is used to mimic a penetrating wound by positioning a predetermined length of flexible tubing (e.g., intestine 30 or fluid channel 28) against the inner surface 22 of the raiment 10 with a portion thereof juxtaposed with the orifice 16 of at least one superficial wound. At least one fluid reservoir 26 is attached to a length of flexible tubing (e.g., fluid channel 28) attached to the raiment 10 and reservoir 26 is manipulated to expel blood-like fluid 18. A first responder selectively accesses at least one prosthetic internal human organ 36 in the cavity 34 through at least one orifice 16 of the raiment 10 during simulation of a penetrating wound to the human body. The prosthetic human internal organs 36 are selected from among multiple combinations of prosthetic human internal organs 36 and used in the cavity 34 of the vest 11 to simulate from among various internal organ structure injuries involved in a selected trauma event.

Figure 7:
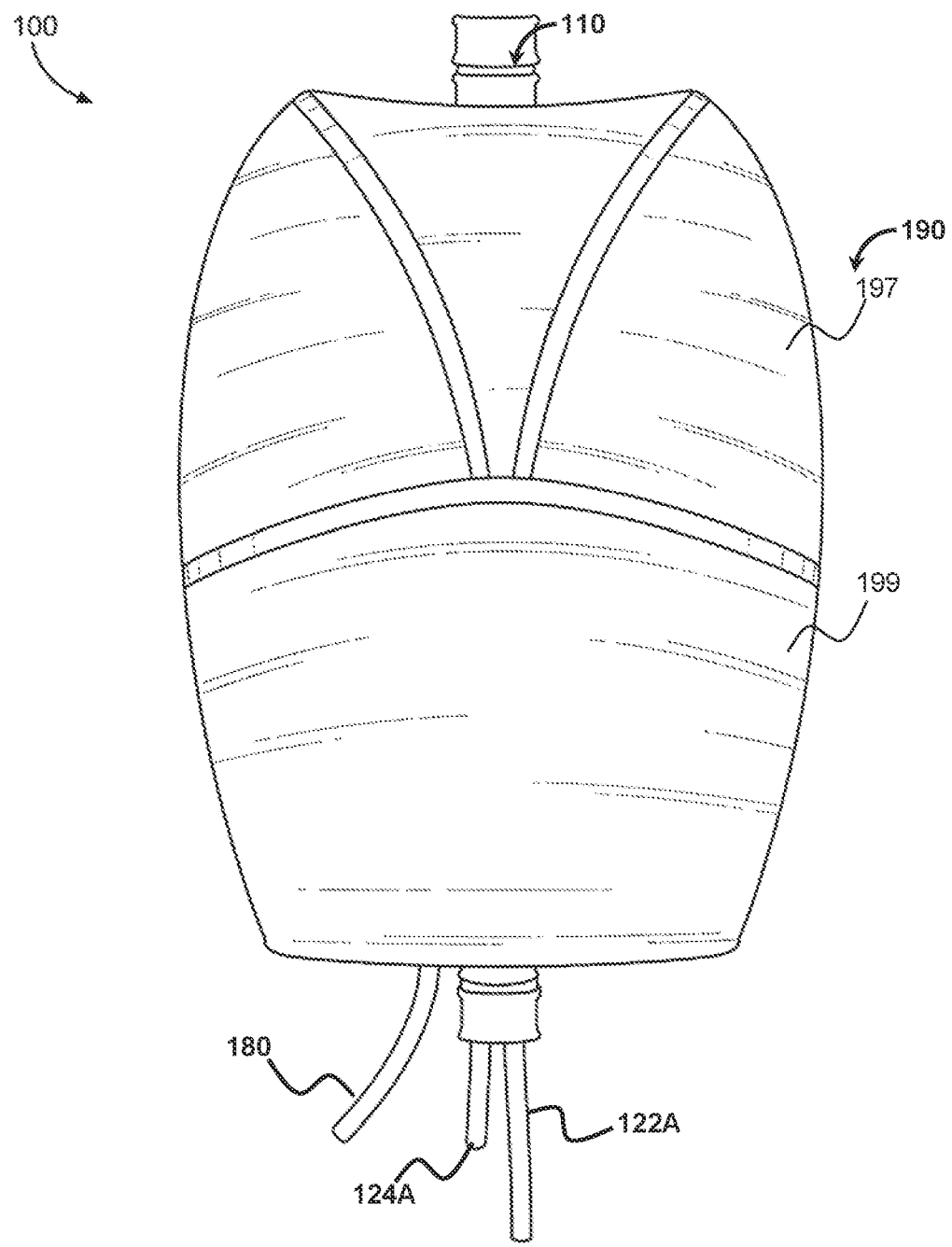
FIG. 7 is a preferred embodiment of a prosthetic organ module with wound simulation capabilities.

Referring now to FIG. 7, an exemplary embodiment of a prosthetic internal organ module is shown and generally designated 100. Generally, the prosthetic internal organ module 100 may include and enclose, or otherwise package a plurality of prosthetic organs, which simulate the internal organs of a human including the shape, color, and texture. The prosthetic internal organ module 100 may include all, or some of the internal organs of a human, depending on the needs of the simulation. As shown, the prosthetic internal organ module 100 may include a module frame 110 configured to support/anchor/position the prosthetic internal organs, and an anterior cover 190 substantially covering all of the prosthetic internal organs.

As discussed below, the anterior cover 190 may be configured to provide for tactile feedback when cut (e.g., allowing trainees to feel organs underneath), and to provide realistic simulation of the operation. For example, the anterior cover 190 may be a thin, soft, pliable sheet made from an elastomeric material (e.g. thin silicone sheet) or other similar membrane-like material. Accordingly, the anterior cover 190 may include, or otherwise include portions associated with, a prosthetic pleural membrane 197 and a prosthetic peritoneum 199 substantially covering all internal organs as shown. Alternately, it is understood that the anterior cover 190 may other combinations, depending on the needs of the simulation, as discussed below.

The prosthetic internal organ module 100 may further include a fluid delivery system 120. In particular, and as discussed below, the fluid delivery system 120 may be configured for bleeding and/or body fluid release, and may be initiated by severing tissue or valve opening, respectively. Advantageously, the fluid delivery system 120 may provide the capabilities to simulate an internal injury by providing point-of-contact bleeding simulation. Further, each prosthetic internal organ may also have its separate capability to simulate an injury.

According to one embodiment, the prosthetic internal organ module 100 may be packaged and dimensioned to fit within the cavity 34 of the vest 11. In particular, the prosthetic internal organ module 100 may include a plurality of realistic organs positioned and arranged as found in the human body, which is then enclosed as a single insertable and removable unit. Advantageously, the prosthetic internal organ module 100 may then be inserted into the cavity 34 of the vest 11 and provide realistic simulation of human organs with the capabilities of simulating injury. Further, in addition to the organs themselves, the prosthetic internal organ module 100 may provide for further realism by including more complex features such as fatty tissue, connecting/anchoring tissue, and membranes observable when the abdominal cavity is opened anteriorly. Advantageously, this may provide additional realism both in appearing as an actual human body would, and in requiring a trainee to cut through and manipulate diverse additional tissue and materials in an open surgery environment before even locating and reaching the simulated injury, thus requiring advanced surgical skills.

The prosthetic internal organ module 100 is not limited to be used with the simulator only, but may be inserted into any other human simulator with a cavity. In particular, the package may be an integrated, self-contained unit, configured to fluidly couple with one or more fluid supplies. Thus, it is contemplated that the prosthetic internal organ module 100 may be used independently from the vest 11, and utilizes only the raiment 10. Similarly, it is also contemplated that the prosthetic internal organ module 100 may be used independently to simulate specific internal injuries without the encumbrances of a simulated skeletal structure.

Referring now to FIG. 8 and FIG. 9, a module frame is shown and generally designated 110. Generally, the module frame 110 may be a platform configured to support and position the organs (and extra tissue) within the module. Further, the anterior cover 190 (FIG. 1) may be attached to the module frame to enclose some or all of the organs as a package, which may then be treated as an individual unit. According to one embodiment, the module frame 110 may be a durable component that is reusable over many operations, whereas the anterior cover 190 is a consumable component that is replaced each operation.

According to the illustrated embodiment, the module frame 110 may include a center frame 112 attached to a base 118. In particular, the base 118, may be configured to support/anchor/position the organs of interest, while the center frame 112 may be configured to route at least portions of the fluid delivery system 120. According to one embodiment, center frame 112 and/or the base 118 may be made of materials sufficiently durable to withstand many uses or duty cycles. For example, center frame 112 and/or the base 118 may be made of a durable, wear-resistant material and/or made with sufficient material quantity to last over a pre-defined useful life. Also for example, the base 118 may be a plate constructed of composite or plastic material, or other non-consumable material (i.e., over the platform's lifecycle).

Further, the base 118 may include a sheet of material sufficiently flexible to be inserted/retracted from a chest-sized cavity in a single motion. For example, the base 118 may be constructed of manually pliant or flexible material that allows for bending and other required deformations, such as silicone, rubber, and other elastomeric materials. Also for example, the base 118 may be constructed of manually pliable material or modifiable structure, such as resilient sheet of a memory material or an articulated assembly that can return to an initial configuration after bending or other manipulation.

According to one embodiment, the center frame 112 may be formed as a conduit, for example, having a central lumen 114 (shown in dashed lines) there through. In addition, the center frame 112 may function as a manifold, routing at least a portion of fluid delivery system 120 as needed. For example, the center frame 112 may include a plurality of ports 116 that provide access to the central lumen 114 from the outside of the center frame 112. This allows for passage of at least portions of the fluid delivery system 120 through the central lumen 114 of the central frame 112 and out the ports 116, to a designated location on the base 118. The use of a tube for the center frame 112 is not meant to be limiting, and it is contemplated that various other types of structures may be used for the center frame 112. According to one embodiment, the center frame 112 may include a tube simulating the spinal column of a human. As with the base 118, the center frame 112 may be configured to be sufficiently flexible to be inserted/retracted from a chest-sized cavity in a single motion. Alternately, where the center frame is not included, the spinal column of a human may be simulated and attached externally to the package, merely to provide more realism.

According to one embodiment, the fluid deliver system 120 may include a plurality of tubing. Preferably, the fluid delivery system 120 includes tubing 122 having an inlet 122A and an outlet 122B and tubing 124 having an inlet 124A and an outlet 124B. For reference and clarity, flow arrows have been added, but are not intended to be limiting.

One or both of tubing 122 and tubing 124 may be configured to deliver a simulated blood (e.g., for bleeding wounds), however, any simulated human fluid appropriate to associated organs or delivery area may delivered (e.g., waste, bile, acid, interstitial fluid, etc.).

The tubing 122 and 124 may be inserted into the central lumen 114 of the center frame 112 and exit through one of the plurality of ports 116. The outlet 122B and 1246 of tubing 122 and 124, respectively, may exit through the corresponding ports 116 and be directed to a designated area of the module frame 110 where an injury is to be simulated. By attaching the inlets 122A and 124A to a source of fluid, fluid may be delivered to the outlets 122B and 124B to simulate an internal bleeding injury. The fluid delivery system 120 is not meant to be limited to two tubes. It is contemplated that the fluid delivery system 120 may have one or more tubes, a network of tubing, a network of tubing and valves, or various other combinations of structures that allow for the delivery of a fluid.

As above, the module frame 110 may provide a platform that the prosthetic human organs are attached to. The prosthetic organs may be attached to the base 118 and/or to the center frame 112 by any convenient conventional means, such as fasteners, locks, adhesives, welding, melding and other joiners, or any other similar method. By attaching all of the prosthetic internal organs to the module frame 110, all of the prosthetic organs may be inserted and removed into the cavity 34 of the vest 11 in a single motion, as a single prepackaged unit. Advantageously this may provide for quick and easy maintenance of the simulator 13 and the prosthetic organs of the prosthetic organ module 100 after a simulation is completed. To illustrate, once a simulation is completed, prosthetic organs, prosthetic tissue, tubing, and at least portions of the anterior cover 190 may be destroyed, damaged, or otherwise consumed, however, being fixed to the module frame 110 the entire unit may be quickly and easily removed-and-replaced as unit. Further, the "used" prosthetic organ modules 100 may then be taken to a staging area to be rebuilt, repaired, repackaged, and/or reconfigured, providing minimal interruption to ongoing training.

Additionally, the module frame 110 may provide a platform that the anterior cover 190 (FIG. 1) or portions thereof are attached to. In particular, the anterior cover 190 may be attached to the base 118 or to the center frame 112 by various conventional means such as fasteners, locks, adhesives, welding, melding and other joiners, or any other similar method. For example, the anterior cover 190, or portions thereof, may be adhesively attached to the base 118 of the module frame 110. After use, the anterior cover 190 may then be cut away from the base 118. This may be particularly beneficial where both the base 118 and the anterior cover 190 are made of elastomeric materials or where fluids are to be retained in the prosthetic internal organ module 100 prior to cutting.

According to one embodiment, a plurality of anchors 128 may be attached to the back of the base 118. The anterior cover 190 may then be quickly and toollessly attached to the plurality of anchors 128 on the back the base 118. is. Similarly, the anterior cover 190 may be removed from the module frame 110 by decoupling from the plurality of anchors 128. Advantageously, a "consumed" or otherwise used anterior cover 190 may be readily removed and replaced.

Figure 10:
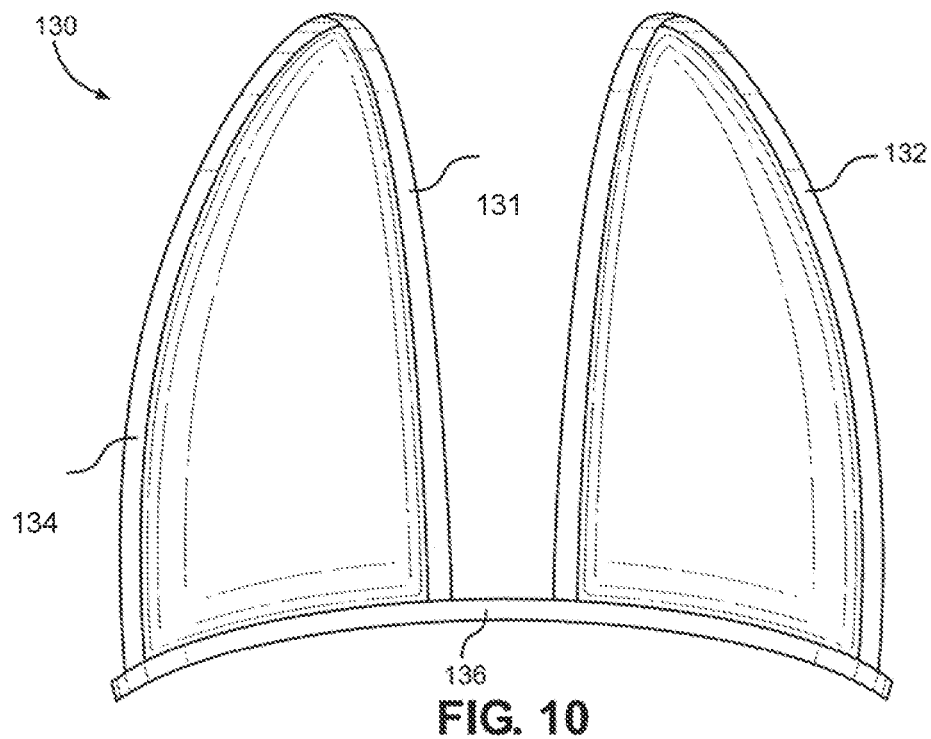
FIG. 10 is a front perspective view of a prosthetic lung of the prosthetic organ module.
Figure 11:
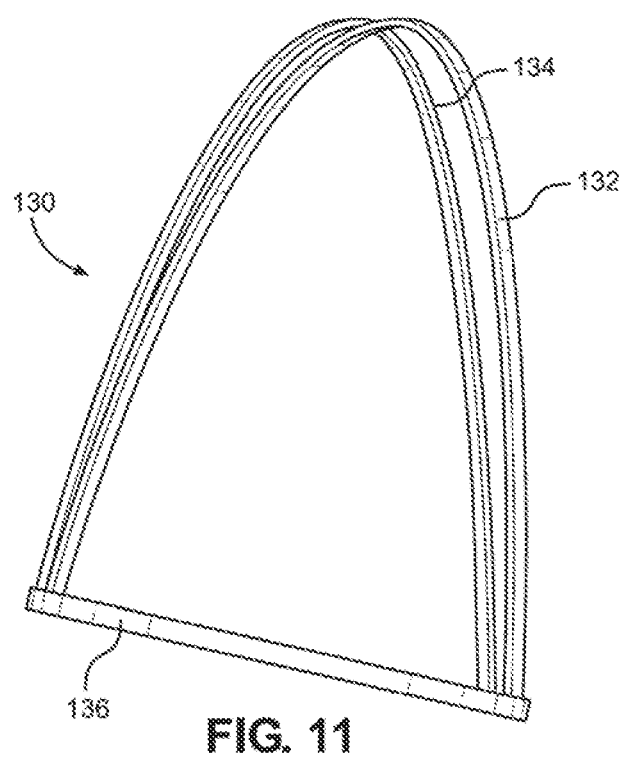
FIG. 11 is a side view of the prosthetic lung of the prosthetic organ module.

Referring now to FIG. 10 and FIG. 11, a prosthetic lung is shown and generally designated 130. The prosthetic lung 130 is a three-dimensional frame 131 outlining the shape of a human lung. The three-dimensional frame 131 includes a right member 132 and a left member 134 attached to a bottom member 136. The right member 132 is curved to form the outline of a right lung and the left member 134 is curved to form the outline of a left lung. The bottom member 136 is curved into a semi-circular shape. The three-dimensional frame 131 provides support, and gives shape to a prosthetic pleural membrane 197 (shown in FIG. 7 and FIG. 16), which in combination simulates the shape of human lungs. It is contemplated that the prosthetic lungs 130 may be made of an alternative structure, including hollow forms, solid forms, and semi-solid forms to simulate the human lungs. It is also contemplated that the prosthetic lungs 130 may be made of inflatable material, similar to balloon. This prosthetic lung 130 will have a body with a hollow cavity and a valve attached to the body. The prosthetic lung will have the capability of inflating or deflating, thereby simulating a pneumothorax.

Figure 12:
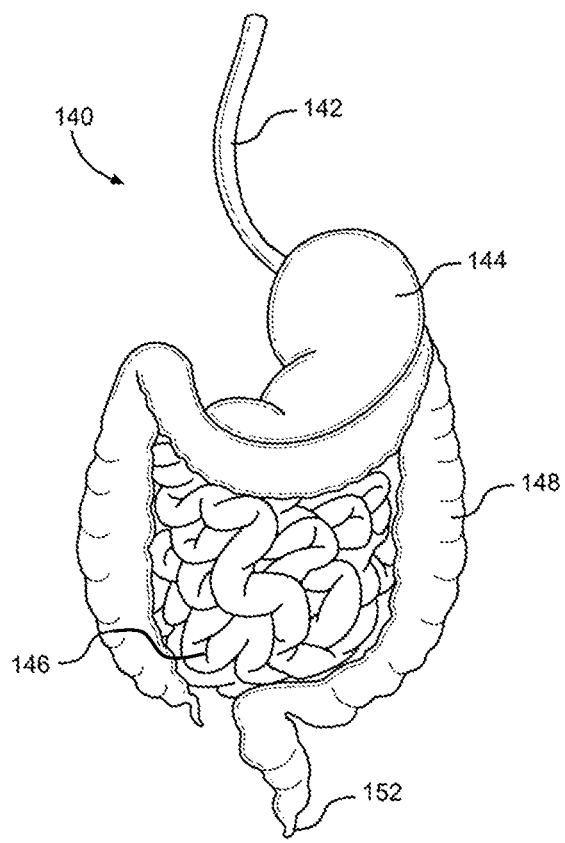
FIG. 12 is a front view of a prosthetic gastrointestinal tract of the prosthetic organ module.

Referring now to FIG. 12, a prosthetic gastrointestinal tract is shown and generally designated 140. The prosthetic gastrointestinal tract 140 simulates a human gastrointestinal tract and may include a prosthetic esophagus 142, a prosthetic stomach 144, a prosthetic small intestine 146, and a prosthetic large intestine 148. It is contemplated that the prosthetic gastrointestinal tract 140 may be modified for a particular simulation and may not include all of the various organs associated with a human gastrointestinal tract.

The prosthetic gastrointestinal tract 140 may be formed with an internal cavity 150 (not shown) that may extend the entire length, or a portion, of the prosthetic gastrointestinal tract 140. The prosthetic esophagus 142 may have a closed end and the prosthetic large intestine 148 may be formed with a valve 152 sealing the internal cavity 150 of the prosthetic gastrointestinal tract 140, for example in a simulated rectum. Alternately, it is contemplated that the prosthetic esophagus 142 may be fitted with a valve or the prosthetic large intestine 148 may have a closed end. The internal cavity 150 may be capable of holding a bodily fluid. For example, fluid may be inserted within the internal cavity 150 through the valve 152, thus "charging" the internal cavity 150. Later during training, for example, upon puncturing the prosthetic gastrointestinal tract 140, the fluid within the internal cavity 150 will escape simulating a gastrointestinal injury, such as a severed intestine or punctured stomach.

Figure 13:
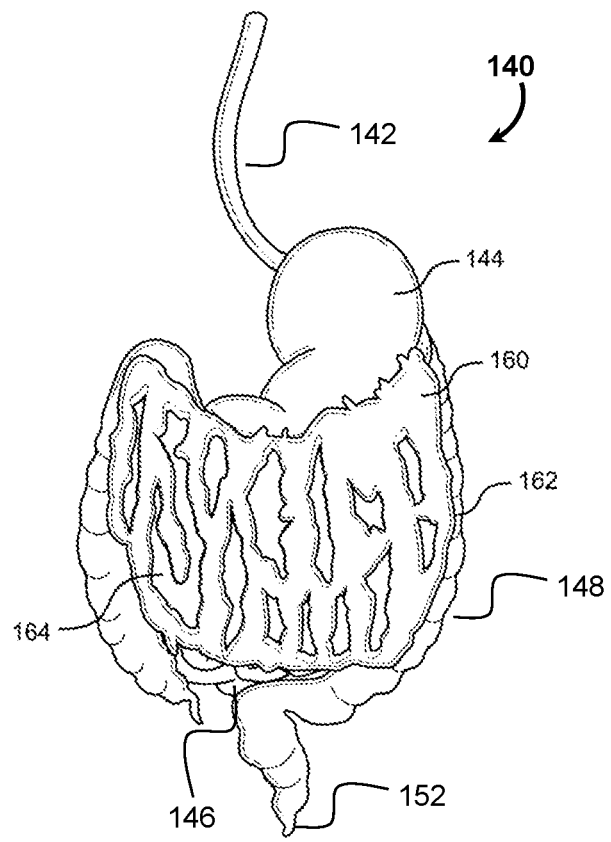
FIG. 13 is a front view of the prosthetic gastrointestinal tract of the prosthetic organ module with an attached prosthetic omentum.

Referring now to FIG. 13, a prosthetic omentum is shown and generally designated 160. The prosthetic omentum may include a base layer 162 with texturing 164 applied to simulate a human omentum. The prosthetic omentum 160 may be attached to the prosthetic stomach 144 and positioned over the prosthetic small intestine 146 and the prosthetic large intestine 148.

Figure 14:
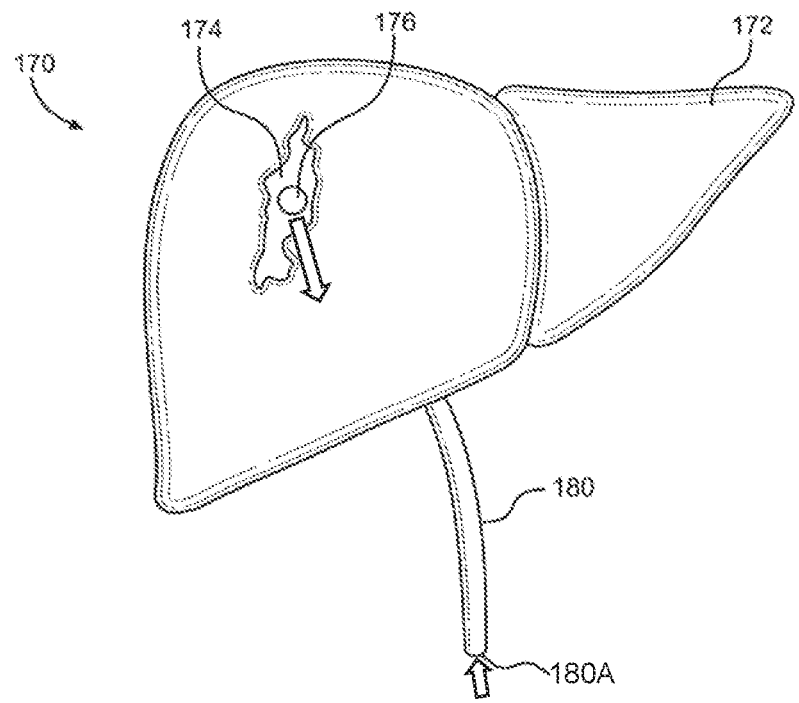
FIG. 14 is a front view of a prosthetic liver formed with a simulated injury of the prosthetic organ module.
Figure 15:
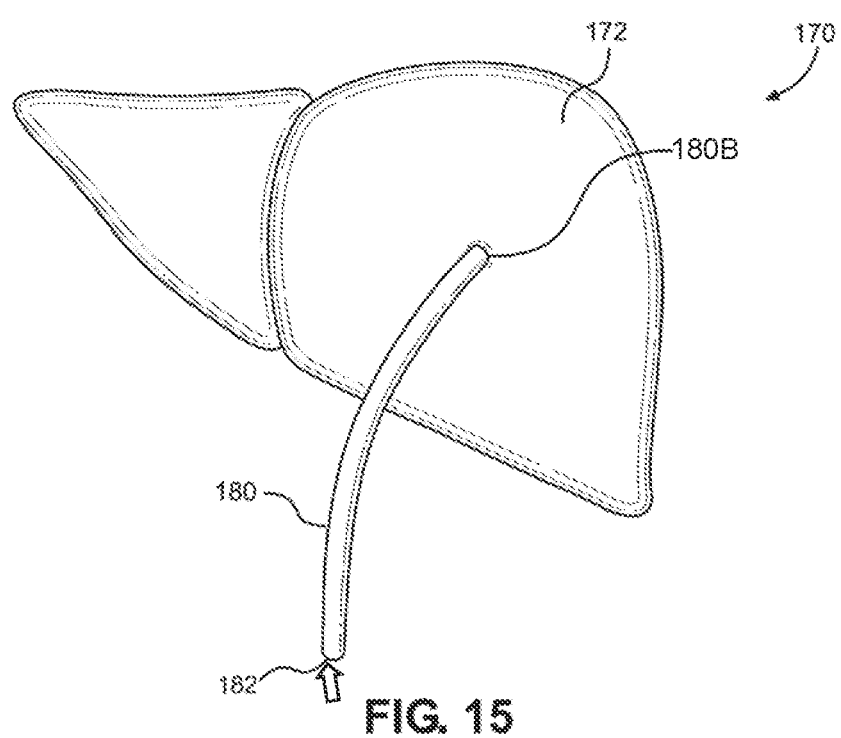
FIG. 15 is a back view of the prosthetic liver.

Referring now to FIG. 14 and FIG. 15, a prosthetic liver is shown and generally designated 170. The prosthetic liver 170 may include a body 172 formed to resemble a human liver. In the preferred embodiment, the body 172 may be formed with a simulated injury 174, such as a laceration. Formed within the simulated injury 174 is an orifice 176, which is connected to a tube 180. The tube 180 has an inlet 180A and an outlet 180B, where the outlet 180B is connected to the orifice 176. By connecting the inlet 180A of the tube 180 to a source of fluid, fluid may flow through the tube 180 and out the orifice 176 to simulate a bleeding liver injury. As above, flow arrows have been added for reference and clarity, but are not intended to be limiting.

Figure 16:
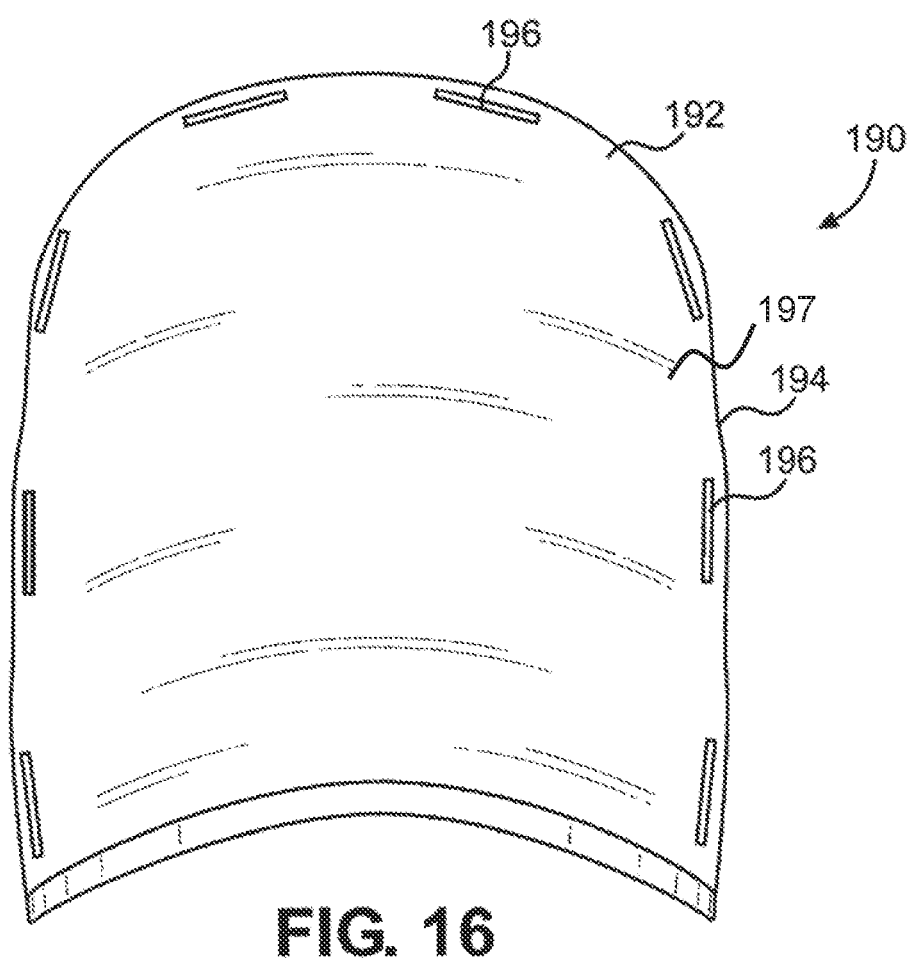
FIG. 16 is a front perspective view of a prosthetic pleural membrane of the prosthetic organ module.

Referring now to FIG. 16, the prosthetic pleural membrane 197 of the anterior cover 190 is shown in isolation. As shown, the prosthetic pleural membrane 197 may include a sheet 192 having a periphery proximate a perimeter 194. It is understood that aspects of the prosthetic pleural membrane 197 discussed, may similarly apply to the anterior cover 190 in general, and/or the prosthetic peritoneum 199.

According to one embodiment, the prosthetic pleural membrane 197 may be made of material having mechanical properties close to or otherwise in simulation of a human pleural membrane. For example, the sheet 192 of the prosthetic pleural membrane 197 may be made of a membrane-like material, such as silicone or other elastomeric material. Further, the prosthetic pleural membrane 197 may be configured to look and feel like or otherwise in simulate of a human pleural membrane. For example, the sheet 192 may be made of a thing silicone sheet (or a similar material) that is semi-translucent, soft and stretchable, and readily cut with medical instruments.

According to one embodiment, the prosthetic pleural membrane 197 may be configured to attach to the module frame 110 at its periphery. For example, a plurality of anchors 196 may be attached adjacent to the perimeter 194 of the sheet 192 (or cut therethrough) that correspond with the anchors 128 of the module frame 110 (e.g., female/male connectors, straps, hook/loop, mating clips, positive/negative, etc.). Accordingly, the anchors 196 and 128 may be attached to each other, allowing the prosthetic pleural membrane 197 to be attached to the module frame 110. It is understood that various conventional attachment means are contemplated. It is further understood that, while the prosthetic pleural membrane 197 is illustrated as an independent membrane, it (like the prosthetic peritoneum 199) may be integrated with and merely represent a portion of the anterior cover 190.

Figure 17:
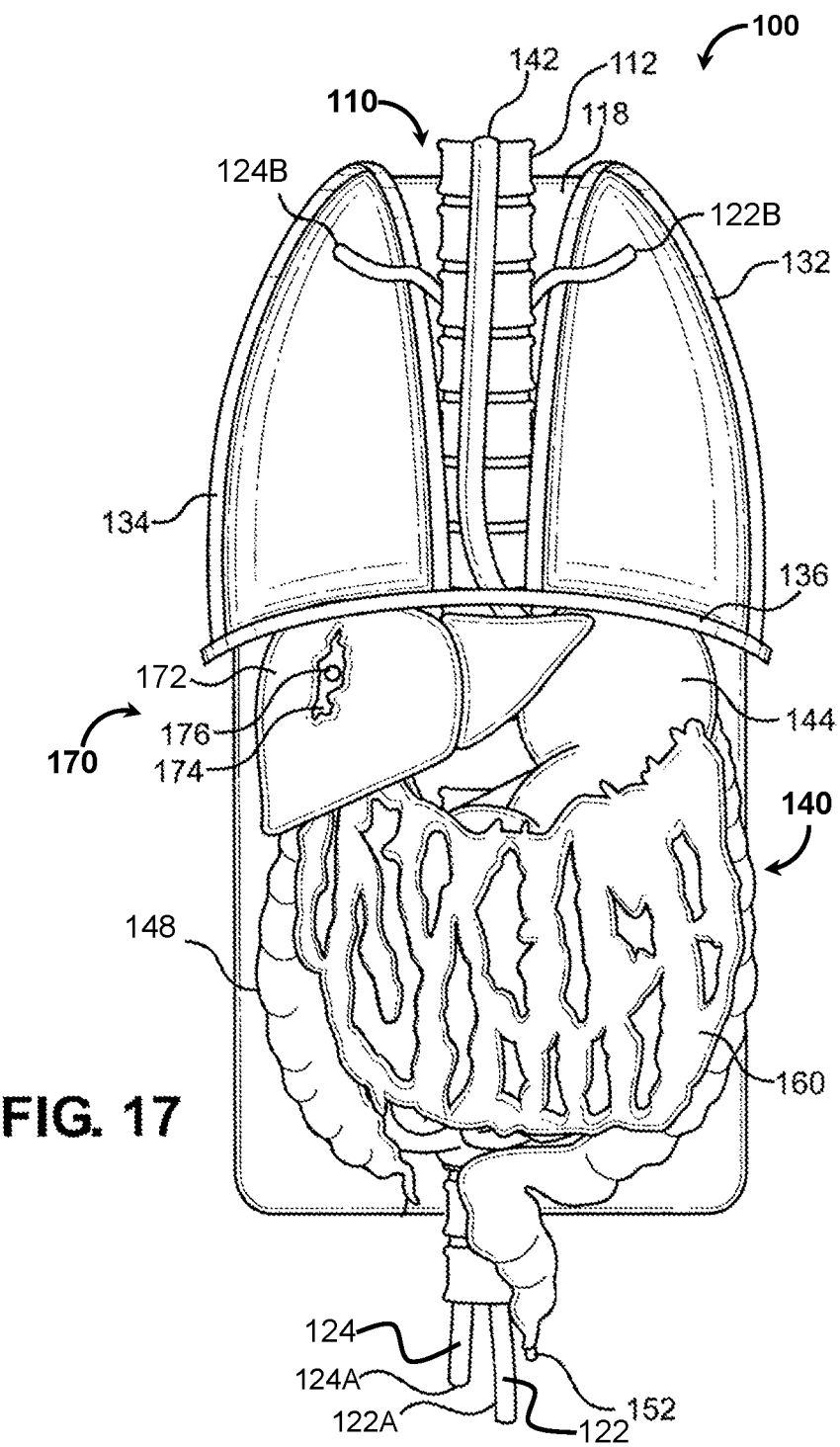
FIG. 17 is a front view of the prosthetic organ module with the prosthetic pleural membrane removed.

Referring now to FIG. 17 the prosthetic internal organ module 100 is shown assembled with the entire anterior cover 190 removed (i.e., neither of the prosthetic pleural membrane 197 the prosthetic peritoneum 199, attached). As shown, the prosthetic organs are assembled and attached to the module frame 110 in accordance with human anatomy. Here, the outlets 122B and 124B of the tubing 122 and 124, respectively, are positioned to simulate a bleeding chest wound. The inlets 122A and 124A of the tubing 122 and 124, respectively, are left exposed to allow the connection to a fluid source (not shown). Accordingly, when packaged by the anterior cover 190 and connected to a simulated blood source, application of fluid flow may create the simulated bleeding chest wound, including internal bleeding, hemorrhaging, and the like.

Here, the gastrointestinal tract 140 is attached to the module frame 110, where the prosthetic esophagus 142 is attached to the center frame 122, and the prosthetic stomach 144, the prosthetic small intestine 146, and the prosthetic large intestine 148 are attached to the base 118. It is understood that many attachment combinations are possible and contemplated. As illustrated, a portion of the large intestine 148 may extend past the module frame 110, to allow access to the valve 152, for example. Also, and with reference to FIG. 18, the prosthetic peritoneum 199 (or related portion of the anterior cover 190) may cover the majority of the prosthetic small intestine 146 and prosthetic large intestine 148.

As illustrated, the prosthetic liver 170 may be attached to the module frame 110. The tube 180 is then positioned where the inlet 182 (FIG. 18) is left exposed to allow attachment to a fluid source. This will allow the delivery of fluid to the simulated injury 174 of the prosthetic liver 170 to simulate an injured liver. Alternatively, the tube 180 may be inserted through one of the ports 116 (FIG. 9) of the center frame 112 and exit the central lumen 114 (FIG. 8).

As illustrated, the prosthetic lungs 130 may be attached to the module frame 110. The prosthetic pleural membrane 197 or the anterior cover 190 (FIG. 18) may be placed over the assembled prosthetic organs attached to the module frame 110. Thus, the three-dimensional frame 131 (FIG. 10) of the prosthetic lung 130 provides support, and gives shape to the prosthetic pleural membrane 197 or the related portion of the anterior cover 190, which in combination simulates the outline of human lungs. It is contemplated that the prosthetic lungs 130 may be made of an alternative structure, including hollow forms, solid forms, and semi-solid forms to simulate the human lungs. This prosthetic lung 130 will have the capability of inflating or deflating, thereby simulating a pneumothorax.

Figure 18:
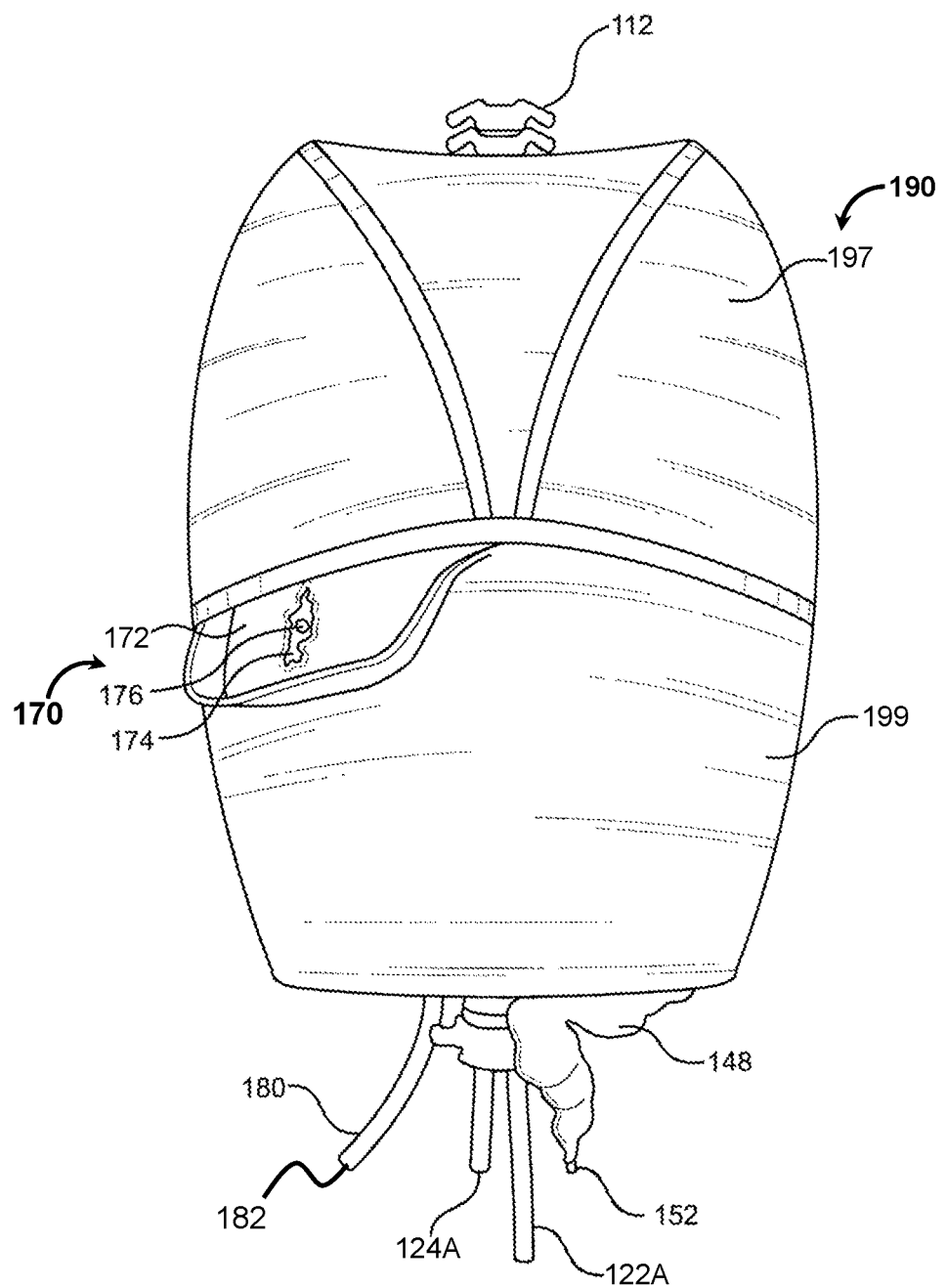
FIG. 18 is a front view of the prosthetic organ module with the prosthetic pleural membrane cut to expose the prosthetic liver with simulated injury.

Referring now to FIG. 18, the prosthetic internal organ module 100 is shown. As above, the prosthetic internal organ module 100 may be used independently, outside the cavity of a simulated human torso, for example, to demonstrate a damaged liver. The prosthetic peritoneum 199 of the anterior cover 190 is shown cut, providing an opening to the body 172 of the prosthetic liver 170, with the simulated injury 174 and orifice 176 (the source of the bleeding).

As above the module frame 110 (particularly the base 118) may be configured to position and support the assembled prosthetic organs. Here, since the prosthetic internal organ module 100 is configured to be used without the cavity of the simulated human torso it may be made from a more durable and rigid material such as plastic. However, it is understood that the module frame 110 may be made of a more flexible material so as to be common to a variety of applications.

Also as above, the anterior cover 190 (particularly here, the prosthetic peritoneum 199 portion) may be configured to provide tactile feedback when cut to provide realistic simulation of the operation. In particular, portions of the anterior cover 190 may be made to resemble a real prosthetic peritoneum in both look and feel. For example, the prosthetic peritoneum 199 of the anterior cover 190 may be made of membrane-like material, that is also semi-translucent, such as semi-clear silicone or other elastomeric material. The membrane-like material may be attached to the module frame 110 by conventional attachment means such as anchors (e.g., where base 118 is made of a rigid plastic plate), adhesives (e.g., where base 118 is flexible elastomeric sheet), etc.

Also as above, the prosthetic gastrointestinal tract 140 may be filled with simulated bodily fluid. Further, a puncture to any portion of the prosthetic gastrointestinal tract 140 may result in the release of the fluid, thus providing visual, textural, and audible cures of the puncture. According to one embodiment, the raiment 11 may be placed over the prosthetic internal organ module 100 to simulate a human upper torso. Further, the raiment 11 may be fitted with anchors corresponding with the anchors 128 on the back of the base 118, thereby allowing the raiment to attach to the prosthetic internal organ module 100.

Hemorrhage Control Trainer (HCT)

In accordance with the present disclosure, a hemorrhage control trainer (HCT) is provided for simulating the wounds on a medical manikin that could be received by a person during a trauma event. Specifically, the device includes a medical manikin located inside a reusable training suit resembling human skin. Structurally, the training suit is made primarily of silicone and nylon fiber, and it is formed as a layer having an inner surface and an outer surface, with the outer surface having a color and a texture that is comparable to human skin. Integral to the training suit are simulated wounds located at various places on the training suit. Each simulated wound has a blood supply tube attached such that the wound can simulate different types of bleeding, such a venous and arterial bleeding. The preferred embodiment of the HCT has wound simulators located at the right femoral artery, the left lower abdomen, the left arm, and the left face and neck. Alternative embodiments of the HCT have wound simulators located at other positions, such as a foot, a hand, a calf, a forearm, the chest, and the back. Other alternative embodiments allow for the simulation of a traumatic amputation by allowing the removal of a portion of a leg or arm and the placement of a wound site simulator at the end of the remaining limb portion. The severed limb portion may have a skin covering that simulates the look and effect of a severed limb.

A head wound will interfere with airway management adding value to the training since airway management is crucial to stabilizing a wounded person. The trainee must learn to overcome the airway interference to become an effective first responder. Airway management is performed on an anatomically correct and architecturally detailed throat for surgical cricothyroidotomy with appropriate tissue layers and landmarks/index points. It also permits the proper use of basic airway adjuncts such as a nasopharyngeal airway (NPA) and oropharyngeal airway (OPA).

The manikin is constructed from a rigid material that will resist cuts, abrasions, and punctures. In the chest area is a removable chest plate that allows access to the internal components housed in the chest cavity of the HCT. Located in the chest cavity are a pump, flow and pressure sensors, valves, tubing, a power supply, and a controller for controlling the internal components of the HCT. Located between the back of the manikin and the training suit is a blood reservoir, which is in fluid communication with the pump. When the manikin and blood reservoir are inserted into the training suit, the wound simulators and blood reservoir are connected to the pumping system by way of tubing. The pump and valves are then operated as necessary to simulate different types of bleeding from the simulated wound. The blood reservoir is refillable without the need to remove the reservoir from the HCT.

Pulse emitters are located at various points on the manikin to simulate the pulse of a person who has suffered a traumatic injury and is hemorrhaging blood. The pulse emitters are located such that palpable Carotid (neck), Brachial (lower abdomen), and Radial (wrist) pulses are simulated, which are the prime pulse locations for determining the current physical condition of a person. Pulses are correlated to simulated blood pressure and have appropriate pulse deficit. The pulse emitters may have integrated sensors that send and receive signals with an external control unit.

In operation, an operator initiates bleeding and pulses through the external control unit. A trainee then assesses the wounds, bleeding, and pulses to prioritize the appropriate response actions. To control the bleeding, a trainee may apply a Combat Application Tourniquet (CAT), Combat Ready Clamp (CROC), or other junctional tourniquet, or may apply pressure to a wound with a pressure dressing, body weight, or packing such as Combat Gauze.

Referring to FIG. 19, a Hemorrhage Control Trainer (HCT) of the present disclosure is shown and designated 1100. As shown, HCT 1100 consists of a manikin 1101, a training suit 1102, and a blood bladder 1132 (not shown, See FIGS. 21 and 22). In operation, manikin 1101 is inserted into training suit 1102. Bladder 1132 is inserted between the back of manikin 1101 and training suit 1102. Training suit 1102 further consists of a fill connector access 1103, a facial wound simulator 1104, a battery compartment access 1105, a thorax wound simulator 1106, an arm wound simulator 1108, an abdominal wound simulator 1110, a leg wound simulator 1112, and a trachea module insertion area 1113. Shown in phantom are a radial pulse emitter 1114, a carotid pulse emitter 1116, and a femoral pulse emitter 1118. The operation of pulse emitters 1114, 1116, 1118 will be discussed further in the discussion of FIG. 20. It is to be appreciated by someone skilled in the art that the number and type of wound simulators located on the training suit 1102 may vary depending on the simulated trauma event.

Fill connector access 1103 allows for quick access to fill connector 1122 (not shown, see FIG. 20) when training suit is on manikin 1101. Providing quick access to fill connector 1122 allows for the refilling of bladder 1132 without the need to of removing or partially removing training suit 1102 from manikin 1101. This allows HCT 1100 to be quickly reset to a starting condition to allow for more efficient training of multiple trainees or faster repetition for a single trainee. As with fill connector access 1103, battery compartment access 1105 allows for quick access to battery compartment 124 to allow HCT 1100 to also be quickly reset to a starting condition for more efficient training. Further, a training cycle may require the replacement of a battery 1125 (see FIG. 20) during the training cycle, thereby creating the need to quickly replace the battery 1125 to minimize the impact on the quality and length of the training cycle. In alternative embodiments of the HCT, two or more batteries may be used to extend the duration of the training cycle or to supply more power to the HCT.

Thorax wound simulator 1106, arm wound simulator 1108, abdominal wound simulator 1110, and leg wound simulator 1112 simulate wounds that each need different techniques to control bleeding from a real such wound. In a preferred embodiment, wound simulators 1106, 1108, 1110 and 1112 are individually configured to simulate different types of wounds, such as a wound resulting in arterial bleeding where the simulated blood may exit in pulses, or in venous bleeding where simulated blood may ooze, drip, or flow at a slower and more constant rate then with arterial bleeding. Non-bleeding wounds may also be simulated in conjunction with bleeding wounds to increase training realism. Wound simulators 1106, 1108, 1110, and 1112 may also be configured to simulate the look of a particular type of wound. For example, a puncture wound may be simulated as a hole in training suit 1102 having simulated blood flowing from the hole, where an impact wound may result in an open wound covering a larger area. It is beneficial to the realism of the training to make these types of wounds look as real as possible. As such, wound simulators 1106, 1108, 1110 and 1112 in a preferred embodiment are constructed such that internal organs, veins, arteries, and skin layers are realistically simulated, including the source of bleeding from within the wound itself.

Thorax wound simulator 1106 is located at the base of training suit head 1140 and extends down the neck 1142 of training suit 1102. In operation, through a system discussed further below, the simulator 1106 is connected to a pumping system that provides a flow of simulated blood to wound simulator 1106. When the pumping system is activated, simulated blood is supplied to wound simulator 1106 where it flows from the simulator 1106 in the manner dictated by the training scenario. For instance, wound simulator 1106 may simulate an arterial wound. As such, the simulated blood flow from wound simulator 1106 will be in pulses and have a higher volume of flow from the wound simulator 1106. In contrast, if a venous wound is simulated, blood flow from wound simulator 1106 will be more consistent and may have a lower volume of flow.

Arm, abdominal, and leg wound simulators 1108, 1110, and 1112 function similar to thorax wound simulator 1106. The look of a wound simulator is determined by the type of wound simulated and the goals of the training session. The type of wound simulator selected for the training session partially determines the nature of the blood flow from the simulated wound. For example, a wound simulator may simulate a shallow laceration resulting in a slow blood flow where a puncture wound or deep laceration result in a high blood flow. As discussed below in regards to the pumping system, the operation of the pump system will also determine the nature of the blood flow from a simulated wound.

Referring now to FIG. 20, the construction of manikin 1101 is shown. Manikin 1101 consists of a chest plate 1120 which covers the internal cavity of manikin 1101. Located behind chest plate 1120 is the blood pumping system (not shown). Fill connector 1122 and battery compartment 1124 are accessible through chest plate 1120. Also shown in FIG. 20 are radial, carotid, and femoral pulse emitters 1114, 1116, and 1118, and pulse emitter connectors 1115, 1117, and 1119, bladder connector 1130, and bleed connectors 1126 and 1128. Skin cover 1138 is used to cover the wrist and neck of manikin 1101 to increase the realism of the training by creating a more realistic palpable pulse. In a preferred embodiment, skin cover 1138 also covers trachea module insertion area 1113 where trachea module 1136 (not shown, see FIG. 23). When skin cover 1138 is in place, a trainee must locate the proper location on the trachea module 1136 through skin cover 1138 to perform a cricothyroidotomy, which is used to open an airway for breathing.

Pulse emitters 1114, 1116, and 1118 emit mechanical pulses in response to signals from the central controller 1300 (not shown, see FIG. 26). When a trainee places a finger on the outside of the training suit 1102 over a pulse emitter 1114, 1116, and 1118, the trainee can feel the rate and intensity of the pulses. The mechanical pulses are coordinated to simulate the pulse and heart rate of an injured person having the types of wounds simulated in the training session. Using this information, the trainee can make a determination of the condition of the injured person and prioritize the required actions to stabilize the injured person, such as breathing assistance or compression to minimize or stop bleeding. The rate and intensity of the pulses may be controlled by a preset program running on central controller 1300 or may be adjusted in real time by a training supervisor using a remote control unit 1200 in response to the actions of the trainee.

Referring now to FIG. 21, bladder 1132 with connector tube 1134 is shown. Bladder 1132 is connected to bladder fill connector 1130 by way of bladder connector tube 1132. In a preferred embodiment, bladder fill connector 1130 also serves as the abdominal bleed connector. In operation, bladder 1132 is located inside training suit 1102 between the back of manikin 1101 and training suit 1102 as shown in FIG. 22. When the HCT 1100 is placed on its back during a simulation, the weight of the HCT 1100 on bladder 1132 provides a source of pressure for the pumping system. However, if the HCT 1100 is oriented on its side, the pumping system is capable of providing full pressure to simulate all types of wounds. Central controller 1300, as discussed further with FIG. 26, is capable of monitoring system pressure and blood flow rate and to adjust system parameters to maintain a realistic training simulation.

FIG. 23 shows a trachea module and is designated 1136. Module 1136 is inserted into trachea module insertion area 1113 located at the throat area of manikin 1101. Trachea module 1136 simulates the physical construction of a human trachea, which includes the thyroid cartilage 1152, the cricoid cartilage 1154, and the tracheal rings 1156. After trachea module 1136 is inserted into trachea module insertion area 1113, skin cover 1138 is installed over the insertion area 1113. In operation, a trainee must palpate the throat area to locate the trachea module 1136, the thyroid cartilage 1152, the cricoid cartilage 1154, and the tracheal rings 1156 to determine the proper location to cut through skin cover 1138 to access the proper location on trachea module 1136 to perform a cricothyroidotomy to assist with breathing.

FIG. 24 shows skin cover 1138. To hold skin cover 1138 in place, a fastening means such as hook and loop type fasteners are used. When skin cover 1138 is placed over a pulse emitter (see FIG. 20), a trainee is able to palpate the area and find the emitted pulse.

FIG. 25 is a diagram view of a control screen typical of a remote control device and is designated 1200. Through control device 1200, a trainer or operator may operate all functions of HCT 1100 through GUI 1201. Specifically, the trainer/operator may start, stop, and reset the simulator through section 1202 of 1201. Connection indicator 1216 indicates a connection has been established between control device 1200 and the HCT 1100. Wound control 1204 allows the trainer/operator to start and stop either arterial or venous like bleeding from a leg, arm, abdomen, thorax, or head wound. Blood loss indicator 1210 indicates the total amount of blood lost by the HCT 1100. To indicate the amount of blood loss, blood loss scale 1212 indicates by way of a bar graph the amount of blood loss during the simulation. Blood loss is categorized in stages, specifically Stages 1 through 4. When blood loss reaches the end of Stage 4 (13000 milliliter total blood loss), death may be assumed. Blood loss indicator also shows blood loss total 1213, which shows the calculated level of blood loss.

Section 1214 of user interface 1200 provides control for the Radial, Carotid, and Femoral pulse emitters 1114, 1116, and 1118. In manual operation, the user may input a desired pulse rate. Depending on the type of wound being simulated, one pulse emitter may be set to a different rate from the other pulse emitters. For example, femoral pulse emitter 1118 may be set to a slower pulse rate than radial and carotid pulse emitters 1114 and 1116. If the pulse rates are controlled by a pre-programmed sequence, an operator may override the pre-programmed settings with manual settings.

Connection indicator 1216 of control device 1200 provides an indication when control device 1200 is connected to HCT 1100. In a preferred embodiment, the connection between control device 1200 and HCT 1100 is wireless, which includes radio frequency and infrared. However, wired connections are fully contemplated and do not depart from the spirit of the disclosure.

Battery indicator 1217 consists of battery charge indicator 1218 and battery output voltage indicator 1219. Battery charge indicator 1218 is a bar graph indicator that shows the current charge level of battery 1125. The output voltage of battery 1125 is indicated by battery output voltage indicator 1219. Depending on the type of battery 1125 used to power HCT 1100, battery output voltage indicator 1219 can be used to determine the amount of battery life remaining in battery 1125. For example, the output voltage of an alkaline battery drops linearly during use whereas a typical rechargeable battery has a small drop in output voltage during use until the end of the battery charge where the output voltage suddenly experiences a sharp drop.

Blood volume indicator 1220 consists of a fill reservoir button 1221, a reset level button 1223, and an available blood volume indicator 1225. In operation, the user presses fill reservoir button 1221 to input the amount of blood added to bladder 1132. After filling bladder 1132, the operator presses reset level button 1223 to set available blood volume indicator 1225 back to zero (0). Lastly, control device 1200 has a system pressure indicator 1224, which indicates the current pressure in the pumping system.

Referring now to FIG. 26, an exemplary system diagram of HCT 1100 is shown and designated 1300. The electrical portion of system 1300 consists of controller 1302, which is responsible for coordinating the operation of system 1300. Connected to controller 1302 is wireless module 1304, pulse emitters 1306, battery monitor 1308, pump 1310, flow sensor 1312, pressure sensor 1314, solenoids 1316 and 1318, and output control valves 1320.

The mechanical portion of System 1300 consists of bladder 1132, which is connected to solenoids 1316 and 1318. Solenoid 1316 is connected to pump 1310 and fill connector 1122. The output of pump 1310 goes to flow sensor 1312 and pressure sensor 1314. The output of pressure sensor 1314 is connected to solenoid 1318, which in turn connects to control valves 1320. Control valves 1320 connect to the various wound locations on training suit 1102. For example, low pressure control valve 1322 and high pressure control valve 1324 both connect to facial wound simulator 1104 (not shown).

In operation, controller 1302 controls the operation of the internal components of system 1300. Solenoids 1316 and 1318 control the flow to and from bladder 1132. For example, when filling bladder 1132, a volume of simulated blood is connected to fill connector 1122. Controller 1302 adjusts solenoid 1316 such that the simulated blood is directed from fill connector 1122 to bladder 1132. After bladder 1132 is filled to the desired level, controller 1302 adjusts solenoid 1316 to isolate fill connector 1122 from bladder 1132 and pump 1310. When a user initiates a training sequence or manually inputs a pump command from remote control device 1200, solenoid 1316 adjusts such that bladder 1316 is connected to the input of pump 1310. Pump 1310 is controlled by controller 1302 to simulate the desired wound conditions. For example, pump 1310 can be pulsed to help simulate the flow of blood in an arterial wound. Pump 1310 can also be run at a constant pressure when control valves 1320 are used to control the blood flow from a wound.

The output of pump 1310 is connected to flow sensor 1312 and pressure sensor 1314, which send flow and pressure data to controller 1302 to be used, for example, to calculate blood loss during a simulation. As a further example, in some training scenarios, HCT 1100 is positioned on its back. This causes the weight of manikin 1101 to apply a downward force on bladder 1132 thereby creating a pressure inside bladder 1132. This pressure is then used to force the flow of blood to control valves 1320 through solenoid 1318 where control valves 1320 are used to simulate the type of blood flow required for the type of simulated wound. In this configuration, pump 1310 is not used.

In a typical operation, the output from pressure sensor 1314 is directed to solenoid 1318, which then directs simulated blood flow to control valves 1320. As described above, control valves 1320 are connected to the wound simulators located on training suit 1102 through bleed connectors. For example, the output of low and high pressure control valves 1322 and 1324 are connected to facial bleed connector 1126, which in turn connects to facial wound simulator 1104. The remaining control valves 1320 are connected to thorax, arm, abdominal, and leg wound simulators 1106, 1108, 1110, and 1112 through neck and radial bleed connectors 1126, femoral bleed connector 1128, and abdominal bleed connector 1130 respectively.

Wireless module 1304 sends and receives data from control device 1200. The use of a wireless connection allows for a user to remotely operate HCT 1100 without the need for wires thereby adding to the realism of a simulation. Pulse emitters 1306 are controlled by controller 1302. In operation, controller 1302 coordinates the pulse rates with the amount of blood loss. For example, a normal and strong pulse rate is simulated at the beginning of a training simulation. As the simulation progresses and the simulated blood loss increases, the simulated pulse rate may become quicker and faint until the amount of simulated blood loss would indicate impending death, where the pulse rate becomes almost unascertainable when the trainee palpates the area. When the volume of blood is lost through the simulated wound(s), death is indicated and the pulse ceases to exist.

Battery monitor 1308 monitors the power supplied to the system. Battery monitor 1308 inputs the output voltage of the battery 1125, where controller 1302 calculates the amount of remaining power and then sends that information to control device 1200 through wireless module 1304.

The main purpose of HCT 1100 is to provide a simulation of an injured person suffering from one or more wounds. They type of wound(s) simulated determines the type of response necessary to save the life of a real person suffering from such injuries. For example, an arterial leg wound may require the use of a CAT to control the bleeding. If a trainee fails to timely assess HCT 1100 and apply a CAT to the leg wound, then blood loss with continue and the femoral pulse emitter 1118 will indicate the appropriate pulse deficit. As blood loss continues, the pulse deficit will increase even further until the trainee takes the proper remedial measures or the system indicates the injured person is dead, where all pulses will stop. As another example, a facial wound may require the use of a pressure dressing or packing (e.g. combat gauze) to control bleeding. The simulation may also require the use of a CROC, other types of tourniquets, and even the body weight of a trainee to control blood loss. Typical bandaging techniques may also be used to control bleeding.

In the event a facial or neck wound is simulated, an airway management capability is provided. Trachea module 1136 (see FIG. 23) is inserted into trachea module insertion area 1113 (See FIGS. 19 and 20) of manikin 1101, which is then covered with skin cover 1138. In operation, a trainee palpates trachea module 1136 for index points to find the proper location for a cricothyroidotomy. After locating the proper index points, the trainee cuts through skin cover 1138 then trachea module 1136, followed by insertion of an airway adjunct. Thus, the trachea module 1136 can be used for simulating an invasive surgical placement of a cricothyroidotomy. The use of an NPA and OPA may also be dictated by the simulation.

Emergency Casualty Care Trainer

Aspects of the present disclosure relate to a wearable device for simulating wounds and injuries received during a trauma event. Aspects of the present disclosure further relate to a medical training device for Trauma Emergency Casualty Care and Tactical Combat Casualty Care (TCCC). A wearable device may be worn by a live human (e.g., trauma actor) or simulated body (e.g., full/partial manikin, drag dummy, etc.). As above, a realistic experience is key to effective training.

According to one embodiment, a training suit for a medical trainer such as a Hemorrhage Control Trainer (HCT) may include an external and an internal garment. For clarity, the external and internal garment (along with their interfaces) may be referred to together as an emergency casualty care suit. Also for clarity, this embodiment of the medical trainer may be referred to as an emergency casualty care trainer (ECCT), which is understood to be similar to or otherwise related to a trauma emergency care trainer and the field of Tactical Combat Casualty Care (TCCC), which generally address the three most preventable causes of death from trauma: Hemorrhage, Loss of airway/Airway obstruction, and Tension pneumothorax (collapsed lung pressing on heart, and heart stops). In particular, the emergency casualty care trainer may be configured for and thus be useful for training for (1) Massive hemorrhage managed using tourniquets, hemostatic dressings, junctional devices, and pressure dressings; (2) Airway blockage managed by rapid and aggressive opening of the airway to include cricothyroidotomy; and (3) Respiration and breathing managed by the assessment for tension pneumothorax and aggressive use of needle decompression devices to relieve tension and improve breathing.

FIG. 27 is a front view of an exemplary emergency casualty care trainer, according to one embodiment of the disclosure. As shown and as discussed above, the emergency casualty care trainer 2000 may include a manikin 2100 and an emergency casualty care suit 2400. For reference, the manikin 2100 may define a traditional frame-of-reference including front & back, top & bottom, left & right, and inside/inner & outside/outer, and as used throughout the present disclosure. In general, the emergency casualty care suit 2400 may be comprised of an inner and outer garment that are joined together via integral plumbing system, and configured to be worn on "Rescue Randy" type manikins.

As illustrated, the emergency casualty care suit 2400 may include an inner garment 2600 (FIG. 28) and an outer garment 2700. Preferably, the inner garment 2600 may be made of a first material selected so as to tactilely represent a layer of human flesh underlying a blood vessel (e.g. muscle and fat), and the outer garment 2700 will be made of a second material, the second material being thinner than the first material and generally representing a layer of human flesh covering a blood vessel (e.g., skin). The emergency casualty care suit 2400 may further include a blood plumbing system 2500 coupled to the inner garment 2600 and the outer garment 2700. The emergency casualty care trainer 2000 may further include a blood pumping system, or more generally, a blood supply system 2200, which is configured to supply a simulated blood to the blood plumbing system 2500 of the emergency casualty care trainer 2000.

According to one embodiment, one or more elements of the emergency casualty care suit 2400 may be part of an emergency casualty care kit 2001. The emergency casualty care kit may include the manikin 2100 including a head and a plurality of limbs, the blood plumbing system 2500, the inner garment 2600 configured to be worn by the manikin 2100, and the outer garment 2700 configured to be worn by the manikin 2100 over the inner garment 2600. The blood plumbing system 2500 may include a blood supply system interface and a first blood channel coupled to the blood supply system interface, with the first blood channel including a first wound interface, and with the first blood channel configured to convey a simulated blood from the blood supply system interface to the first wound interface. The inner garment 2500 may include a padding made of a first material, and at least one blood channel guide configured to route at least a portion of the first blood channel in a predetermined path. The outer garment including a skin cover made of a second material and a first simulated wound, the second material being thinner than the first material, the first simulated wound affixed to the second material and fluidly coupleable to the first wound interface.

According to one embodiment, the emergency casualty care kit 2001 may include any appropriate packaging, instructions, extra consumable parts, and the like. Further, it is understood that the emergency casualty care kit 2001 may include any embodiment of the aforementioned elements, as well as one or more additional elements or features described herein.

FIG. 28 is a front view of the exemplary emergency casualty care trainer of FIG. 27 having the outer garment removed, according to one embodiment of the disclosure. According to one embodiment, the manikin 2100 may be a low-fidelity manikin such as a human drag dummy (similar to manikin 1101 described above). The drag dummy is understood to have a human form, size, and weight, and generally be a low cost tool for training on carrying or otherwise moving an incapacitated person. Further, the low-fidelity manikin is contrasted with a high-fidelity manikin, which will typically include animatronics and the latest technology, which may be very costly or otherwise inaccessible.

According to one embodiment, the manikin 2100 may be a simple molded form of a human, having limbs 2110 with articulating joints 2120 and a head 2150. The head may include a nose 2152 and a mouth 2154, with openings into each and a passageway therebetween (airway 2156). In addition, the head may include a throat cavity 2158 with an opening into a neck of the manikin 2100 and that joins the airway 2156.

Further, the manikin 2100 may be weighted appropriately, for example, the manikin 2100 may be a substantially hollow form having weights added to correspond to an average weight of a human having a similar size. Further, the manikin 2100 may include one of more needle cavities (not shown) integrated into its torso, which correspond to needle injection sites. According to one embodiment, the manikin 2100 may be a drag dummy modified to form one or more internal cavities sufficiently cavernous to receive a decompression needle inserted during training (e.g., 3 inches deep). As above additional weight may be added to compensate for any lost weight associated with the one or more internal cavities created.

Further, the manikin 2100 may include a chest plate (e.g., chest plate 1120) configured to tactilely appear as ribs of the manikin 2100 as felt from outside of the assembled emergency casualty care suit 2400. According to one embodiment, the chest plate may cover one or more internal cavities of the manikin 2100. According to one embodiment, the manikin 2100 may include a hanger 2130 (FIG. 29), such as a looped steel cable anchored to a hard point of the manikin 2100. In this way, the manikin 2100 may be hung for storage, cleaning, and/or use. Preferably the hanger 2130 will extend away from the manikin 2100 proximate its back upper shoulder area.

As above, the emergency casualty care suit 2400 may include the blood plumbing system 2500 coupled to both the inner garment 2600 and an outer garment 2700 (FIG. 27). Also as above, the inner garment 2600 may be made of a first material, and the outer garment 2700 will be made of a second material.

Generally, the inner garment 2600 is configured to be worn by a human form (here manikin 2100) and to support and route the blood plumbing system 2500 as desired. The inner garment 2600 may include a padding material 2610, one or more blood channel guides 2620 (FIG. 41) configured to route at least a portion of the blood plumbing system 2500 in a predetermined path, and an access fastener 2630 (FIG. 29) configured to facilitate dressing and undressing the manikin 2100.

The padding material 2610 may be a foamed synthetic rubber such as neoprene ("wetsuit material") or the like. The padding material 2610 may be selected in a thickness to simulate a layer of human flesh over a simulated blood vessel (e.g., simulated artery) to be palpated. For example, the padding material 2610 may be a sheet or layer of ~3 mm thick neoprene. Preferably, the padding material 2610 may be formed to substantially cover a torso of the manikin 2100 and well as portions of the limbs 2110 (generally resembling a "shortie wetsuit" by industry wetsuit standards, with half-length arms and legs). Beneficially, in this configuration, additional resistance to free movement may be provided to the individual limbs, providing additional realism, for example, as simulated muscle. It is understood that many different padding methods may be employed in combination or instead of the full torso/partial limbs covering (e.g., full body, target area, grid, etc.).

The one or more blood channel guides 2620 may be affixed to the padding material 2610, and configured to route the blood plumbing system 2500 in one or more predetermined paths, as discussed here and in further detail below. Preferably, the one or more blood channel guides 2620 will be made of elongated strips of fabric sewn to the padding material 2610 (e.g., a Cordura fabric strip sewn into the neoprene panel) and forming a tube sleeve/channel/passageway therebetween, where one or more tubes (blood channels 2530—see FIG. 40) may be slid into and guided along a predefined path. It is understood that many different fastening methods (e.g., fabric tubes, polymer tubes, rings, and clips, hook and latch fasteners, etc.) may be employed in combination or instead of the preferred fabric sleeve.

Preferably, the blood channel guides 2620 will be located on the inside of the padding material 2610 such that the guided or "routed" portion of the blood plumbing system 2500 is held between the padding material 2610 and the manikin 2100. As such, the inner garment 2600 may further include one or more vias 2640 passing through the padding material 2610. Each via 2640 may be configured to allow conduit of the blood plumbing system 2500 to pass through the inner garment 2600 after being routed as desired, and continue downstream to the outer garment 2700. According to one embodiment, the blood channel guides 2620 of the inner garment 2600 may cover substantially all portions of the blood plumbing system 2500 on the inside of the padding material 2610, after assembly. Beneficially, limiting the blood channel guides 2620 to the inner garment 2600 may provide for separation of the inner garment 2600 and the outer garment 2700 and flexibility of movement during transportation of the emergency casualty care suit 2400.

FIG. 29 is a back view of the exemplary emergency casualty care trainer of FIG. 27 having the outer garment removed, according to one embodiment of the disclosure. As above, the inner garment 2600 may include the padding material 2610, the one or more blood channel guides 2620, and the access fastener 2630. The access fastener 2630 may be configured to open and close portions of the inner garment 2600 to facilitate dressing the manikin 2100 with the inner garment 2600, and removal of the inner garment 2600 from the manikin 2100. Preferably, the access fastener 2630 will be a heavy duty zipper that is corrosion resistant, which extends down the entire back of the manikin 2100 and has reinforced stitching. This may be particularly beneficial as its full length facilitates dressing/undressing of a generally rigid human form. Further, the reinforced stitching may be advantageous where the padding material 2610 is neoprene and has a relatively strong spring forces resisting closure the inner garment 2600.

Returning to FIG. 27, as shown and as discussed above, the emergency casualty care suit 2400 may include the inner garment 2600 (FIG. 28) made of the first material, the outer garment 2700 made of the second material, and the blood plumbing system 2500 coupled to both the inner garment 2600 and an outer garment 2700. As shown, the outer garment is 2700 configured to be worn by the manikin 2100 over the inner garment 2600. The outer garment 2700 may include a skin cover 2710, an access fastener 2730 (FIG. 31), and one or more simulated wounds 2740.

The skin cover 2710 may be configured support and position the one or more simulated wounds 2740 about the manikin 2100 as desired. Further, the skin cover 2710 may be configured to cover the inner garment 2600 while being worn by the manikin 2100, sandwiching portions of the blood plumbing system 2500 as discussed below. Preferably, the skin cover 2710 will completely cover the inner garment 2600 when worn, and is preferably made of a second material selected so as to visually represent a human skin. For example, the skin cover 2710 may be colored in any shade of human skin for added realism. Further, the second material may be selected so as to tactilely represent a layer of human flesh covering a blood vessel (skin) for purposes of palpating (searching) for a blood vessel. As such, the second material may generally be thinner than the first material.

According to one embodiment, the skin cover 2710 may be made of a 2-way stretch material (i.e., elastic in two orthogonal directions) such as spandex, a spandex-polyester blend, a blend of polyester with spandex, and the like (the "second material"). In this way, the outer garment 2700 may stretch over or otherwise facilitate dressing the manikin 2100 as well as adjusting the one or more simulated wounds 2740 into position. Preferably, the second material will be selected to provide a similar tactile feel as skin for purposes of training the locating of a blood vessel via palpation.

FIG. 30 is a back view of the skin cover of the outer garment for an exemplary emergency casualty care trainer, according to one embodiment of the disclosure. As shown, the skin cover 2710 the outer garment 2700 may be reinforced. In particular, the skin cover 2710 may include both a flexible cover 2712 made of the second material and durable cover 2714 made of a third material. The third material may be a wear-resistant material such as canvas, textured nylon (e.g., Cordura nylon), and the like.

According to one embodiment, portions of the back side of the skin cover 2710 may include a third material. According to one embodiment, the wear-resistant fabric (i.e., the third material) may be sewn on top of the back of the 2-way stretch material (i.e., the second material). Alternately, the third material may replace portions of the second material and be sewn together at their edges. In addition, a flap cover of reinforced material (i.e., the third material) may be provided to cover the access fastener 2730, to provide similar benefits. Preferably, the reinforced material will be of a color similar to a shade of human skin.

Preferably, and as illustrated, the third material will substantially cover the back side of the outer garment 2700, i.e., without traversing either the left side nor the right side onto the front side. For example, the third material may cover the back side of the outer garment 2700 from proximate its bottom, to its shoulders, without crossing the shoulders onto the front side. According to the illustrated preferred embodiment, the wear-resistant reinforcement material of the skin cover 2710 may be sewn onto the back side of the 2-way stretch material of the skin cover 2710 from the bottom of the skin cover 2710 to the upper back, and between the left and right arms. Beneficially, in this preferred high performance configuration, the outer garment 2700, as a whole, will provide durability against wear, inter alia, when the manikin 2100 (FIG. 27) is dragged on its back on the ground, yet will still yield sufficiently to facilitate dressing and undressing the manikin 2100.

FIG. 31 is a back view of the exemplary emergency casualty care trainer of FIG. 27, according to one embodiment of the disclosure. As above, the outer garment 2700 may include may include the skin cover 2710, the access fastener 2730, and the one or more simulated wounds 2740.

The access fastener 2730 may be configured to open and close portions of the outer garment 2700 to facilitate dressing the manikin 2100 with the outer garment 2700, and removal of the outer garment 2700 from the manikin 2100. According to one embodiment, the access fastener 2730 may be a heavy duty zipper that is corrosion resistant, which extends down the entire back of the manikin 2100. This may be particularly beneficial as its full length facilitates dressing/undressing of a generally rigid human form. According to another embodiment, the access fastener 2730 may have reinforced stitching. According to yet another embodiment, the access fastener 2730 may include a fastener cover 2732. For example, the fastener cover 2732 may include extra material sewn in for protection of the full length of the zipper. As above, this extra material may be the reinforced material (the third material).

FIG. 32 is a detail view of one arm of the exemplary emergency casualty care trainer of FIG. 27, according to one embodiment of the disclosure. According to one embodiment, the access fastener 2730 may, in addition to the center, be configured to open and close portions of the arms of the outer garment 2700 to facilitate dressing the manikin 2100 with the outer garment 2700, and removal of the outer garment 2700 from the manikin 2100. In particular, the access fastener 2730 may open portions of the left and right arms of the outer garment 2700. The access fastener 2730 may include a zipper is placed on each arm to allow easier on and off of the outer garment, where the zipper extends from the top of the shoulder to the end of the outer garment 2700 along the respective arm.

FIG. 33 is a detail view of one leg of an exemplary emergency casualty care trainer, according to one embodiment of the disclosure. As shown, the skin cover 2710, the access fastener 2730, and/or the one or more simulated wounds 2740 may extend along one or more limbs. Also as shown, where the skin cover 2710 extends the full length of a limb (e.g., leg or long sleeve), the skin cover 2710 may include a limb retention strap 2716 configured to inhibit the leg or sleeve from rising up the limb.

Returning to FIG. 27, as shown and as discussed above, the emergency casualty care suit 2400 may include the inner garment 2600 (FIG. 28) made of the first material, the outer garment 2700 made of the second material, and the blood plumbing system 2500 coupled to both the inner garment 2600 and an outer garment 2700. As shown, the outer garment is 2700 configured to be worn by the manikin 2100 over the inner garment 2600. As above, the outer garment 2700 may include may include the skin cover 2710, the access fastener 2730 (FIG. 30), and the one or more simulated wounds 2740. Also as above, the emergency casualty care suit 2400 may be configured for training on hemorrhages, respiration and breathing management, and/or airway management. Further, one or more features described above, may be applicable and included in the emergency casualty care trainer 2000.

When configured for training on hemorrhages, the one or more simulated wounds 2740 may be "wet" or bleeding wounds or dry (non-bleeding) wounds. For example, the bleeding wounds may include a neck bleed, and arm bleed, a groin bleed, a torso bleed, a chest bleed, a leg bleed, and the like, just to name a few. Also for example, the dry wounds may include cuts, burns, abrasions, shrapnel wounds, bullet wounds, and the like, just to name a few.

Preferably, each wet or dry wound may be made of a silicone material or the like, and arranged to have realistic texture and color. For example, a prosthetic mask grade silicone rubber may be used. As such, the one or more simulated wounds 2740 may be functional and interactive for treatment, and/or may be "non-functional" and merely included for added realism.

When configured as a functional or interactive bleeding wound the simulated wound 2740 may be fluidly coupled to the blood plumbing system 2500 (physically coupled to the inner garment 2600) via downstream pass-through connectors. For reference, upstream commonly refers to a fluid direction towards its source, and downstream commonly refers to a fluid direction towards its bleed exit.

Further, when configured as a functional or interactive bleeding wound, the simulated wound 2740 may be treated with wound packing techniques, and/or tourniquets dependent on wound location. For example, when configured as arm and/or leg wounds, the simulated wound 2740 may be treatable by tourniquet or wound packing techniques (coordinated with the blood plumbing system 2500). Also for example, when configured as neck and/or groin wounds, the simulated wound 2740 may be exclusively treatable by wound packing techniques known as "junctional' hemorrhages (also coordinated with the blood plumbing system 2500). Also for example, the simulated wound 2740 may be made to be amenable to treatment with an occlusive or non-occlusive dressing (e.g., made from materials amenable to skin adhesives, etc.)

When configured for respiration and breathing management, the outer garment 2700 may further include one or more decompression needle pads 2750. Needle decompression is a life-saving maneuver performed for the stabilization of a tension pneumothorax. Generally, in needle decompression, the trainee tactilely locates the second intercostal space (space between the second and third ribs) at the midclavicular line (imaginary vertical line in the body at the middle of the clavicle), and inserts a large needle (14 gauge or larger) attached to a catheter into the spot where the midclavicular line crosses the second intercostal space at an angle that is perpendicular to the chest.

Each decompression needle pad 2750 may be made of a resilient material that is at least partially self-healing or otherwise adapted for repeated needle insertions. In particular, as with the simulated wounds above, the silicone pad may be made of a similar silicone rubber. For example each decompression needle pad 2750 may include a silicone rubber pad that is less than 1 centimeter thick.

Each decompression needle pad 2750 may be may be sized, dimensioned, and positioned on the outer surface of the outer garment 2700 anatomically, for training needle decompression techniques. In particular, one or more decompression needle pad 2750 may extend across a target area for the particular needle decompression technique to be trained on. According to one embodiment, the target area for the particular needle decompression technique to be trained on may include immediately surrounding areas so as to obfuscate the precise injection location or otherwise require the trainee to locate it. In such an arrangement, the decompression needle pad 2750 may made sufficiently compliant to locate underlying markers/landmarks (e.g., ribs). Alternately, such markers may be integrated into the decompression needle pad 2750.

According to one embodiment, the one or more decompression needle pads 2750 may extend across an area of the outer surface of the outer garment 2700 in alignment with the abovementioned second intercostal space of the manikin 2100 (when worn). For example, this decompression needle pad 2750 may be, preferably, a single pad across the entire chest, or two individual pads on each side of the midclavicular line.

According to another embodiment, the one or more decompression needle pads 2750 may be similarly configured for axillary needle decompression techniques. In particular, the one or more decompression needle pads 2750 may extend across the respective target areas on one or both sides of the outer surface of the outer garment 2700 (generally along the ribs and under the armpits of the manikin 2100—when worn).

According to another embodiment, the one or more decompression needle pads 2750 may be combined with one or more simulated wounds 2740 as described above. In particular, a single molded member may include wound features (wet and/or dry) as well as decompression needle padding. For example, as illustrated, the decompression needle pad 2750 extending across the manikin's chest includes several above-mentioned features (i.e., dry, functional bullet wound, with single decompression needle pad across two separate target locations and including immediately surrounding areas) integrated into a single silicone rubber molded member.

FIG. 34-38 show a method of manufacturing a simulated wound and/or a decompression needle pad for an exemplary emergency casualty care trainer, according to one embodiment of the disclosure. Generally, the simulated wound 2740 may include an outer layer 2742 coupled to an inner layer 2744, forming a cavity 2743 therebetween. The outer layer 2742 may be configured to realistically represent a wound visually, tactilely, and/or functionally. Likewise, the inner layer 2744 may be configured to realistically represent a wound visually, tactilely, and/or functionally. For example, outward facing portions of the wound may be realistically painted. Generally the decompression needle pad 2750 may be manufactured as the outer layer 2742, as follows.

Referring to FIGS. 34-36, in a preferred embodiment, the outer layer 2742 of the simulated wound 2740 may be manufactured as a polymer (e.g., silicone rubber) cured on top of and impregnated into the second material of the skin cover 2710. In particular, an uncured polymer may be poured into a wound mold 2901 that is configured to impart the desired outward facing features of the outer layer 2742 of the simulated wound 2740. For example, the features may include damaged skin and foreign matter. Next, the skin cover 2710 or a portion thereof (e.g., a panel) may be positioned over the mold so as to be wetted before curing.

Once the polymer has cured into the matrix of the skin cover 2710, the outer layer 2742 of the simulated wound 2740 may be removed from the wound mold 2901 and a bleed exit 2741 may be cut from the outer layer 2742. As shown, the bleed exit 2741 may traverse the outer layer 2742 from the wetted area 2747 to the front surface of the outer layer 2742 forming a port therethrough. Preferably, the bleed exit 2741 may be sized according to a maximum desired blood flow.

Now referring to FIG. 37, in a preferred embodiment, the inner layer 2744 of the simulated wound 2740 may be manufactured as a cured polymer (e.g., cured silicone rubber) having a substantially flat shape. As above, an uncured polymer may be poured into a wound mold 2901 (FIG. 34) that is configured to impart the desired outward facing features of the inner layer 2744 of the simulated wound 2740. Here, however, the features may be of muscle tissue and the overall shape may be generally flat.

Once the polymer has cured, for example, a wound interface 2536 and/or a simulated blood vessel 2539 may be positioned over the outward facing side of the inner layer 2744. Next, a seal 2746 may be added to a periphery of the inner layer 2744 (e.g., along the edge of its the outward facing side) and about the simulated blood vessel 2539 proximate the periphery.

Now referring to FIG. 38, next, the wetted area 2747 of the outer layer 2742 may be mated to and subsequently cured (or otherwise adhered) to the seal 2746 of the inner layer 2744, such that the cavity 2743 is formed between the outer layer 2742 and the inner layer 2744, such that the cavity 2743 is completely sealed about the simulated blood vessel 2539, and such that inner side of the bleed exit 2741 is positioned with the cavity 2743. According to one embodiment, additional sealing and coupling may be added to the outer layer 2742 and the inner layer 2744.

FIG. 39 is a detail view of a head area of the exemplary emergency casualty care trainer of FIG. 27, according to one embodiment of the disclosure. As above, the emergency casualty care suit 2400 may be configured for training on hemorrhages, respiration and breathing management, and/or airway management. When configured for airway management, the outer garment 2700 may further include a mask 2760 configured to be worn over the head 2150 (FIG. 28) of the manikin 2100 (FIG. 28).

Returning to FIG. 31, according to one embodiment, the mask 2760 of the outer garment 2700 may further include a head access fastener 2769. In particular, the head access fastener 2769 may be configured to open and close portions of the outer garment 2700 to facilitate dressing the manikin 2100 with the outer garment 2700, and removal of the outer garment 2700 from the manikin 2100.

According to one embodiment, the head access fastener 2769 may be a heavy duty zipper that is corrosion resistant, which extends down the entire back of the head 2150 (FIG. 28) of the manikin 2100. This may be particularly beneficial as its full length facilitates dressing/undressing of a generally rigid bulbous head. Preferably, a gap may be provided between the head access fastener 2769 of the mask 2760 and the access fastener 2730 of the outer garment 2700, sized and dimensioned to permit free passage of the hanger 2130 of the manikin 2100. Advantageously, the entire emergency casualty care suit 2400 may be cleaned while the manikin 2100 is dressed, and may facilitate dressing/undressing the manikin 2100 as well.

According to another embodiment, the head access fastener 2769 may have reinforced stitching. According to yet another embodiment, the head access fastener 2769 may be configured to appear as the back of a human head, which may be accomplished with paint, a cover, or a combination thereof. Further, the cover may incorporate the reinforced material (the third material) described above.

Returning to FIG. 39, in this masked configuration, the emergency casualty care trainer 2000 may also be configured for training on airway obstruction (i.e., responsive to the airway being managed by rapid and aggressive opening of the airway—to include cricothyroidotomy). In particular, the emergency casualty care trainer 2000 may further include a trachea module 2820 and a trachea cover 2830 (FIG. 27). Referring also to the Hemorrhage Control Trainer (HCT) 1100 (shown in FIG. 19), here, the mask 2760 may be similar to the training suit head 1140 (shown in FIG. 19); the trachea module 2820 may be similar to the trachea module 1136 (shown in FIG. 23); and the trachea cover 2830 may be similar to the skin cover 1138 (shown in FIG. 24).

According to one embodiment, the mask 2760 may be made using conventional prosthetic mask materials and techniques. According to another embodiment, the entire mask may be made apart from the skin cover 2710 of the outer garment 2700, and subsequently attached to it proximate a neck area. For example, a silicone head skin of the mask 2760 may be sewn onto the top (e.g., neck/collar) of the outer garment 2700.

As shown, the mask 2760 of the outer garment 2700 may include a mask nose 2762, a mask mouth 2764, and a trachea module insertion area 2766. The mask 2760 may be configured to work in conjunction with the head 2150 (FIG. 28) of the manikin 2100 such that all air passageway are mated and aligned and such that the airway 2156 (FIG. 28) is unobstructed (discounting any object intentionally placed for training). Beneficially, this may provide for airway adjuncts to include supraglottic, OPA, NPA and surgical airways.

Likewise, the mask 2760 may be configured to work in conjunction with a trachea module 2820 and a trachea cover 2830 similar to the Hemorrhage Control Trainer (HCT). For example, the trachea module insertion area 2766 may be a cavity formed into the neck area of the mask and allows for the insertion of molded silicone anatomically correct trachea (trachea module 2820), which can be covered with a silicone molded neck skin fastenable via a hook and loop fastener (trachea cover 2830).

According to one embodiment, the mask 2760 may further include at least one simulated wound 2740 as described above. According to another embodiment, the simulated wound 2740 may be dry, wet, functional, non-functional, or any combination thereof. Where the simulated wound 2740 is a bleeding wound, it too may fluidly couple to blood plumbing system 2500, as described above. Further, the simulated wound 2740 may include maxillofacial trauma not found elsewhere on the body.

FIG. 40 is a detail view of a blood channel of a blood plumbing system of an exemplary emergency casualty care trainer, according to one embodiment of the disclosure. As above, the emergency casualty care suit 2400 may include the blood plumbing system 2500 coupled to the inner garment 2600 and the outer garment 2700. The blood plumbing system 2500 is generally configured to deliver a simulated blood from the blood supply system 2200 to each simulated wound 2740 of the outer garment 2700, and at times passing through the inner garment 2600. As above, upstream refers to a fluid location closer to the blood supply system 2200, and downstream refers to a fluid location closer to the bleed exit 2741 of the simulated wound 2740.

The blood plumbing system 2500 may include at least one blood supply system interface 2520 and at least one blood channel 2530 fluidly coupled to the blood supply system interface 2520. According to one embodiment, the blood supply system interface 2520 may include one or more quick disconnect connectors configured to allow for rapid connection to simulated blood pumping systems. For example, where the blood plumbing system 2500 includes a plurality of blood channels 2530, the blood supply system interface 2520 may be configure as a plurality of individual (dedicated) quick disconnects, a single quick disconnect arraigned as a manifold or the like, or any combination thereof.

According to one embodiment, the blood channel 2530 may include a routing conduit 2534 and a wound interface 2536 (FIG. 37). The routing conduit 2534 may be fluidly coupled to and interspersed between the blood supply system interface 2520 (upstream) and wound interface 2536 (downstream).

According to one embodiment, the blood channel 2530 may further include a channel identifier 2532 configured to positively identify which simulated wound 2740 the blood channel 2530 pertains to. For example, the channel identifier 2532 may be a unique color or other indicia of how the blood channel 2530 should be routed, which is attached or otherwise present on at least a portion of the blood channel 2530. Preferably, the channel identifier 2532 may be added proximate an upstream end and/or a downstream end of one or more elements of the blood channel 2530. Further, the channel identifier 2532 may be added to any segment of the blood channel 2530 that is exposed to view when the blood channel 2530 is assembled in its respective blood channel guide 2620.

For example, and as shown, the channel identifier 2532 may include a uniquely colored portion proximate the downstream end of the routing conduit 2534. Also for example, and as shown, the channel identifier 2532 may include a uniquely colored portion proximate the downstream end of the routing conduit 2534. This may be accomplished by heat shrinking a colored sleeve to each end of the routing conduit 2534. In this configuration, the blood channel 2530 may be readily identifiable during manufacture, assembly, coupling, and repair. This may be particularly advantageous were a plurality of the blood channel 2530 are employed.

According to one embodiment, the blood channel 2530 may further include a simulated blood vessel 2539 (FIG. 37) fluidly coupled to routing conduit 2534. Where the blood channel 2530 includes both the routing conduit 2534 and the simulated blood vessel 2539, the routing conduit 2534 may be fluidly positioned upstream of the simulated blood vessel 2539. Preferably, the routing conduit 2534 and the simulated blood vessel 2539 will be fluidly coupled via an interconnect 2535 (e.g., conventional plastic pass through connector). In some embodiments, the wound interface 2536 may be integrated as at least a portion of the simulated blood vessel 2539.

According to one embodiment, the blood channel 2530 may further include an extension conduit 2538 fluidly coupled to routing conduit 2534. Since many elements of the emergency casualty care suit 2400 will be handmade, the extension conduit 2538 may be added to take up manufacturing tolerances, and may be configured to be trimmed during final assembly, as needed. In some embodiments, the extension conduit 2538 may be integrated as at least a portion of the simulated blood vessel 2539. Preferably, the routing conduit 2534, the extension conduit 2538, and the simulated blood vessel 2539 will be fluidly coupled via interconnects 2535 (e.g., conventional plastic pass through connector). For example, a pass-through connector (interconnect 2535) may be attached to the downstream end of each tube/hose segment, and coupleable to the upstream end of a serially adjacent tube/hose.

Where the blood channel 2530 includes both the routing conduit 2534 and the extension conduit 2538, the routing conduit 2534 may be fluidly positioned upstream of the extension conduit 2538. Where the blood channel 2530 includes the routing conduit 2534, the extension conduit 2538, and the simulated blood vessel 2539, the extension conduit 2538 may be fluidly positioned upstream of the simulated blood vessel 2539.

Preferably, the routing conduit 2534 may be made of a stiff material (such as rubber hose) that reduces inadvertent occlusion risks (e.g., when the system is moved). In contrast, the simulated blood vessel 2539 may be made of a more flexible material (such as silicone hose) that specifically provides for occlusion of plumbing during training (e.g., when medical devices are used to stop "bleeding" by compressing the tube). Similarly, the extension conduit 2538 may be made of a material that is easy to cut (such as with scissors). According to one embodiment, the extension conduit 2538 may be made of a silicone hose, and/or may be made of the same material as the simulated blood vessel 2539.

FIG. 41 is a detail view of a blood plumbing system of an exemplary emergency casualty care trainer, according to one embodiment of the disclosure. Here, an upper (shoulder) portion of the inner garment 2600 is shown turned inside out. As illustrated, the blood plumbing system 2500 may preferably include a plurality of blood channels 2530. According to one embodiment, the blood plumbing system 2500 may include four blood channels 2530 configured to supply the simulated blood to a simulated wound 2740 representing a neck bleed, an arm bleed, a groin bleed, and a leg bleed, respectively. Further, each of the four blood channels 2530 may include a unique channel identifier 2532 (e.g., neck channel color coded red, arm channel color coded yellow, groin channel color coded green, leg channel color coded blue).

According to one embodiment, the inner garment 2600 may include a blood channel union 2660 configured to unite and hold the upstream ends of the plurality of blood channels 2530 securely in a predefined location (e.g., top back of shoulder). Preferably, the blood channel union 2660 may be configured to position the blood supply system interface 2520 of each blood channel 2530 (e.g., four quick disconnects) in one convenient location for connection to the blood supply system 2200 (FIG. 27). According to one embodiment, the blood channel union 2660 may be a reinforced fabric fold over patch (e.g., Cordura nylon patch) having toolless fastener (e.g., hood and latch fastener), which is configured to receive and secure in place the plurality of blood channels 2530 via opening and closing the toolless fastener over the plurality of blood channels 2530

According to one embodiment, the emergency casualty care suit 2400 may be assembled by routing the blood plumbing system 2500 the inner garment 2600 and coupling it to the outer garment 2700 (FIG. 27). In particular, the upstream end of the blood plumbing system 2500 may be secured by the blood channel union 2660, but leaving the blood supply system interface 2520 and the channel identifier 2532 exposed so as to be readily and fluidly coupleable to the blood supply system 2200 (e.g., via one or more quick disconnect connectors). It is understood that the blood plumbing system 2500 may include one or more blood channels 2530. Next the routing conduit 2534 of the blood plumbing system 2500 may be plumbed underneath the padding material 2610 and through the blood channel guide 2620 of the inner garment 2600 as desired. Preferably, the routing conduit 2534 may terminate between 2-6 inches from the via 2640 of the inner garment 2600, continued by the extension conduit 2538 (FIG. 40). Next the extension conduit 2538 of the blood plumbing system 2500 may be plumbed and passed through the padding material 2610 via the via 2640 (FIG. 28) and on to the outer garment 2700 (with the exception of the neck bleed, which the routing conduit 2534 may pass through a neck opening and couple directly to the neck wound, without the need for the extension conduit 2538). The extension conduit 2538 (where used) may be trimmed as needed, such that approximately an inch or less of the extension conduit 2538 extends beyond the via 2640. Next the extension conduit 2538 may be fluidly coupled to the simulated blood vessel 2539 (which may be integrated in advance as part of the simulated wound 2740 of the outer garment 2700. While the simulated blood vessel 2539 is not in a channel, it is anatomically positioned (e.g., proximate an associated artery) and it is left free to provide for its proper occlusion medical devices. Additionally, not being in the channels allows for more realism by not having stitching that would give a user landmarks to place a medical device.

FIG. 42 shows a flow harness of a blood supply system of an exemplary emergency casualty care trainer, according to one embodiment of the disclosure. As above, the blood supply system 2200 is configured to supply a simulated blood to the blood plumbing system 2500 (and ultimately to each simulated wound 2740) of the emergency casualty care trainer 2000. As shown, the blood supply system 2200 may include a flow harness 2210 configured to communicate the simulated blood from an offboard fluid supply system to the blood supply system interface 2520 of each blood channel 2530. According to one embodiment, and as shown, the flow harness 2210 may include at least one tube 2212 configured to communicate the simulated, at least one flow valve 2214 (e.g., micro valve) configured to manually control flow (e.g., between full open and full closed), and at least one fluid couple 2216 configured to mate with the blood supply system interface 2520.

Open Surgery Simulator

As above, the present disclosure relates to systems, devices, and methods for use in medical simulation and training, providing realistic-looking medical effects. More particularly, aspects of the present disclosure systems, devices, and methods for simulating an open surgery environment. As disclosed herein, an open surgery simulator may stand alone or work in combination with (e.g., wear or otherwise incorporate) one or more of the various suits and wound and injury trainers discussed above. Further, it is understood that the various teachings above may be equally applicable hereafter.

FIG. 43 is a schematic diagram of an exemplary open surgery simulator, according to one embodiment of the disclosure. In accordance with the present disclosure, an open surgery simulator 3000, may generally include a simulated torso 3100 configured to anatomically and realistically appear as a human torso. In particular and as described in greater detail below, the simulated torso 3100 may include at least one of a torso back shell 3110, a muscle backing 3120, a rib cage module 3130, a plumbed spine 3160, and a pelvis module 3168. In addition, the simulated torso 3100 may include a chest cavity 3102 anatomically located behind the rib cage module 3130, and/or an abdominal cavity 3104 anatomically located below the rib cage module 3130. The simulated torso 3100 may be configured to lay flat on its back, to sit/stand upright, and/or to be hung upright (e.g., via a hanger 3183). Preferably, the simulated torso 3100 may be headless and limbless (or substantially limbless).

The simulated torso 3100 may include one or more torso attachments 3180 that are similarly configured to anatomically and realistically appear as human appendages. For example, the torso appendages 3180 may include between one and four limbs 3181, each of which may include one or more articulated joints 3182. Further, the simulated torso 3100 may include a head 3185, which also may articulate in one or more degrees (e.g., via a neck). Further, the head 3185 may be configured for performance of a cricothyroidotomy (e.g., including a neck access to a trachea module 1136—FIGS. 19-20 and 23-24) The one or more torso attachments 3180 may be integrated into the simulated torso 3100, removably attached, or a combination thereof. Preferably, any removably attached items will be manually removable (e.g., toollessly or with hand tools). In some embodiments, one or more of the torso attachments 3180 may be configured as, or otherwise include features of, the analogous items described above (e.g., flesh wounds, airway damage, bleeding injuries, and the like).

As above, one or one or more torso attachments 3180 may be integrated into the simulated torso 3100, removably attached, or a combination thereof. Also as above, any removably attached elements will preferably be manually removable. In some embodiments, one or more of the torso attachments 3180 may be configured as, or otherwise include features of, the analogous items described above.

According to one embodiment, and as described in greater detail below, the open surgery simulator 3000 may include an onboard fluid delivery system 3300 configured to deliver at least one of air and one or more simulated body liquids (e.g., simulated blood, urine, organ fluid, etc.) to and/or from components of the open surgery simulator 3000. In particular, the onboard fluid delivery system 3300 may include at least one of a pressurized hydraulic circuit and a pneumatic circuit. Each circuit may be closed, open, dynamic (e.g., convertible between closed to open once severed or otherwise opened), or any combination thereof. Further, and as discussed further below, the plumbed spine 3160 may be configured to route and conceal portions of the onboard fluid delivery system 3300.

According to one embodiment, the onboard fluid delivery system 3300 may be configured to fluidly couple to an offboard fluid supply system 3400. In particular, the offboard fluid supply system 3400 may be configured to supply or circulate at least one of air and one or more simulated body liquids with the onboard fluid delivery system 3300. Further, the offboard fluid supply system 3400 may be similar to the various blood supply systems above. For example, the offboard fluid supply system 3400 may include any appropriate combination of fluid storage, fluid energizer, and a flow harness.

FIG. 44 is a schematic diagram of an exemplary open surgery simulator, showing aspects of its fluid system, according to one embodiment of the disclosure. As above, the open surgery simulator 3000 may include or otherwise be configured to interface and operate with the onboard fluid delivery system 3300 and the offboard fluid supply system 3400. Also as above, the onboard fluid delivery system 3300 may be fluidly coupled to the offboard fluid supply system 3400 via a flow harness 3410.

Generally, the flow harness 3410 may be configured to fluidly interconnect the onboard fluid delivery system 3300 and the offboard fluid supply system 3400. In particular, the flow harness 3410 may include a simulator interface 3412 configured to fluidly couple to the flow harness 3410 to the onboard fluid delivery system 3300, at least one fluid conduit 3414 (e.g., any combination of rigid tubing, flexible tubing, manifolds, connectors, etc.) fluidly coupled to the simulator interface 3412, and an offboard fluid supply interface 3416 fluidly coupled to the at least one fluid conduit 3414. To illustrate, the flow harness 3410 may include one or more features of the flow harness 2210 in FIG. 42.

According to one embodiment, the flow harness 3410 may further include at least one media flow control 3418. In particular, each media flow control 3418 may be arranged as a user-operated controller configured to modify the flow of the media (e.g., simulated blood, air, etc.) communicated through the at least one fluid conduit 3414. For example, the media flow control 3418 may be a two-position flow valve, a pressure relief or bypass valve, a variable pressure or flow valve, etc. Further, each fluid conduit 3414 may have a dedicated media flow control 3418. Alternately, a plurality of fluid conduit 3414 may be fluidly coupled to a single media flow control 3418.

Preferably, the flow harness 3410 may be a stand-alone unit, however, one or more of its components or functions may be integrated into or shared with the onboard fluid delivery system 3300 and/or the offboard fluid supply system 3400. Similarly, one or more components or functions of the flow harness 3410 may be duplicated or otherwise redundant with the onboard fluid delivery system 3300 and/or the offboard fluid supply system 3400. For example, both the offboard fluid supply system 3400 and the flow harness 3410 may include their own media flow controls.

Generally, the offboard fluid supply system 3400 may be configured to supply at least one of air and one or more simulated body liquids, and may include a simulator interface 3420 configured to fluidly couple to the flow harness 3410 (or directly to the onboard fluid delivery system 3300, where no flow harness 3410 is employed), Preferably, the simulator interface 3420 will include one or more standardized toolless couplings. It is understood that the offboard fluid supply system 3400 may include any appropriate user interface and electronics conventionally used 3450.

The offboard fluid supply system 3400 may further include at least one of a liquid system 3430 and a gas system 3440, each being specialized for its particular media. The gas system 3430 may include a pneumatic tank 3442, a compressor 3444 such as pump, and a gas flow selector 3446. The gas flow selector 3446 may range anywhere from a pressure regulator or a simple on/off selector, to a variable pressure valve or an automated charge/exhaust valve. According to one embodiment, the gas flow selector 3446 (or portions thereof) may be integrated into the flow harness 3410.

Similarly, the liquid system 3430 may include a reservoir 3432, a liquid energizer 3434 such as pump, and a liquid flow selector 3436. The liquid flow selector 3436 may range anywhere from a pressure regulator or a simple on/off selector, to a variable pressure regulator or an automated pressure regulator. According to one embodiment, the liquid flow selector 3436 (or portions thereof) may be integrated into the flow harness 3410.

While the liquid system 3430 may generally be configured to maintain a predetermined flow or pressure of the system media, according to one embodiment, the liquid system 3430 may be further configured to maintain a pressure or volume profile of the media. For example, where the media is a simulated blood 3452, the liquid flow selector 3436 may be configured to supply the simulated blood 3452 to the onboard fluid delivery system 3300 with a pressure or volume profile of a normal pulse, an irregular pulse, a venal flow, a "bleed out" flow (i.e., decreasing flow and weakening pulse), etc. Further, each pressure or volume profile may be programmable or otherwise selectable by a user.

According to one embodiment, the offboard fluid supply system 3400 may be configured to supply diverse system media. In particular, the offboard fluid supply system 3400 may include a first liquid system 3430 configured to deliver the simulated blood 3452 and a second liquid system 3430 configured to deliver an other simulated body fluid 3454 (e.g., urine, plasma, stomach acid, etc.). Further, the offboard fluid supply system 3400 may include gas system 3430 configured to deliver compressed air 3456 according to a profile representative of normal breathing, irregular breathing, wheezing, etc.

According to one embodiment the offboard fluid supply system 3400 may be configured to supply the same system media according to diverse profiles. In particular, the offboard fluid supply system 3400 may include a first liquid system 3430 configured to deliver the simulated blood 3452 according to a first media profile, and a second liquid system 3430 also configured to deliver the simulated blood 3452 according to a second media profile. For example, the first liquid system 3430 and the second liquid system 3430 may include independent liquid flow selectors 3436, but share a single reservoir 3432. Further, the first liquid system 3430 and the second liquid system 3430 may share a common pump, or alternately, each have an independent pump. Moreover, where there are a plurality of liquid systems 3430 configured to deliver the simulated blood 3452, each may be further configured to deliver the simulated blood 3452 according to a distinct pressure and/or volume profiles. For example, the first liquid system 3430 may be configured to supply "arterial blood" and the second liquid system 3430 may be configured to supply "venal blood".

Generally, the onboard fluid delivery system 3300 may be configured to deliver at least one of the various abovementioned system media into and through the simulated torso 3100. The onboard fluid delivery system 3300 may include and appropriate plumbing such as at least one fluid channel 3310 and at least one fluid supply system interface 3320 configured to fluidly couple to the flow harness 3410. In particular, the at least one fluid channel 3310 may include any combination of tubing, connectors, and manifolds, and may be plumbed in series (i.e., dedicated lines), in parallel (i.e., shared lines), or any combination thereof. To illustrate, the at least one fluid channel 3310 may include one or more blood channels 2530 of the blood plumbing system 2500 described above, or similar plumbing components adapted for each media plumbed. Preferably, the fluid supply system interface 3320 will include one or more standardized toolless couplings. As above, one or more portions of the onboard fluid delivery system 3300 may be integrated into or with the flow harness 3410.

The onboard fluid delivery system 3300 may further include at least one of a liquid system 3330 and a gas system 3340. The liquid system 3330 and the gas system 3340 may be adapted to be supplied with their respective media by the liquid system 3430 and the gas system 3440 of the offboard fluid supply system 3400, respectively.

Each of the liquid system 3330 and the gas system 3340 may include at least one or more of a closed fluid circuit 3301 and of an open fluid circuit 3302. In particular, each closed fluid circuit 3301 and each open fluid circuit 3302 may be specialized for its respective system media and application. For example, in the chest cavity, the gas system 3340 may include a closed fluid circuit 3301 in fluid communication with a simulated lung 3202, which is then operable (e.g., pneumatically) to simulate breathing when supplied with the compressed air 3456. Also for example, the liquid system 3330 may include a closed fluid circuit 3301 in fluid communication with a simulated heart 3204, which is then operable (e.g., hydraulically) to simulate beating when supplied with the pressurized simulated blood 3452. Also for example, externally, the liquid system 3330 may include an open fluid circuit 3302 in fluid communication with a simulated external would 3514 (e.g., affixed to a simulated limb or skin cover), which is then configured to simulate bleeding when supplied with a flow of the simulated blood 3452.

According to one embodiment, the liquid system 3330 may include both closed and open circuits. In particular, the liquid system 3330 may include a closed fluid circuit 3301 the converts to an open fluid circuit 3302 when operated on by a user. For example, in the abdominal region, the liquid system 3330 may include a closed fluid circuit 3301 in fluid communication with a simulated liver 3206 embedded within the prosthetic internal organ module 3200, supplying it with a flow of the simulated blood 3452, which is then configured to simulate bleeding only being cut open by a user, thus opening the closed fluid circuit 3301 and creating an open fluid circuit 3302.

Also example, the liquid system 3330 may include a closed fluid circuit 3301 in fluid communication with a simulated artery 3208, supplying it with the simulated blood 3452 under pressure, which is then configured to simulate bleeding only being cut open by a user, thus opening the closed fluid circuit 3302. Similarly, the liquid system 3330 may include a closed fluid circuit 3301 in fluid communication with a simulated urinary tract 3207 (e.g., bladder and penis), supplying it with another simulated body fluid 3454 (e.g., urine, pus, etc.), which may begin to flow once fluid pressure is applied. As shown, at least one of the simulated urinary tract 3207 and a simulated artery 3208 may be partially embedded within the prosthetic internal organ module 3200, passing therethrough. While the several examples illustrate various circuits specialized for their respective system media and application, it should be understood that many more combinations are contemplated.

FIG. 45 is a front view of an exemplary open surgery simulator, according to one embodiment of the disclosure. FIG. 46 is a back view of the open surgery simulator of FIG. 45. FIG. 47 is a left side view of the open surgery simulator of FIG. 45. As above, the open surgery simulator 3000 may include the simulated torso 3100, which may be configured to be both headless and limbless.

As illustrated, the open surgery simulator 3000 may further include an outer covering 3500. In particular, the outer covering 3500 may be configured to substantially envelope the simulated torso 3100, where at least a portion of the outer covering 3500 is configured to simulate human skin (e.g., visually, tactilely, mechanically, anatomically, etc.). Preferably, the outer covering 3500 will include a simulated skin portion 3510 blended with or otherwise coupled to a covering accessibility portion 3520. For example, each portion may be sewn or otherwise joined together. Also for example, the simulated skin portion 3510 may be manufactured as a polymer (e.g., silicone rubber) cured on top of and impregnated into the covering accessibility portion 3520.

The simulated skin portion 3510 is configured to simulate human skin (e.g., visually, tactilely, mechanically, anatomically, etc.). In particular, the simulated skin portion 3510 may be arranged to cover any and all areas where the skin must be breached or otherwise manipulated during medical training. According to one embodiment, and as described above, the simulated skin portion 3510 may be colored and textured to simulate human skin (e.g., made of a polymer such as silicone rubber, a deformable fabric such as spandex, or any combination thereof, colored in any shade of human skin). Preferably, and as illustrated, the simulated skin portion 3510 will substantially cover the front of the simulated torso 3100, and wrap around to reach portions of the back of the simulated torso 3100, thus providing a more realistic training environment, while still providing ease of access to the simulated torso 3100.

According to one embodiment, the simulated skin portion 3510 may include one or more anatomic features 3512. In particular, the one or more anatomic features 3512 may be configured as body landmarks (e.g., muscle structure), functional features (e.g., male/female genitalia or bleeding wounds), and/or details added for improved realism (e.g., scars, inactive wounds, etc.). For example, the one or more anatomic features 3512 may be configured using any of the various techniques described above and throughout.

According to one embodiment, and as described above, the functional features of the one or more anatomic features 3512 may be plumbed to the onboard fluid delivery system 3300, or otherwise be coordinated with functional features of the open surgery simulator 3000. For example, and as shown, anatomic features 3512 such as male/female genitalia may be plumbed or otherwise configured to discharge simulated waste matter. Also for example, anatomic features 3512 such as bleeding wounds may be plumbed or otherwise configured to discharge simulated blood, as described above.

The covering accessibility portion 3520 may generally be configured to substantially envelope portions of the simulated torso 3100 not covered by the simulated skin portion 3510 and provide for ease of installation and removal, or dress and undress, if the simulated torso 3100. Preferably, and as illustrated, the covering accessibility portion 3520 will extend from the groin area downward and backward, and from the neck area upward and back, covering any partial appendages (e.g., shoulders and thighs) joining in the middle of the back, thus resembling clothing, while still providing ease of access to the simulated torso 3100.

According to one embodiment, the covering accessibility portion 3520 may include a fastener 3522 and a fitted fabric 3524 contoured to fit the form the simulated torso 3100 when the fastener 3522 is closed. In particular, the fitted fabric 3524 may be configured to conform to contours of the simulated torso 3100 (e.g., by predefined form or via deformability), and the fastener 3522 may be any conventional fastener configured to hold the fitted fabric 3524 in position during use and release the fitted fabric 3524 during dress and undress.

Preferably, the fastener 3522 will embodied as a heavy duty zipper extending from the top of the simulated torso 3100 to at least a lower back or buttocks area of the simulated torso 3100. According to one embodiment, the fitted fabric 3524 may be a durable, elastic material such as neoprene. Other materials contemplated may have greater deformability (e.g., spandex and the like) or lesser deformability (e.g., denim, Cordura fabric, and the like). Further, the fitted fabric 3524 may colored the same as or similar to simulated skin portion 3510.

According to one embodiment, the outer covering 3500 may further include a plumbing interface 3530 such as an opening proximate the neck or back of the simulated torso 3100, thus permitting conduit to penetrate the outer covering 3500 when worn by, or otherwise installed on the simulated torso 3100. It is understood that the outer covering 3500 may be embodied as one or more of the coverings/suits described above, including any appropriate modifications.

FIG. 48 is a front view of a detail of an exemplary open surgery simulator, showing an exemplary simulated torso, according to one embodiment of the disclosure. As shown, the simulated torso 3100 is configured to represent subdermal environment of the human torso and may include a torso back shell 3110, a muscle backing 3120, and a rib cage module 3130. Generally, the torso back shell 3110 may be configured as a protective shell housing, shaped as a at least a portion of a human torso, the muscle backing 3120 may be nested within the torso back shell 3110, and the rib cage module 3130 may be coupled to the torso back shell 3110, in front of the muscle backing 3120.

Further, the simulated torso 3100 may include or be configured to be used with a prosthetic internal organ module 3200. Generally, and as above, the prosthetic internal organ module 3200 may include and enclose, or otherwise package a plurality of prosthetic organs, which simulate the internal organs of a human including the shape, color, and texture. Also as above, the prosthetic internal organ module 3200 may include all, or some of the internal organs of a human, depending on the needs of the simulation.

As shown, the prosthetic internal organ module 3200 may be positioned in the torso back shell 3110, in front of the muscle backing 3120. The prosthetic internal organ module 3200 may be configured to include abdominal organs and features. Further, the prosthetic internal organ module 3200 may be configured to include organs and features within the chest cavity. According to one embodiment, the prosthetic internal organ module 3200 may be bifurcated (e.g., separated into chest cavity and abdominal modules), positioned, secured, and separated by a simulated diaphragm (not shown).

FIG. 49 is a front view of a detail of an exemplary open surgery simulator, showing a partially assembled chest cavity of an exemplary simulated torso, according to one embodiment of the disclosure. As above, the open surgery simulator 3000 may include the simulated torso 3100 and the onboard fluid delivery system 3300. Also as above, the simulated torso 3100 may include the torso back shell 3110, the muscle backing 3120, the rib cage module 3130 (removed for clarity), and the prosthetic internal organ module 3200. Further, and as shown, the prosthetic internal organ module 3200 may be configured to include organs and features within the chest cavity 3102.

According to one embodiment, the prosthetic internal organ module 3200 may include one or more organs or features germane to the chest cavity 3102. In particular, the prosthetic internal organ module 3200 may include at least one of the prosthetic or simulated lung(s) 3203 and the prosthetic or simulated heart 3204. For example, the simulated lungs 3203 and/or the simulated heart 3204 may be configured as simple or nonoperational prosthetic organs affixed to or otherwise anchored within the chest cavity 3102.

According to one embodiment, and as discussed above, at least one of the simulated lungs 3203 and/or the simulated heart 3204 may be configured as operational prosthetic organs that breathe or pump, respectively. In particular, the simulated lungs 3203 and/or the simulated heart 3204 may be fluidly coupled to the onboard fluid delivery system 3300 and may be supplied with compressed air, simulated blood, or other appropriate fluid media. For example, the simulated lungs 3203 and/or the simulated heart 3204 may be fluidly coupled to its respective fluid channel 3310. Preferably, the fluid channel 3310 and its respective simulated organ will mate via a toolless coupling.

FIG. 50 is a front view of a detail of an exemplary open surgery simulator, showing a partially assembled abdominal cavity of an exemplary simulated torso, according to one embodiment of the disclosure. As above, the open surgery simulator 3000 may include the simulated torso 3100 and the onboard fluid delivery system 3300. Also as above, the simulated torso 3100 may include the torso back shell 3110, the muscle backing 3120, the rib cage module 3130 (removed for clarity), and the prosthetic internal organ module 3200. Further, and as shown, the prosthetic internal organ module 3200 may be configured to include organs and features within the abdominal cavity 3104.

According to one embodiment, the prosthetic internal organ module 3200 may include one or more organs or features germane to the abdominal cavity 3104. In particular, the prosthetic internal organ module 3200 may include at least one of a prosthetic or simulated gastrointestinal tract 3205, the simulated liver 3206, the simulated urinary tract 3207, the simulated artery 3208, etc. For example, one or more organs germane to the abdominal cavity 3104 may be configured as simple or nonoperational prosthetic organs affixed to or otherwise anchored within to the abdominal cavity 3104.

According to one embodiment, and as discussed above, at least one of the abdominal organs or features may be configured as operational prosthetic organs through which simulated bodily fluids flow or are present. In particular, and as above, one or more of the abdominal organs may be fluidly coupled to its respective fluid channel 3310 of the onboard fluid delivery system 3300 and may be supplied with an appropriate fluid media. Also as above, the fluid channel 3310 and its respective simulated organ or feature will preferably mate via a toolless coupling.

According to one embodiment, one or more fluid channel 3310 (or portions thereof) may be configured both to supply organs of the prosthetic internal organ module 3200 with its respective fluid media, and as elements of the prosthetic internal organ module 3200. In particular, a portion of the fluid channel 3310 may be configured to supply a simulated fluid media (e.g., simulated blood) to an organ (e.g., simulated kidney 3509), and another portion of the same fluid channel 3310 may be configured as a simulated a simulated fluid vessel (e.g., the simulated artery 3208, a simulated vein, etc.). Further, and as above, independent fluid channels 3310 may receive different fluid profiles such as arterial flow and venal flow.

FIG. 51 is a front perspective detail view of the simulated torso, showing a simulated diaphragm, according to one embodiment of the disclosure. As above, the simulated torso 3100 may include the muscle backing 3120, the rib cage module 3130, the plumbed spine 3160, and the pelvis module 3168. Also as above, the simulated torso 3100 may include the chest cavity 3102 (FIG. 49) anatomically located behind the rib cage module 3130, and the abdominal cavity 3104 anatomically located below the rib cage module 3130. As shown, the chest cavity 3102 may be substantially enclosed by the muscle backing 3120 the muscle backing 3120. In contrast, while the abdominal cavity 3104 may reside in front of the muscle backing 3120, it may be substantially uncovered by the rib cage module 3130.

According to one embodiment, the simulated torso 3100 may further include a simulated diaphragm 3150 configured to separate the chest cavity 3102 from the abdominal cavity 3104. In particular, the simulated diaphragm 3150 may generally include a sheet of material extending backward from a lower edge (i.e., defined by the lowest left rib and right rib) of the rib cage module 3130 to the muscle backing 3120, thus forming a physical barrier between the chest cavity 3102 and the abdominal cavity 3104.

Preferably the simulated diaphragm 3150 will be anatomically correct in position, mechanical characteristics, and appearance. For example, the simulated diaphragm 3150 may include a sheet of flexible material (such as silicone rubber) coupled to the lower edge of the rib cage module 3130, textured and colored to have a visual appearance of human diaphragm muscle. Further, the sheet may have a complex curvature that extends backward toward the muscle backing 3120, and then downward toward the pelvis module 3168 (covering the front of portions of both the muscle backing 3120 and the plumbed spine 3160).

According to one embodiment, the simulated diaphragm 3150 may include one or more diaphragm ports 3152. In particular, each diaphragm port 3152 may be a passageway sized and positioned to provide a predefined passage through the diaphragm. For example, in regions where the simulated diaphragm 3150 covers the plumbed spine 3160, at least one diaphragm port 3152 (e.g., lower illustrated port) may be configured to provide a passageway from the plumbed spine 3160 forward and into the abdominal cavity 3104. Also for example, at least one diaphragm port 3152 (e.g., upper illustrated port) may be configured to provide a passageway between the chest cavity 3102 and the abdominal cavity 3104. The diaphragm ports 3152 may be particularly beneficial for efficiently routing the fluid channels 3310 (FIG. 49) into and out of the abdominal cavity 3104.

According to one embodiment, the simulated diaphragm 3150 may be removably attached to the rib cage module 3130. In particular, the simulated diaphragm 3150 may include a rib cage couple 3154 (FIG. 63) configured to couple the simulated diaphragm 3150 underneath and proximate the lower edge of the rib cage module 3130. The rib cage couple 3154 may include one or more toolless couples (e.g., snaps, hook and loop fastener, spring loaded leading edge, clips, etc.). Further, the rib cage couple 3154 may include a combination of different types of toolless couples. For example, according to one embodiment, the rib cage couple 3154 may be embodied as a spring loaded leading edge embedded into an upper, forward edge of the simulated diaphragm 3150 and configured to couple to the rib cage module 3130 at a plurality of points via a plurality of coupling means. Beneficially, this may provide for convenient installation and removal of the simulated diaphragm 3150.

FIG. 52 is a front view of a detail of an open surgery simulator, showing an exemplary prosthetic internal organ module, according to one embodiment of the disclosure. FIG. 53 is a back view of the prosthetic internal organ module of FIG. 52. As above, a prosthetic internal organ module 3200 may include one or more internal organs of a human, which may generally may be installed in the chest cavity 3102 and/or the abdominal cavity 3104 of the simulated torso 3100 (FIG. 48), or a combination thereof. Also as above, the prosthetic internal organ module 3200 may be fully packaged/enveloped (e.g., prosthetic internal organ module 100 of FIG. 7) or "loose"/unpackaged (e.g., FIGS. 49 & 50), or a combination thereof.

According to one embodiment, and as illustrated, the prosthetic internal organ module 3200 may be packaged in a soft envelope that is easy to rapidly remove and replace in the simulated torso 3100. In particular, the prosthetic internal organ module 3200 may include an organ envelope 3210 configured to package one or more prosthetic internal organs together as a single portable unit. For example, the organ envelope 3210 may be made of a flexible material (e.g., silicone rubber) that is both flexible, deformable, and severable by standard medical hand tools, such as scissors, scalpels, and the like. In this way the organ envelope 3210 may be manually inserted into an irregularly shaped cavity (e.g., the chest cavity 3102, the abdominal cavity 3104, etc.) without any special skill or training, and then operated on directly. Preferably, and as shown, the organ envelope 3210 may be at least partially translucent, thus providing for greater realism and ease of organ identification during training.

According to one embodiment, the organ packaging may be made up of a plurality of sheets of the flexible material. In particular, the organ envelope 3210 may include a base 3212 and an anterior cover 3214. As above, the anterior cover 3214 may be attached to the base 3212 with the organs of interest enveloped therebetween. Also as above, the base 3212 and the anterior cover 3214 may be constructed of a manually pliant or flexible material that allows for bending and other required deformations, such as silicone, rubber, and other elastomeric materials. According to one embodiment, the base 3212 and the anterior cover 3214 may be identical sheets (e.g., material and thickness) sealed about their periphery 3215. Beneficially, the prosthetic internal organs of interest (or anatomic groupings thereof) may be packaged together, in one or more envelopes (e.g., as an abdominal package, a pelvic package, a chest package, etc.) as an efficiently prepackaged "consumable" item.

The packaged organs may be anatomically arranged during assembly, and anchored positively, compressively, or a combination thereof. In particular, the prosthetic internal organs may be anchored in position positively, for example, to at least one of the base 3212 and the anterior cover 3214 (e.g., with adhesives or mechanical couples). Alternately, the prosthetic internal organs may be held in position compressively, for example, by and between the base 3212 and the anterior cover 3214. As such, the prosthetic internal organs may be held in position or otherwise restricted in movement by any combination of adjacent prosthetic internal organs, the base 3212 and the anterior cover 3214, portions of the fluid delivery system 3220, etc.

Also as above, the prosthetic internal organ module 3200 may include a fluid delivery system 3220 configured to delivery one or more simulated body fluids to one or more of the prosthetic internal organs within the prosthetic internal organ module 3200, and/or through the prosthetic internal organ module 3200. In particular, and as above, the fluid deliver system 3220 may generally include at least one tubing 3222, each having an inlet 3222A and an outlet 3222B. One or more of the tubing 3222 of the fluid delivery system 3220 may penetrate and extend out of the organ envelope 3210 of the prosthetic internal organ module 3200 so as to interface with the onboard fluid deliver system 3300 (or directly with an offboard supply). Preferably, at least one penetration of the organ envelope 3210 will be at its periphery 3215, for example, passing between the base 3212 and the anterior cover 3214.

According to one embodiment, one or more of the tubing 3222 of the fluid delivery system 3220 may also penetrate and extend out of the organ envelope 3210 of the prosthetic internal organ module 3200 as above, but here, so as to interface with other components of the open surgery simulator 3000 or other "pass through" use, external to the organ envelope 3210. For example, one tubing 3222 of the fluid delivery system 3220 may be configured to "pass through" the prosthetic internal organ module 3200 to deliver simulated urine to an anatomic feature 3512 (e.g., simulated penis) of the outer covering 3500 (FIG. 45). Also, for example, one tubing 3222 of the fluid delivery system 3220 may be configured to deliver simulated urine to a simulated bladder within the prosthetic internal organ module 3200, as well as to pass through" to the anatomic feature 3512 (e.g., simulated penis) of the outer covering 3500 (FIG. 45), in a "shared use".

According to one embodiment, the tubing 3222 of the fluid delivery system 3220 may be configured as a simulated artery 3208 passing through and out of the organ envelope 3210. In particular, the tubing 3222 may penetrate out of the organ envelope 3210 and return back into the organ envelope 3210. As above, this may be configured as a "shared use" with a prosthetic organ within the organ envelope 3210, for example with a simulated kidney 3209 (FIG. 50).

According to one embodiment, the tubing 3222 may penetrate out of the organ envelope 3210 pass though the pelvis module 3168 and return back into the organ envelope 3210 (simulating an inner and outer iliac artery). Further, this may be duplicated for coverage on the left and right side of the pelvis module 3168. Preferably, each loop (left and right) may include a tube connector 3224 configured to fluidly couple an inner and outer leg of each loop. Advantageously, this may provide for removal and replacement of the prosthetic internal organ module 3200 without disturbing the pelvis module 3168.

According to one embodiment, each fluid channel 3310 (FIG. 49) of the onboard fluid deliver system 3300 may be fluidly coupled to at least one tubing 3222 of the prosthetic internal organ module 3200. For example, (1) one fluid channel 3310 configured to deliver pulsed simulated blood (i.e., in arterial flow profile) may be fluidly coupled to the inlet 3222A of one tubing 3222, (2) another fluid channel 3310 configured to receive simulated blood (e.g., a return line of a closed circuit) may be fluidly coupled to the outlet 3222B of another tubing 3222, (3) another fluid channel 3310 configured to deliver another simulated body fluid may be fluidly coupled to the inlet 3222A of yet another tubing 3222, and (4) yet another fluid channel 3310 configured to deliver generally supplied simulated blood (e.g., unpulsed) may be fluidly coupled to the inlet 3222A of a manifold or other fluid split to a plurality of tubing 3222.

Preferably, each tubing 3222 that extends out of the organ envelope 3210 of the prosthetic internal organ module 3200 will be sealed to the organ envelope 3210 at its point of penetration. Also, each inlet 3222A or outlet 3222B outside of the organ envelope 3210 will preferably be configured as standardized, quick release fluid couple. In this way, the prosthetic internal organ module 3200 can efficiently be fluidly decoupled from and recoupled to the onboard fluid deliver system 3300 as it is removed and replaced.

According to one embodiment, the prosthetic internal organ module 3200 may include additional anatomic features. In particular, the prosthetic internal organ module 3200 may include features inside, integrated with, and/or outside the organ envelope 3210. Further the features may be environmental, functional, or a combination thereof. For example, and as above, the prosthetic internal organ module 3200 may include a prosthetic omentum 3216 or distributed fatty tissue within the organ envelope 3210 and about the prosthetic organs (also see ref. 160 of FIG. 17). Also for example, the prosthetic internal organ module 3200 may include may include a simulated abdominal muscle 3217 integrated with or otherwise adhered to the anterior cover 3214 of the organ envelope 3210. Also for example, the prosthetic internal organ module 3200 may include may include a simulated anus 3218 (functional or non-functional) extending from a lower portion of the organ envelope 3210.

FIG. 54 is an exploded front view of details of an the simulated torso, according to one embodiment of the disclosure. As above, the simulated torso 3100 may include at the torso back shell 3110 and the muscle backing 3120. As shown, the torso back shell 3110 may generally be configured as a casing or housing for the various components of the simulated torso 3100. In particular, the torso back shell 3110 may be a thin-walled or otherwise hollowed out casing having an external fixed form in the shape of a human back. For example, the torso back shell 3110 may be made of a hard plastic contoured wall, less than 0.5 inch thick. Also for example, the torso back shell 3110 may generally be an injection mold of approximately 0.25 inch thickness, with deviations for hardpoints, stiffeners, anatomic features, etc.

According to one embodiment, the torso back shell 3110 may include structural features for interaction with other elements of the simulated torso 3100. In particular, and as shown, the torso back shell 3110 may include at least one of a muscle anchor 3111, a centerline ridge 3112, a rib cage anchor 3113, a rib cage pad 3114, and an appendage anchor 3115 (FIG. 56). For example, the muscle anchor 3111 may be any fixed protrusion (or void) configured to lock or otherwise interact with the muscle backing 3120 so as to inhibit its relative motion. Also for example, the centerline ridge 3112 may be an elevated ridge (preferably corresponding to an anatomic back side depression of the spine between the back muscles) running at least a portion of the length of the back in a top-to-bottom direction. Also for example, the rib cage anchor 3113 may be a retaining structure (preferably a hard point with a positive lock such as a screw hole or cam lock) where the rib cage module 3130 (FIG. 48) may be secured against removal. Also for example, the rib cage pad 3114 may be a landing area against which the rib cage module 3130 (e.g., the flex rib section 3134) may be pressed or slid longitudinally. Further, the rib cage pad 3114 may include motion guides (e.g., one or more side rails or stops configured to limit travel to one dimension and within a predefined range). Also for example, the appendage anchor 3115 may be a retaining structure (preferably a hard point with a positive lock such as a screw hole or cam lock) where the torso attachment 3180 (FIG. 43) may be secured against removal.

According to one embodiment, one or more of these structural features may be combined. For example, and as shown, each forward-protruding muscle anchor 3111 proximate the shoulder may be combined with one rib cage anchor 3113 e.g., also including a fastener receiver such as a screw hole). Also for example, and as shown, the right side rib cage anchor 3113 (i.e., including two screw holes) may be combined with both a rib cage pad 3114 and a muscle anchor 3111 by extruding a notched portion of the torso back shell 3110 forward to a plateau against which the right side of the rib cage module 3130 may be pressed against in the backwards direction. According to one embodiment, the torso back shell 3110 may combine the rib cage anchor 3113 with the rib cage pad 3114 only on its right side, and optionally have a rib cage pad 3114 on its left side.

Further, the torso back shell 3110 may include a plumbing port 3116 through which at least portions of the onboard fluid delivery system 3300 may pass. In particular, the torso back shell 3110 may include an opening or passageway (preferably proximate the neck area) through at least one fluid channel 3310 may penetrate the torso back shell 3110 and carry the various fluid media. According to one embodiment, the plumbing port 3116 may be sized and dimensioned to accommodate all fluid channels 3310 that are coupled to fluid sources outside of the simulated torso 3100.

The muscle backing 3120 may generally be configured as a flexible filling to the torso back shell 3110. In particular, the forward facing surface of the muscle backing 3120 may appear and respond anatomically as human muscle (e.g., in color, texture, and mechanical properties). Further, the back and outside facing surfaces of the of the muscle backing 3120 may be structural in nature, conforming to the torso back shell 3110 and may include one or more voids for reduction of overall weight. Preferably, the muscle backing 3120 will be divided into a plurality of portions for ease of torso assembly and installation into the torso back shell 3110. For example, the muscle backing 3120 may be divided into a butt portion 3122, a left back portion 3124, and a right back portion 3126 corresponding to its respective anatomical feature.

According to one embodiment, the muscle backing 3120 may include a plurality of interlock keyways 3128. In particular, the interlock keyways 3128 may be configured to align, position, or otherwise secure the muscle backing 3120 in the simulated torso 3100. For example, and as shown, the left back portion 3124 and the right back portion 3126 may each have an interlock keyway 3128 configured to mate with a muscle anchor 3111 (here in the upper shoulder area). Similarly, and as shown, the left back portion 3124 and the right back portion 3126 may each have a lateral or outboard interlock keyway 3128 configured to mate with the left or right rib cage pad 3114, respectively. Also for example, and as shown, the left back portion 3124 and the right back portion 3126 may each have opposing interlock keyways 3128 running along the back centerline configured to receive the centerline ridge 3112 of the torso back shell 3110 (reciprocally running along the back centerline), and partially secure each portion of the muscle backing 3120 against lateral movement. Also for example, the top of the butt portion 3122 may include an interlock keyway 3128 configured as a recessed center area 3123, while the left back portion 3124 and the right back portion 3126 may each have a mating interlock keyway 3128 configured as a left bottom inner extension 3125 and a right bottom inner extension 3127, respectively.

According to one embodiment, the interlock keyways 3128 of the muscle backing 3120 may also be configured to align, position, or otherwise secure other elements of the simulated torso 3100. For example, butt portion 3122 may include a plurality of recessed areas configured to receive and set or partially secure skeletal portions of the pelvis module 3168. Also for example, the left back portion 3124 and the right back portion 3126 may have opposing interlock keyways 3128 running along the back centerline configured to receive and partially secure skeletal portions of the plumbed spine 3160. Preferably the plurality of interlock keyways 3128 will be molded directly into the muscle backing 3120.

FIG. 55 is a back view of a detail of an the simulated torso, according to one embodiment of the disclosure. FIG. 56 is a right side view of a detail of an the simulated torso, according to one embodiment of the disclosure. According to one embodiment, the simulated torso 3100 may be configured to be operated on while laying flat on its back or upright. In particular, the torso back shell 3110 may include at least one of a horizontal pad 3117 and an upright pad 3118 configured to stabilize the simulated torso 3100 while in the horizontal (laying down) or vertical (upright) orientation, respectively.

For example, and as shown, the horizontal pad 3117 may be anatomical deviation of the torso back shell 3110 where the buttocks (or portions thereof) are flattened from an otherwise rounded shape. Also for example, and as shown, the upright pad 3118 may be anatomical deviation of the torso back shell 3110 where stub portions of the legs are extended from the groin area and terminated in a flat surface. In both cases, while the horizontal pad 3117 and the upright pad 3118 deviate from human anatomy, they may provide for additional stability during training. This may be particularly beneficial where the torso back shell 3110 is made of a rigid material such as a hard plastic.

FIG. 57 is a front view of a detail of an the simulated torso, according to one embodiment of the disclosure. FIG. 58 is an exploded front view of a detail of an the simulated torso, showing various skeletal sections, according to one embodiment of the disclosure. As above, the open surgery simulator 3000 may include the simulated torso 3100 and the onboard fluid delivery system 3300. Also as above, the simulated torso 3100 may include the torso back shell 3110, the muscle backing 3120, the plumbed spine 3160, and the pelvis module 3168. Also as above, the onboard fluid delivery system 3300 may include a plurality of fluid channels 3310, many of which are configured to fluidly couple and decoupled with a variety of fluid circuits (e.g., inlets 3222A or outlets 3222B of the prosthetic internal organ module 3200—FIG. 52—that are configured as standardized, quick release fluid couples).

As shown, each fluid channel 3310 may each include an inlet 3310A and an outlet 3310B, preferably configured as standardized, quick release fluid couples. Further, each fluid channel 3310 may be routed from portions of the simulated torso 3100 (e.g. the chest cavity 3102 and the abdominal cavity 3104) into the plumbed spine 3160, where then are collected and further routed through the plumbing port 3116 (FIG. 54) of the torso back shell 3110 and out of the simulated torso 3100.

As above, the plumbed spine 3160 may be configured to route and conceal portions of the onboard fluid delivery system 3300. In particular, the plumbed spine 3160 may include an external shell 3162 configured to appear as a human spine anatomically, and formed as a conduit having a central lumen, and a plurality of ports 3166 that provide access to the central lumen from the outside of the plumbed spine 3160. This allows for passage of at least portions of onboard fluid delivery system 3300 through the central lumen and out the ports 3166, to a designated location in the simulated torso 3100. Beneficially, in addition to added realism for training, this configuration may provide for some fluid channels 3310 to be plumbed into the chest cavity 3102 and other fluid channels 3310 to be plumbed into directly the abdominal cavity 3104 (i.e., without having to pass through the simulated diaphragm 3150 (FIG. 51) or the prosthetic internal organ module 3200. Further, other fluid channels 3310 to be covertly plumbed into alternate locations within a single cavity, such as at the top and to the middle back of the prosthetic internal organ module 3200.

Structurally, the plumbed spine 3160 may be made of materials sufficiently durable to withstand many uses or duty cycles. Further, the plumbed spine 3160 may be tubular or otherwise have a full circumference along substantially all (or portions) of its longitudinal length. Alternately, the plumbed spine 3160 may be formed as an arch or otherwise have an incomplete circumference along all (or portions) of its longitudinal length. In addition, the plumbed spine 3160 may be configured such that the central lumen is aligned with the plumbing port 3116 of the torso back shell 3110 such that all fluid channels 3310 that are coupled to fluid sources outside of the simulated torso 3100 may pass enter the simulated torso 3100 and pass through the plumbing port 3116 of the torso back shell 3110 directly into the central lumen of the plumbed spine 3160.

According to one embodiment, and as illustrated, the plumbed spine 3160 may be separated longitudinally into a plurality of segments. For example, one segment may include one or more ports 3166 that correspond to the chest cavity 3102 and another segment may include one or more ports 3166 that correspond to the abdominal cavity 3104. Further, the plumbed spine 3160 may include an unplumbed segment 3167, as shown, configured to interface with (e.g., slide down into) the pelvis module 3168. Thus, the plumbed spine 3160 may be secured at its bottom end (in addition to its back in the muscle backing 3120 and/or its top end at the plumbing port 3116 of the torso back shell 3110. Beneficially, this may provide for ease of installation, standardized parts, and ready reconfiguration between different training applications.

FIG. 59 is a front view of a detail of an exemplary open surgery simulator, showing an exemplary rib cage module installed with the simulated torso, according to one embodiment of the disclosure. As above, the simulated torso 3100 may include the torso back shell 3110, the muscle backing 3120, the rib cage module 3130, the simulated diaphragm 3150, the plumbed spine 3160, and the pelvis module 3168. Also as above, the various portions of the muscle backing 3120 may be interlocked, anchored, and nested in the torso back shell 3110. Further the plumbed spine 3160 and the pelvis module 3168 be partially secured in the interlock keyways 3128 (FIG. 54) of the muscle backing 3120, with the simulated diaphragm 3150 removably coupled to the rib cage module 3130 and covering the front of portions of the plumbed spine 3160, while separating the chest cavity 3102 from the abdominal cavity 3104. Further, the rib cage module 3130 may be coupled to the torso back shell 3110, for example, at one or more the rib cage anchors 3113 and upon one or more the rib cage pads 3114 (FIG. 57).

As shown, the rib cage module 3130 may be configured anatomically as a human rib cage. In particular, the rib cage module 3130 may include an articulating rib cage 3131 configured to removably couple to the torso back shell 3110. In particular, the articulating rib cage 3131 may include a sternum base 3132, a support rib section 3133 fixed to sternum base 3132, a flex rib section 3134 also fixed to the sternum base 3132. The support rib section 3133 and the flex rib section 3134 may each include one or more individual simulated ribs, a group of simulated ribs joined together, or a combination thereof.

The support rib section 3133 may be configured to anchor the articulating rib cage 3131 to the torso back shell 3110. In particular, the support rib section 3133 may be removably couplable or otherwise mounted to the rib cage anchor 3113 of the torso back shell 3110. For example, the support rib section 3133 may be made of hard plastic or other rigid material that is rigidly coupled to or fused with the sternum base 3132 on one end and fastened to the rib cage anchor 3113 on the other end (e.g., via mechanical fasteners). Preferably, the support rib section 3133 will make up the right hand side of the articulating rib cage 3131.

According to one embodiment, the rib cage module 3130 may further include a collar bone 3140 fixed to the articulating rib cage 3131. In particular, the collar bone 3140 may be configured to further anchor the articulating rib cage 3131 to the torso back shell 3110. For example, the collar bone 3140 may be removably couplable or otherwise mounted to one rib cage anchor 3113 of the torso back shell 3110. Also for example, the collar bone 3140 may include an alignment pin configured to mate with a corresponding keyway of the torso back shell 3110. Preferably, and as shown, the collar bone 3140 may be removably couplable to a left and right rib cage anchor 3113 combined with a left and right forward-protruding muscle anchor 3111 proximate the shoulder. Further, the collar bone 3140 may be made of hard plastic or other rigid material that is rigidly coupled to or fused with the sternum base 3132. According to one embodiment, the collar bone 3140 may be made up of individual right and left simulated collar bones attached to the sternum base 3132.

According to one preferred embodiment, one or more skeletal sections may be at least partially covered with a simulated muscle that is anatomically correct in position, mechanical characteristics, and appearance, for added realism. In particular, the support rib section 3133 and the flex rib section 3134 may each be at least partially laminated with a muscle covering 3170 traversing the individual ribs. Further, and as shown, portions of the pelvis module 3168 may be at least partially laminated with the muscle covering 3170. For example, the support rib section 3133 and the flex rib section 3134 may each be fully covered outside with a muscle covering 3170 configured as pectoral muscles, rib muscles, and intercostal muscles, each in their anatomic position. According to one embodiment, appropriate portions of the muscle covering 3170 may have the appearance of tendons and the like.

According to one embodiment, the muscle covering 3170 on the flex rib section 3134 and/or the support rib section 3133 may include an access passageway 3142 between predetermined ribs. In particular, each access passageway 3142 may interrupt an otherwise continuous pattern of simulated muscle in locations where training would require cutting apart muscle. For example, the muscle covering 3170 may include the access passageway 3142 in intercostal locations where thoracotomy will be performed. Also for example, the muscle covering 3170 may include the access passageway 3142 in intercostal locations where a chest tube will be inserted.

Preferably, and as shown in FIG. 65, the flex rib section 3134 may include an access passageway 3142 through its muscle covering 3170 configured for performing a thoracotomy on the left side of the articulating rib cage 3131. Further, and as shown in FIG. 64, the support rib section 3133 may preferably include an access passageway 3142 through its muscle covering 3170 configured for performing a chest tube insertion on the right side of the articulating rib cage 3131. According to one embodiment, the flex rib section 3134 may include one access passageway 3142 through its muscle covering 3170 on each side of a single simulated rib or group of ribs. Beneficially, by prepositioning one or more access passageways 3142 through the muscle covering 3170, the articulating rib cage 3131 may be repeatedly reused in a nondestructive manner.

FIG. 60 is a front view of an exemplary muscle patch, according to one embodiment of the disclosure. FIG. 61 is a back view of the muscle patch of FIG. 60. As above, one or more access passageways 3142 may be strategically prepositioned through the muscle covering 3170 of the articulating rib cage 3131.

According to one embodiment, the rib cage module 3130 may further include a muscle patch 3146 configured to cover up the one or more access passageways 3142. In particular, the muscle patch 3146 may be a section of simulated muscle having an adhesive backing so as to adhere to the to the area of the muscle covering 3170 surrounding the access passageway 3142. Further, the muscle patch 3146 may be removable from the muscle covering 3170 after use (e.g., as a consumable item) such that the muscle covering 3170 may be readily reused. For example, the muscle patch 3146 may made of the same or similar material as the muscle covering 3170, including the same muscle pattern that would be present in the absence of the access passageway 3142. Also for example, the adhesive may be soluble in liquids or conditions that are nondestructive to the muscle covering 3170 of the articulating rib cage 3131, thus providing for ease of removal and replacement.

Preferably, and as shown, the muscle patch 3146 may be configured to bleed when cut. In particular, the muscle patch 3146 may include a simulated blood packet 3147 integrated with or otherwise fixed to the muscle patch 3146. For example, and as shown, the simulated blood packet 3147 may be attached to the back side of the muscle patch 3146 and span the same or similar area as the access passageway 3142. Further, the simulated blood packet 3147 may only include a limited supply of blood, as would be consistent with the surgical incision being simulated. Beneficially, the muscle pattern and/or the simulated blood packet 3147 may also serve to align or otherwise orient the muscle patch 3146 before attachment to the muscle covering 3170 of the articulating rib cage 3131.

FIG. 62 is an upper front perspective view of an exemplary rib cage module, according to one embodiment of the disclosure. Here, As above, the rib cage module 3130 may include the articulating rib cage 3131 and the collar bone 3140 (both configured to removably couple to the rib cage anchors 3113 of the torso back shell 3110—FIG. 57), as well as one or more consumable the muscle patches 3146 (FIG. 60). Also as above, the articulating rib cage 3131 may include the sternum base 3132, the support rib section 3133, and the flex rib section 3134. Also as above, the support rib section 3133 and the flex rib section 3134 may be covered with the muscle covering 3170, the muscle covering 3170 including one or more access passageways 3142. As above, the support rib section 3133 may include one or more individual simulated ribs, a group of simulated ribs joined together, or a combination thereof. Further the simulated ribs may be made of a molded hard plastic.

According to one embodiment, the support rib section 3133 may be configured to distribute its coupling load with the rib cage anchor(s) 3113 of the torso back shell 3110 through a variety of coupling means. In particular, the support rib section 3133 may include multiple coupling points, alternate attachment angles, distributed loads, etc.

For example, and as shown where the support rib section 3133 has an access passageway 3142 separating sets of ribs, each set may include a back shell mount 3138 that independently couples to a respective rib cage anchor 3113. Also for example, and as shown, one back shell mount 3138 may attach along a generally backward-forward axis, whereas another back shell interface 3138 may attach approximately orthogonally, i.e., in a generally left-right axis. Also for example, at least one back shell interface 3138 of the support rib section 3133 may include a load distribution plate 3139 affixed to a plurality of ribs of the support rib section 3133. Preferably, the load distribution plate 3139 will be a metal plate (or other material of greater strength than the ribs of the support rib section 3133) including threaded fastener holes configured to receive forward facing bolts at its respective rib cage anchor 3113. It is understood that a variety of conventional fasteners and fastening techniques may be appropriate here.

According to one embodiment and as shown, the rib cage module 3130 may be configured for performing a sternum intraosseous infusion. In particular, the sternum base 3132 an access passageway of a first diameter or size traversing through the sternum base 3132 and a recessed area if a larger diameter or size directly in front of the access passageway. Further the rib cage module 3130 may include an intraosseous infusion sternum puck 3144, analogous to the muscle patch 3146, that is configured to rest in the recessed area and cover up and access passageway as a consumable element. However, in contrast to the muscle patch 3146, the intraosseous infusion sternum puck 3144 will be made to simulate a sternum. For example, the intraosseous infusion sternum puck 3144 may made of the same or similar material as the sternum base 3132.

FIG. 63 is a lower back perspective view of an exemplary rib cage module, according to one embodiment of the disclosure. As above, the simulated torso 3100 may include the torso back shell 3110, the rib cage module 3130, and the simulated diaphragm 3150, where the rib cage module 3130 may include the articulating rib cage 3131 configured to removably couple to the torso back shell 3110 (FIG. 54). Also as above, the articulating rib cage 3131 may include the sternum base 3132, the support rib section 3133, and the flex rib section 3134. Further, the support rib section 3133 may be coupled to one or more rib cage anchors 3113 (FIG. 54) of the torso back shell 3110. Also as above, the flex rib section 3134 may be pressed against and/or slid longitudinally along the rib cage pad 3114 (FIG. 54).

The flex rib section 3134 may be configured such that at least one simulated rib configured can non-destructively move relative to the torso back shell 3110 under the force of rib splitters or thoracic retractors despite the support rib section 3133 being anchored to the torso back shell 3110. In particular, the flex rib section 3134 may include a flex joint 3135 affixed to the sternum base 3132, and at least one flex rib 3136 coupled to the flex joint 3135, opposite the sternum base 3132. Further, the flex joint 3135 may be configured to provide for elastic displacement of the at least one flex rib 3136 of the flex rib section 3134 such that the at least one flex rib 3136 may deviate from a normal anatomic position to a deflected position (via the flex joint 3135) with the application of pressure by the trainee (e.g., using rib splitters, or manually), and return to the normal anatomic position upon pressure release. As illustrated, the flex joint 3135 may be the sole physical coupling between the sternum base 3132 and at least one flex rib 3136. Notably, here all flex ribs are joined together and covered by the muscle covering 3170 on all sides.

According to one embodiment, the flex joint 3135 may be made a resilient elastomeric material sized and dimensioned and of sufficient strength to simulate the natural resistance of a human rib in deflection. Further, the at least one flex rib 3136 may be made of the same or similar material (e.g., hard plastic configured to simulate human bone) as the other simulated skeletal elements of the simulated torso 3100.

According to another embodiment, the flex joint 3135 may be integrated into or otherwise combined with the at least one flex rib 3136. In particular, the at least one flex rib 3136 may be made of a material that simulates the properties of bone yet has sufficient flexibility to deflect under the use of rib splitters without breakage. For example, the at least one flex rib 3136 may include two adjacent ribs (and an access passageway 3142 between the two ribs), where each rib is unconstrained (e.g., not coupled to a rib cage anchor 3113, but only resting upon the rib cage pad 3114).

According to one embodiment and as shown, the flex rib section 3134 may also include a load distribution plate 3139 affixed to a plurality of ribs of the support rib section 3133 opposite the flex joint 3135 and the sternum base 3132. Preferably, the load distribution plate 3139 will be a metal plate (or other material of greater strength than the ribs of the support rib section 3133). According to one embodiment, the flex rib section 3134 may use the same load distribution plate 3139 (i.e., including threaded fastener holes) as the support rib section 3133, however without anchoring it. According to the illustrated embodiment, where the flex rib section 3134 has an access passageway 3142 separating sets of ribs, each set may include a load distribution plate 3139 that independently interfaces with a respective the rib cage pad 3114.

As above, the simulated diaphragm 3150 may be removably coupled to the rib cage module 3130. In particular, the simulated diaphragm 3150 may include the rib cage couple 3154 configured to couple the simulated diaphragm 3150 underneath and proximate the lower edge of the articulating rib cage 3131. Also as shown, the rib cage couple 3154 may be flat spring configured to follow the contour of the lower edge of the articulating rib cage 3131 and including manual rib cage inserts 3156 at both ends and centrally. Preferably, the rib cage couple 3154 will be embedded or otherwise concealed within the simulated diaphragm 3150 with only the rib cage inserts 3156 exposed. Beneficially, this may provide for convenient installation and removal of the simulated diaphragm 3150.

While there have been shown what are presently considered to be preferred embodiments of the present disclosure, it will be apparent to those skilled in the art that various changes and modifications can be made herein without departing from the scope and spirit of the disclosure. Further, the above description of the various embodiments is provided to enable a person of ordinary skill in the art to make or use the subject matter of the disclosure. Various modifications to the embodiments will be readily apparent to those skilled in the art, and the generic principles defined herein may be applied to other variations without departing from the spirit or the scope of this disclosure. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art.

The invention claimed is:

1. A simulated torso for an open surgery simulator, the simulated torso comprising:
   a torso back shell having a concave front, and having a back shaped as at least a portion of a human torso back side;
   a muscle backing nested within the torso back shell and configured as a flexible filling to the torso back shell, the muscle backing having a forward facing surface configured to appear as human muscle;
   a rib cage module coupled to the torso back shell substantially in front of the muscle backing, the rib cage module including
      a sternum base sized and dimension as a human sternum,
      at least one support rib section configured to removably couple the rib cage module to the simulated torso, the at least one support rib section affixed to the sternum base,
      a flex rib section including at least one rib sized and dimension as a human rib, and
      a flex joint affixed to the sternum base and to the flex rib section, the flex joint configured to provide for elastic displacement of the at least one rib of the flex rib section,
   an onboard fluid delivery system configured to deliver at least one of a liquid and a gas into and through the simulated torso, the onboard fluid delivery system including a fluid supply system interface configured to fluidly couple with an offboard fluid supply and a fluid channel configured to plumb a fluid into and through the simulated torso; and
   a plumbed spine configured to route and conceal portions of the onboard fluid delivery system within the simulated torso, the plumbed spine having an external shell configured to appear as a human spine anatomically, and formed as a conduit having a central lumen, and a plurality of ports configured to provide access to the central lumen from the outside of the plumbed spine.

2. The simulated torso of claim 1, wherein the simulated torso has a chest cavity defined as being between the muscle backing and rib cage module, and an abdominal cavity defined as being below rib cage module and in front of the muscle backing, the simulated torso further comprising a simulated diaphragm configured to separate the chest cavity from the abdominal cavity, the simulated diaphragm including a sheet of material extending backward from a lower edge of the rib cage module to the muscle backing, the simulated diaphragm forming at least a partial physical barrier between the chest cavity and the abdominal cavity.

3. A simulated torso for an open surgery simulator, the simulated torso comprising:
   a torso back shell having a concave front, and having a back shaped as at least a portion of a human torso back side;
   a muscle backing nested within the torso back shell and configured as a flexible filling to the torso back shell, the muscle backing having a forward facing surface configured to appear as human muscle; and
   a rib cage module coupled to the torso back shell substantially in front of the muscle backing, the rib cage module including
      a sternum base sized and dimension as a human sternum, and
      at least one support rib section configured to removably couple the rib cage module to the simulated torso, the at least one support rib section affixed to the sternum base,
      a flex rib section including at least one rib sized and dimension as a human rib, and
      a flex joint affixed to the sternum base and to the flex rib section, the flex joint configured to provide for elastic displacement of the at least one rib of the flex rib section; and wherein the rib cage module further includes a collar bone fixed to the articulating rib cage, the collar bone configured to removably couple the rib cage module to a left rib cage anchor and a right rib cage anchor of the torso back shell.

4. A simulated torso for an open surgery simulator, the simulated torso comprising:
   a torso back shell having a concave front, and having a back shaped as at least a portion of a human torso back side;
   a muscle backing nested within the torso back shell and configured as a flexible filling to the torso back shell, the muscle backing having a forward facing surface configured to appear as human muscle; and
   a rib cage module coupled to the torso back shell substantially in front of the muscle backing, the rib cage module including
      a sternum base sized and dimension as a human sternum, and
      at least one support rib section configured to removably couple the rib cage module to the simulated torso, the at least one support rib section affixed to the sternum base,
      a flex rib section including at least one rib sized and dimension as a human rib, and
      a flex joint affixed to the sternum base and to the flex rib section, the flex joint configured to provide for elastic displacement of the at least one rib of the flex rib section; and
   wherein the rib cage module further includes a muscle covering configured as chest muscles affixed to and covering the support rib section and the flex rib section, the muscle covering including a first access passageway through the muscle covering and between ribs; and
   wherein the muscle covering further includes a second access passageway through the muscle covering and between ribs, the second access passageway located on an opposite side of the rib cage module than the first access passageway;
   wherein the support rib section is located on the right side of the rib cage module and the flex rib section is located on the left side of the rib cage module;
   wherein the first access passageway is positioned as a predefined right side entryway for insertion of a chest tube; and
   wherein the second access passageway is positioned as a predefined left side entryway for performing a thoracotomy.

5. A simulated torso for an open surgery simulator, the simulated torso comprising:
   a torso back shell having a concave front, and having a back shaped as at least a portion of a human torso back side;
   a muscle backing nested within the torso back shell and configured as a flexible filling to the torso back shell, the muscle backing having a forward facing surface configured to appear as human muscle; and
   a rib cage module coupled to the torso back shell substantially in front of the muscle backing, the rib cage module including
      a sternum base sized and dimension as a human sternum, and
      at least one support rib section configured to removably couple the rib cage module to the simulated torso, the at least one support rib section affixed to the sternum base; and
   wherein the torso back shell includes at least one appendage anchor configured to secure a torso attachment against removal.

6. The simulated torso of claim 5, further comprising a simulated human head coupled to the simulated torso via the appendage anchor, the simulated head including a trachea module configured for performance of a cricothyroidotomy, and a neck access configured to receive the trachea module.

7. An open surgery simulator comprising:
   a simulated torso including
      a torso back shell having a concave front, and having a back shaped as at least a portion of a human torso back side,
      a muscle backing nested within the torso back shell and configured as a flexible filling to the torso back shell, the muscle backing having a forward facing surface configured to appear as human muscle, and
      a rib cage module coupled to the torso back shell substantially in front of the muscle backing, the rib cage module including
         a sternum base sized and dimension as a human sternum, and
         at least one support rib section configured to removably couple the rib cage module to the simulated torso, the at least one support rib section affixed to the sternum base,
         a flex rib section including at least one rib sized and dimension as a human rib,
         a flex joint affixed to the sternum base and to the flex rib section, the flex joint configured to provide for elastic displacement of the at least one rib of the flex rib section,
         a muscle covering configured visually and tactilely as chest muscles, said muscle affixed to and covering the support rib section and the flex rib section, the muscle covering including
            a first access passageway through the muscle covering and between ribs, and
            a second access passageway through the muscle covering and between ribs, the second access passageway locate on an opposite side of the articulating rib cage than the first access passageway;
   a first prosthetic internal organ module positioned in the torso back shell in front of the muscle backing of the simulated torso, the first prosthetic internal organ module including a plurality of simulated human organs, the first prosthetic internal organ module positioned in a chest cavity between the muscle backing and the rib cage module, and the plurality of simulated human organs of the first prosthetic internal organ module includes at least one of a simulated heart and a simulated lung;
   a simulated diaphragm extending between the rib cage module and the muscle backing, below the chest cavity;
   a second prosthetic internal organ module positioned in an abdominal cavity in front of the muscle backing and at least partially below simulated diaphragm, the second prosthetic internal organ module including a plurality of simulated human abdominal organs; and
   an onboard fluid delivery system configured to deliver at least one of a liquid and a gas into and through the simulated torso, the onboard fluid delivery system including a fluid supply system interface configured to fluidly couple with an offboard fluid supply and a fluid channel configured to plumb a fluid into and through the simulated torso; and a plumbed spine configured to route and conceal portions of the onboard fluid delivery system within the simulated torso, the plumbed spine having an external shell configured to appear as a human spine anatomically, and formed as a conduit having a central lumen, and a plurality of ports configured to provide access to the central lumen from the outside of the plumbed spine.

8. The open surgery simulator of claim 7, further comprising an outer covering including a simulated skin portion made of a first material, and an accessibility portion made of a second material and having an access fastener, the outer covering configured to fittingly be worn by the simulated torso when placed over the simulated torso and the access fastener is secured.

9. The open surgery simulator of claim 8, wherein the outer covering further includes a plumbing interface configured to provide access to the onboard fluid delivery system when worn by the simulated torso, the open surgery simulator further comprising an offboard fluid supply system including a flow harness and at least one of a liquid system and a gas system, said flow harness passing through the plumbing interface, said flow harness having a simulator interface fluidly coupled to the onboard fluid delivery system, and said flow harness configured to communicate a fluid from the at least one of the liquid system and the gas system to the onboard fluid delivery system.

* * * * *